(12) United States Patent
Cornell

(10) Patent No.: US 8,734,158 B2
(45) Date of Patent: May 27, 2014

(54) METHODS AND APPARATUS FOR TEACHING READING AND MATH SKILLS TO INDIVIDUALS WITH DYSLEXIA, DYSCALCULIA, AND OTHER NEUROLOGICAL IMPAIRMENTS

(76) Inventor: Michael E. Cornell, Gibsonia, PA (US)

(*) Notice: Subject to any disclaimer, the term of this patent is extended or adjusted under 35 U.S.C. 154(b) by 197 days.

(21) Appl. No.: 13/136,147

(22) Filed: Jul. 25, 2011

(65) Prior Publication Data

US 2011/0287395 A1 Nov. 24, 2011

Related U.S. Application Data

(63) Continuation-in-part of application No. 12/927,356, filed on Nov. 12, 2010, now abandoned.

(60) Provisional application No. 61/260,481, filed on Nov. 12, 2009.

(51) Int. Cl.
*G09B 23/02* (2006.01)
*G09B 19/00* (2006.01)
*G09B 19/02* (2006.01)
*A63F 3/04* (2006.01)

(52) U.S. Cl.
CPC ............ *G09B 19/02* (2013.01); *G09B 23/02* (2013.01); *A63F 2003/046* (2013.01)
USPC ........... 434/188; 434/191; 434/207; 434/208; 434/209

(58) Field of Classification Search
CPC ... G09B 19/02; G09B 23/02; A63F 2003/046
USPC .......................... 434/167, 188, 191, 207–209
See application file for complete search history.

(56) References Cited

U.S. PATENT DOCUMENTS

| | | | | |
|---|---|---|---|---|
| 3,171,217 | A | * | 3/1965 | Birdsall ................. 434/196 |
| 4,382,794 | A | * | 5/1983 | Preus ..................... 434/193 |
| 4,696,492 | A | | 9/1987 | Hardin |
| 5,076,793 | A | | 12/1991 | Aghevli et al. |
| 5,277,586 | A | | 1/1994 | Branch |
| 5,421,732 | A | | 6/1995 | Taylor |
| 5,447,433 | A | * | 9/1995 | Perry, Jr. .............. 434/171 |
| 5,868,577 | A | | 2/1999 | Aghevli |

(Continued)

OTHER PUBLICATIONS

Digi-Block website, http://www.digi-block.com, Nov. 5, 2010, Copyright 2008 Digi-Block, Inc.

(Continued)

*Primary Examiner* — Xuan Thai
*Assistant Examiner* — Jerry-Daryl Fletcher
(74) *Attorney, Agent, or Firm* — Kathleen Koznicki; Lynch Weis, LLC

(57) ABSTRACT

The present invention includes a phonetic alphabet with clarifiers and modifiers that aid in the teaching of reading skills to individuals with dyslexia, dyscalculia, and other neurological impairments when the present invention letters are connected horizontally in series with clarifiers and modifiers to form a word, a phrase, a sentence, and/or a paragraph. The present invention further includes mathematical symbols for teaching math skills to individuals with dyslexia, dyscalculia, and other neurological impairments when predetermined geometric shapes are arranged to form numbers of a base 10 counting system that are capable for using in additional, subtraction, multiplication, division. The present invention of mathematical symbols includes whole numbers, real numbers, integers, fractions, and decimals. The present invention also includes 2D and 3D tools and methods of using same.

17 Claims, 90 Drawing Sheets

(56) References Cited

U.S. PATENT DOCUMENTS

| | | |
|---|---|---|
| 6,814,579 B2 | 11/2004 | Bent |
| 2003/0165800 A1 | 9/2003 | Shaw et al. |
| 2004/0023196 A1* | 2/2004 | Karabaic ..................... 434/188 |
| 2010/0196860 A1 | 8/2010 | Donzow |

OTHER PUBLICATIONS

Wikipedia website, http://en.wikipedia.org, Nov. 5, 2010.

* cited by examiner

| Cursive<br>Lowercase Uppercase | Print<br>Lowercase Uppercase | Phonetoseji<br>Lowercase Uppercase |
|---|---|---|
| The short "o" sound as in the words bought, fought, costs, and Doc. | The short "o" sound as in the words bought, fought, costs, and Doc. | The short "o" sound as in the words bought, fought, costs, and Doc. |
|  | 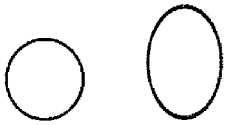 | o O |
| The long "o" sound in wrote, moat, coat and soak. | The long "o" sound in wrote, moat, coat and soak. | The long "o" sound in wrote, moat, coat and soak. |
|  |  | o2 O2 |
| The double "oo" sounds in words such as Google and cool. | The double "oo" sounds in words such as Google and cool. | The double "oo" sounds in words such as Google and cool. |
|  | 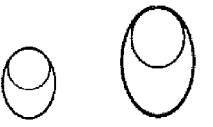 | o3 O3 |

Fig. 1A

| Cursive<br>Lowercase Uppercase | Print<br>Lowercase Uppercase | Phonetoseji<br>Lowercase Uppercase |
|---|---|---|
| The "ou" or "ow" sound such as in words like, now and out. | The "ou" or "ow" sound such as in words like, now and out. | The "ou" or "ow" sound such as in words like, now and out. |
|  |  | o4 O4 |
| The "oy" and "oi" sound in words like toy, boy and toil | The "oy" and "oi" sound in words like toy, boy and toil | The "oy" and "oi" sound in words like toy, boy and toil |
|  | 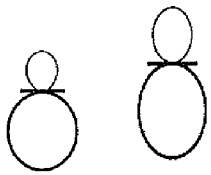 | 8  8 |
| The "oo" sound in words like look, book, cook and took | The "oo" sound in words like look, book, cook and took | The "oo" sound in words like look, book, cook and took |
|  | 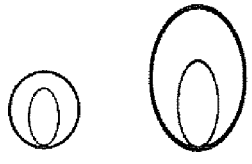 | o6 O6 |
| The short "a" sound in words such as cat, bat and fat. | The short "a" sound in words such as cat, bat and fat. | The short "a" sound in words such as cat, bat and fat. |
|  | 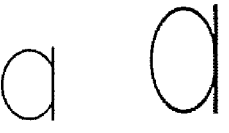 | a  A |

Fig. 1B

| Cursive<br>Lowercase Uppercase | Print<br>Lowercase Uppercase | Phonetoseji<br>Lowercase Uppercase |
|---|---|---|
| The long "a" sound in words such as takes, stake, make and fake. | The long "a" sound in words such as takes, stake, make and fake. | The long "a" sound in words such as takes, stake, make and fake. |
|  |  | a2 A2 |
| The short "u" sound in words like cup and the a sound in about. | The short "u" sound in words like cup and the a sound in about. | The short "u" sound in words like cup and the a sound in about. |
|  |  | a3 A3 |
| Short "e" as in the words met and pet. | Short "e" as in the words met and pet. | Short "e" as in the words met and pet. |
|  |  | e E |
| The long "e" sound in words like sneak and feet. | The long "e" sound in words like sneak and feet. | The long "e" sound in words like sneak and feet. |
|  | 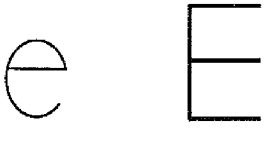 | e2 E2 |

Fig. 1C

| Cursive Lowercase Uppercase | Print Lowercase Uppercase | Phonetoseji Lowercase Uppercase |
|---|---|---|
| The sort "i" sound in words like mitt, kit and sit. | The sort "i" sound in words like mitt, kit and sit. | The sort "i" sound in words like mitt, kit and sit. |
|  | i    I | i    I |
| The long "i" sound in words like mike, right and might. | The long "i" sound in words like mike, right and might. | The long "i" sound in words like mike, right and might. |
|  | ↓    ⟊ | i2    I2 |
| The "u" sound in hull. | The "u" sound in hull. | The "u" sound in hull. |
|  | u    U | u    U |
| The long "u" sound in the words you, view and fuse. | The long "u" sound in the words you, view and fuse. | The long "u" sound in the words you, view and fuse. |
| 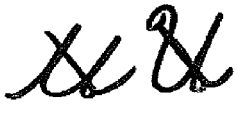 | ᴎ    ᴎ | u2    U2 |

Fig. 1D

| Cursive Lowercase Uppercase | Print Lowercase Uppercase | Phonetoseji Lowercase Uppercase |
|---|---|---|
| The short "r" sound in words like raid, rocket and Ross. | The short "r" sound in words like raid, rocket and Ross. | The short "r" sound in words like raid, rocket and Ross. |
|  |  | r R |
| The long "r" sound in words like market, are and dark. | The long "r" sound in words like market, are and dark. | The long "r" sound in words like market, are and dark. |
|  |  | r2 R2 |
| The "or" sound as in words like door, or and more. | The "or" sound as in words like door, or and more. | The "or" sound as in words like door, or and more. |
|  |  | r3 R3 |
| The "m" in the words like mark. | The "m" in the words like mark. | The "m" in the words like mark. |
| | | m M |

Fig. 1E

| Cursive Lowercase Uppercase | Print Lowercase Uppercase | Phonetoseji Lowercase Uppercase |
|---|---|---|
| The "n" sound in the word name. | The "n" sound in the word name. | The "n" sound in the word name. |
| ɳ 𝓃 | n N | n N |
| The "n" sound in the word English, wedding and fighting. | The "n" sound in the word English, wedding and fighting. | The "n" sound in the word English, wedding and fighting. |
| ȸ ȸ | ȹ ȹ | n2 N2 |
| The "w" sound in with, white and wide. | The "w" sound in with, white and wide. | The "w" sound in with, white and wide. |
| 𝓌 𝒲 | w W | w W |
| The "y" sound in words like young, yummy and yoke. | The "y" sound in words like young, yummy and yoke. | The "y" sound in words like young, yummy and yoke. |
| 𝓎 𝒴 | y Y | y Y |

Fig. 1F

| Cursive<br>Lowercase uppercase | Print<br>Lowercase Uppercase | Phonetoseji<br>Lowercase Uppercase |
|---|---|---|
| *p P* (cursive) | p P | p P |
| The "b" sound in words like bar and bail. | The "b" sound in words like bar and bail. | The "b" sound in words like bar and bail. |
| *b B* (cursive) | b B | b B |
| The "t" sound in words like tee, toast and toe. | The "t" sound in words like tee, toast and toe. | The "t" sound in words like tee, toast and toe. |
| *t T* (cursive) | t T | t T |
| The "d" sound in words like do and down. | The "d" sound in words like do and down. | The "d" sound in words like do and down. |
| *d D* (cursive) | d D | d D |
| The "ch" sound in words like check, picture and choice. | The "ch" sound in words like check, picture and choice. | The "ch" sound in words like check, picture and choice. |
| *ch Ch* (cursive) | ⊕ ⌽ | ch Ch |

Fig. 1G

| Cursive<br>Lowercase uppercase | Print<br>Lowercase Uppercase | Phonetoseji<br>Lowercase Uppercase |
|---|---|---|
| The "j" sound in words like jack and jade. | The "j" sound in words like jack and jade. | The "j" sound in words like jack and jade. |
|  | J J | j J |
| The "k" sound in the words like kick and coat. | The "k" sound in the words like kick and coat. | The "k" sound in the words like kick and coat. |
|  | k K | k K |
| The "g" sound in words like good and gum. | The "g" sound in words like good and gum. | The "g" sound in words like good and gum. |
|  | g G | g G |
| The "f" sound in words like foot and phone. | The "f" sound in words like foot and phone. | The "f" sound in words like foot and phone. |
|  | f F | f F |
| The "v" sound in words like venison and vote. | The "v" sound in words like venison and vote. | The "v" sound in words like venison and vote. |
|  | v V | v V |

Fig. 1H

| Cursive<br>Lowercase uppercase | Print<br>Lowercase Uppercase | Phonetoseji<br>Lowercase Uppercase |
|---|---|---|
| The "th" sound in the words thought and threw. | The "th" sound in the words thought and threw. | The "th" sound in the words thought and threw. |
|  | 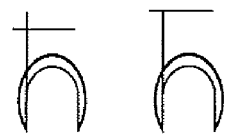 | th Th |
| The "th" sound in words like the and that | The "th" sound in words like the and that | The "th" sound in words like the and that |
|  | 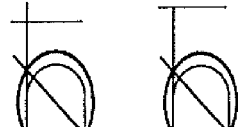 | th2 Th2 |
| The "s" sound in words like sandwich sand and sun. | The "s" sound in words like sandwich sand and sun. | The "s" sound in words like sandwich sand and sun. |
|  |  | s S |
| The "z" sound in words like zipper and zoo. | The "z" sound in words like zipper and zoo. | The "z" sound in words like zipper and zoo. |
|  | 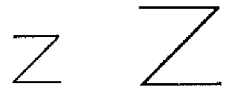 | z Z |

Fig. 1I

| Cursive<br>Lowercase uppercase | Print<br>Lowercase Uppercase | Phonetoseji<br>Lowercase Uppercase |
|---|---|---|
| The "sh" in words like sheep and ship. | The "sh" in words like sheep and ship. | The "sh" in words like sheep and ship. |
| *(cursive)* | *(print)* | sh Sh |
| The "g" sound in words like fuselage and garage. | The "g" sound in words like fuselage and garage. | The "g" sound in words like fuselage and garage. |
| *(cursive)* | *(print)* | z2 Z2 |
| The "l" sound in words like long and look. | The "l" sound in words like long and look. | The "l" sound in words like long and look. |
| *(cursive)* | *(print)* | l L |
| The "h" sound in words like huge and hug. | The "h" sound in words like huge and hug. | The "h" sound in words like huge and hug. |
| *(cursive)* | *(print)* | h H |

Fig. 1J

| Cursive<br>Lowercase uppercase | Print<br>Lowercase Uppercase | Phonetoseji<br>Lowercase Uppercase |
|---|---|---|
| The past tense "d" sound in words like tested and timed. | The past tense "d" sound in words like tested and timed. | The past tense "d" sound in words like tested and timed. |
|  |  | ed ED |
| The past tense "t" sound in words like worked and warped. | The past tense "t" sound in words like worked and warped. | The past tense "t" sound in words like worked and warped. |
|  | 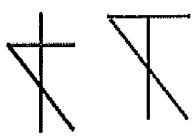 | et ET |
| Plural "s" as in words like campers and humans. | Plural "s" as in words like campers and humans. | Plural "s" as in words like campers and humans. |
|  |  | sS |
| Plural and possessive "s" as in words like campers and humans. | Plural and possessive "s" as in words like campers and humans. | Plural and possessive "s" as in words like campers and humans. |
| 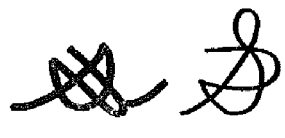 | 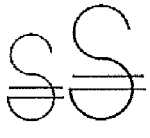 | s' S' |

Fig. 1K

| Cursive<br>Lowercase uppercase | Print<br>Lowercase Uppercase | Phonetoseji<br>Lowercase Uppercase |
|---|---|---|
| Possessive "s" as in that is Bob's | Possessive "s" as in that is Bob's | Possessive "s" as in that is Bob's |
| | | 's 'S |
| Plural "z" sound in the word eyes. | Plural "z" sound in the word eyes. | Plural "z" sound in the word eyes. |
| | | z Z |
| The plural and possessive "z" in the word eyes' | The plural and possessive "z" in the word eyes' | The plural and possessive "z" in the word eyes' |
| | | z' Z' |
| Possessive "z" sound in the word eye's. | Possessive "z" sound in the word eye's. | Possessive "z" sound in the word eye's. |
| | | z Z |

Fig. 1L

Fig. 1O
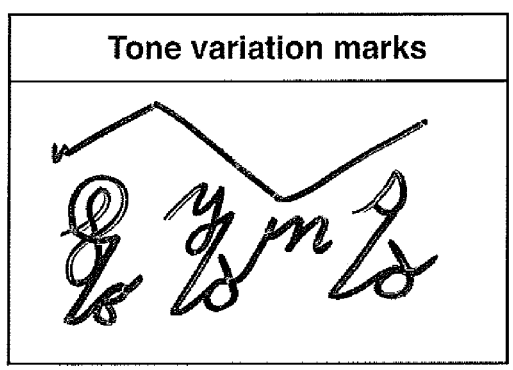
Tone variation marks
Fig. 1P
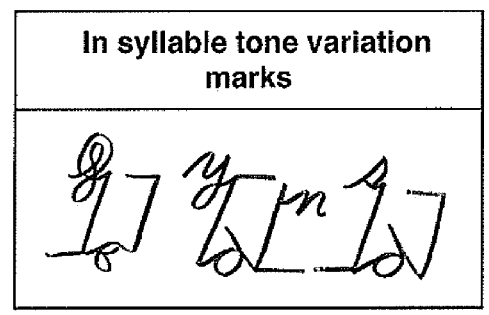
In syllable tone variation marks
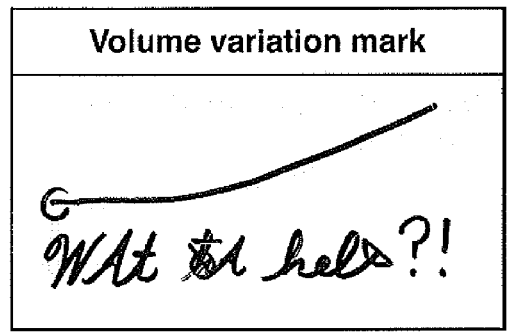
Volume variation mark
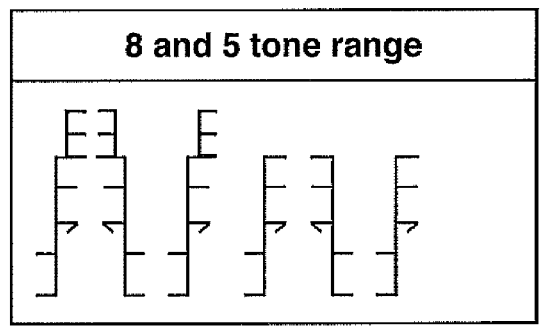
8 and 5 tone range
Fig. 1Q
Fig. 1R

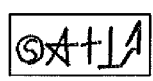 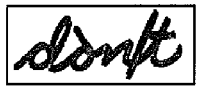   
fig. 1S     fig. 1T     fig. 1U     fig. 1V     fig. 1W
 
fig. 1X     fig. 1Y

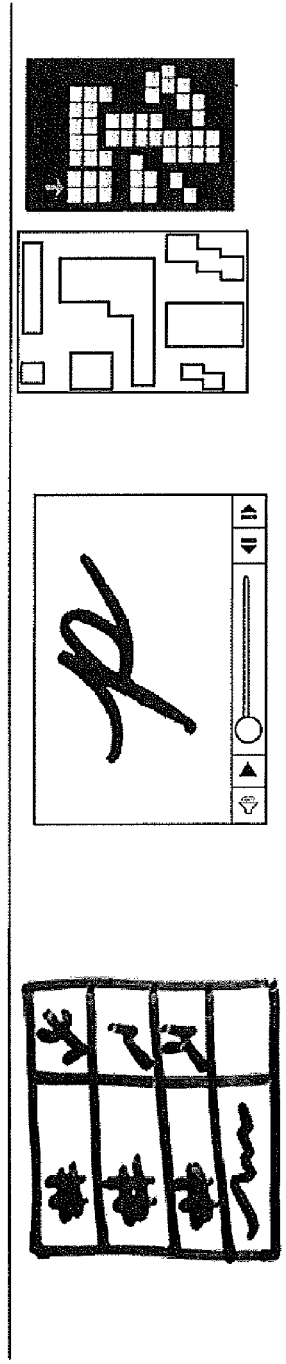
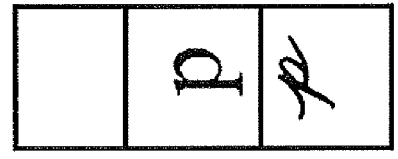
Fig. 2A

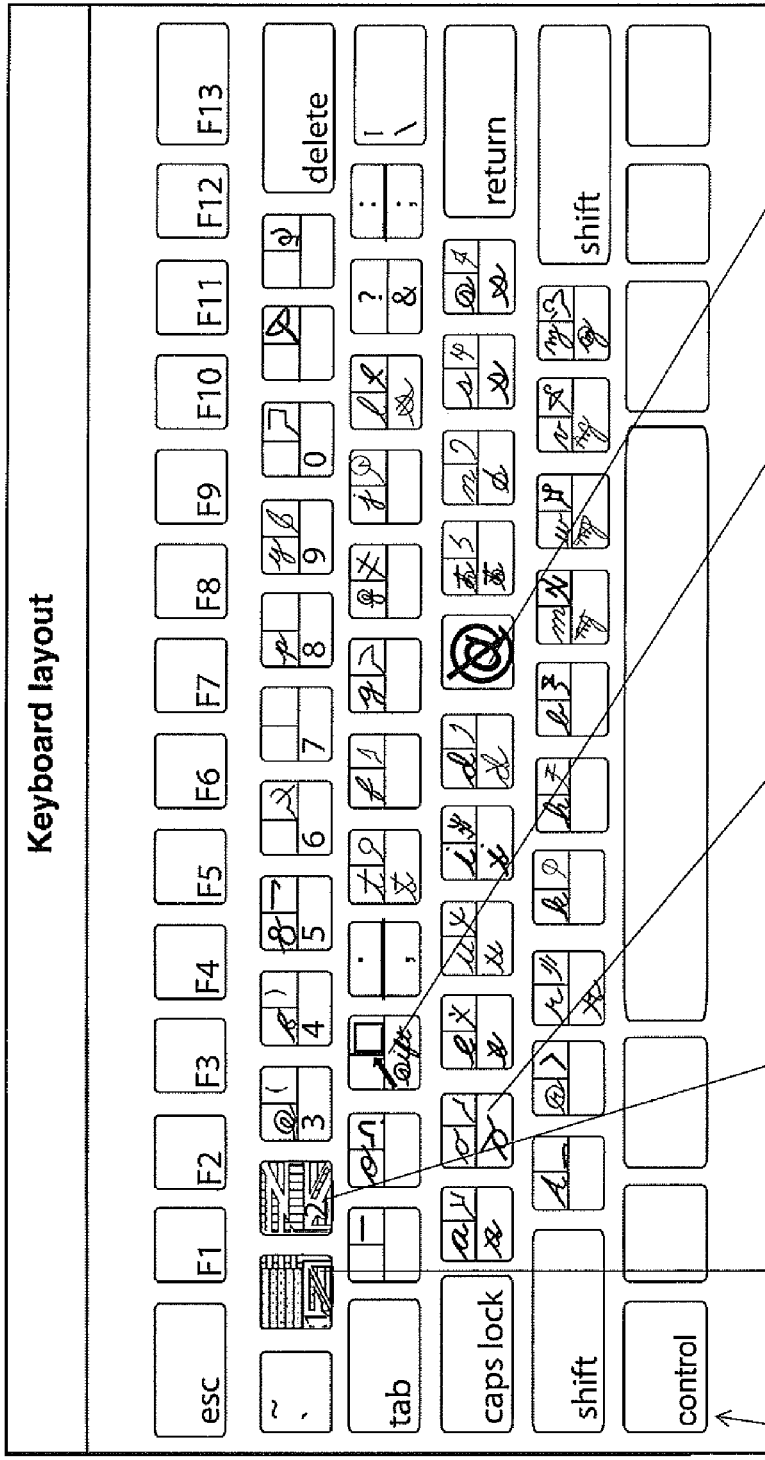
Fig. 3
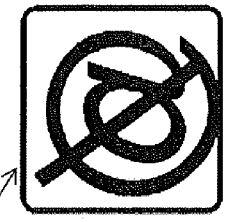
Fig. 3E
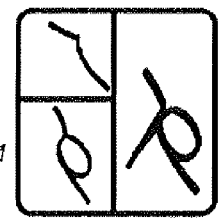
Fig. 3D
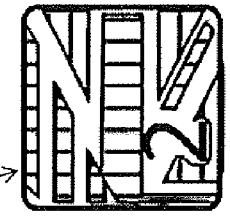
Fig. 3C
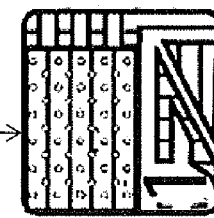
Fig. 3B
Fig. 3A

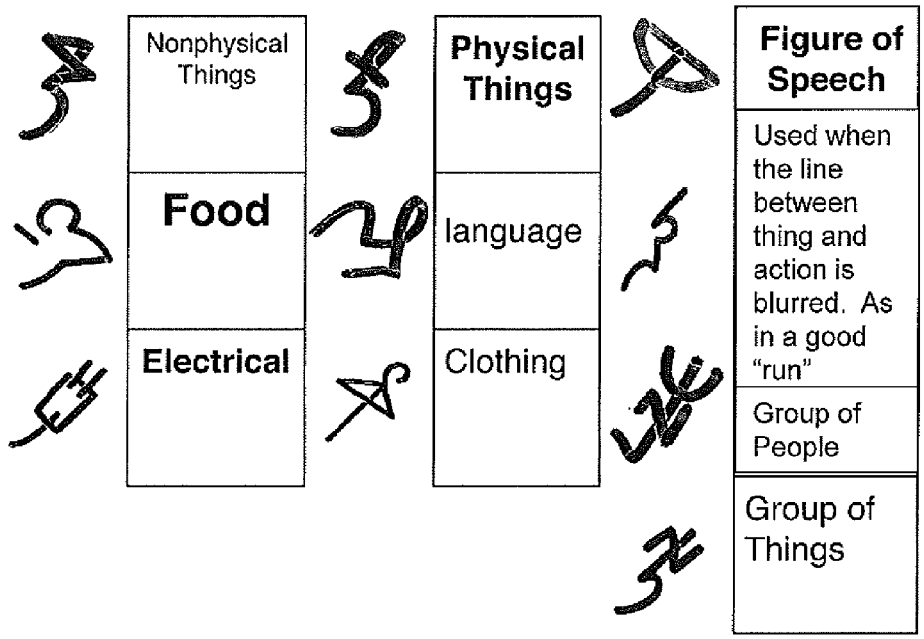
Fig. 4B
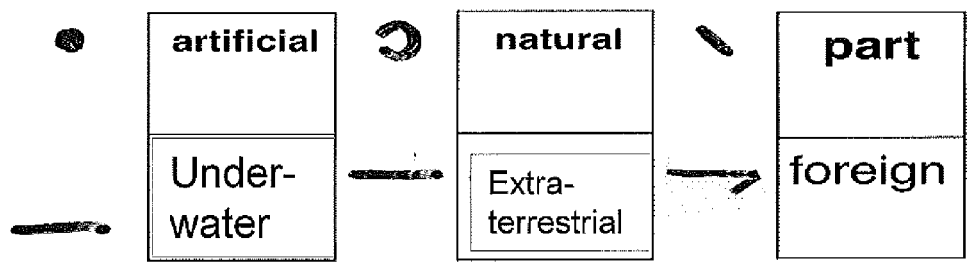
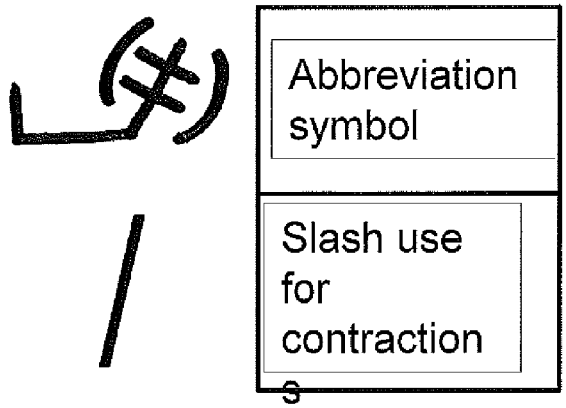
Fig. 4C

Fig. 5A
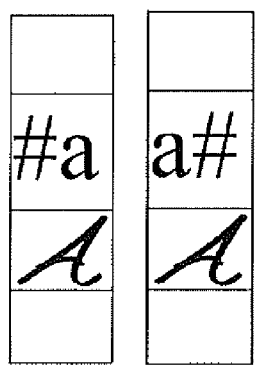
Fig. 5C
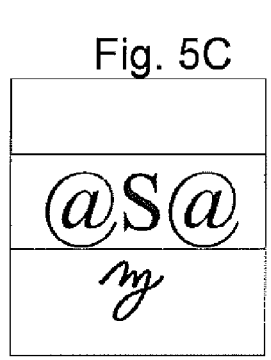
Fig. 5D
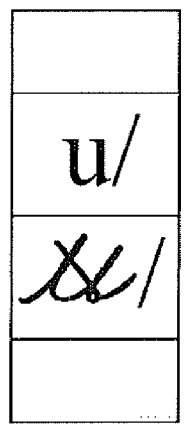
Fig. 5B(i)  Fig. 5B(ii)
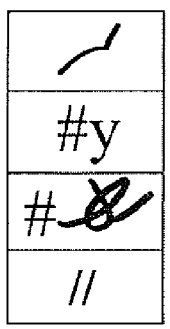 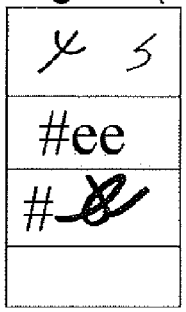
} Fig 5B
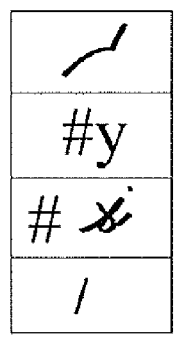 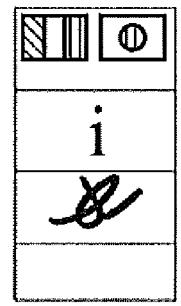
Fig. 5B(iii)  Fig. 5B(iv)
Fig 5

English Grid sample Page

| *o* |

| au# | #aw |

| #aw | k |
| #aw | n | *aunt |
| #aw | l | *ont |

| al* | ol@ |

| omni# | #ought |

Fig. 5E

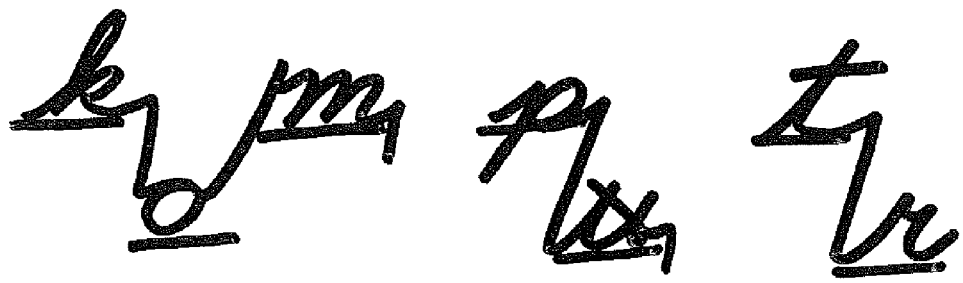
Fig. 8
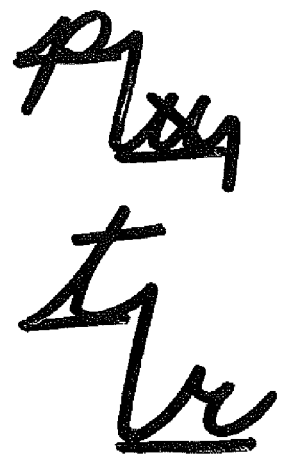
Fig. 9

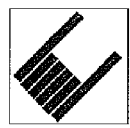  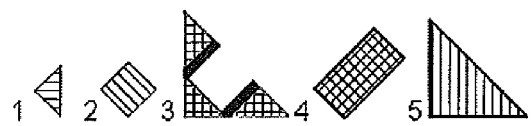  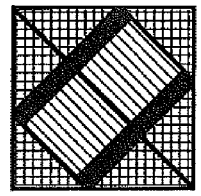
fig. 12　　　　　　　　fig. 13　　　　　　　　fig. 14
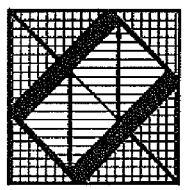
fig. 15
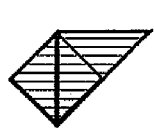　　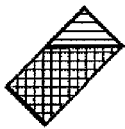　　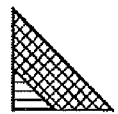
fig. 16A 1+1+1=3　　fig. 16B 3+1=4　　fig. 16C 4+1=5
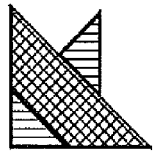　　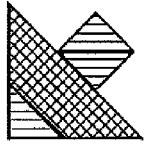　　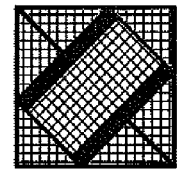
fig. 16D 4+2=6　　fig. 16E 4+3=7　　fig. 16F 6+4=10

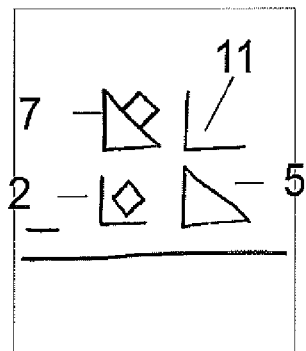
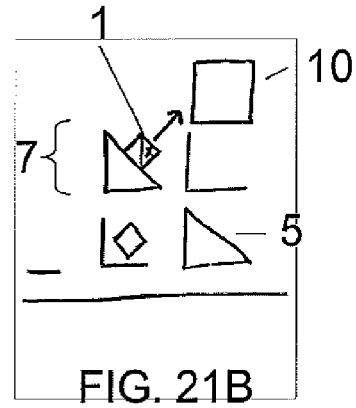
FIG. 21A  FIG. 21B
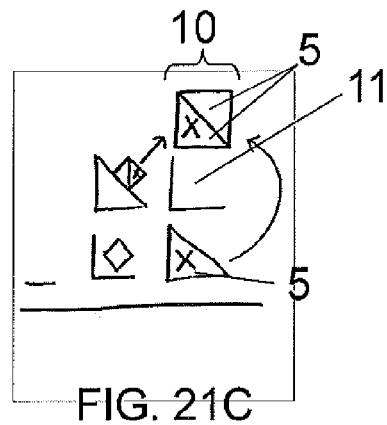
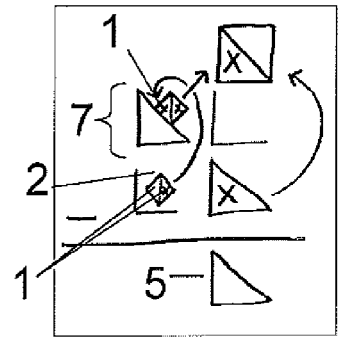
FIG. 21C  FIG. 21D
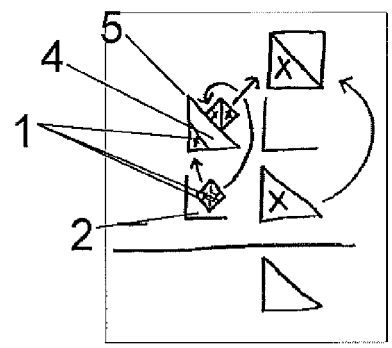
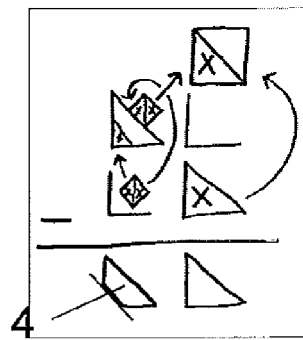
FIG. 21E  FIG. 21F

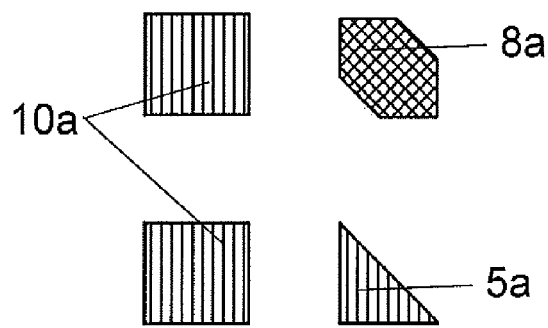
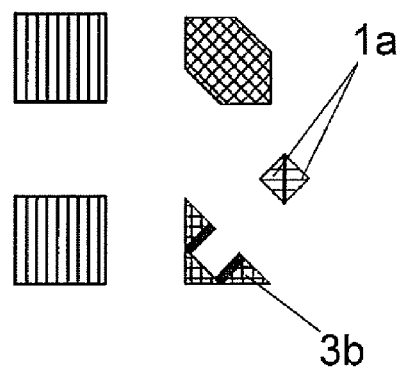
FIG. 25A          FIG. 25B
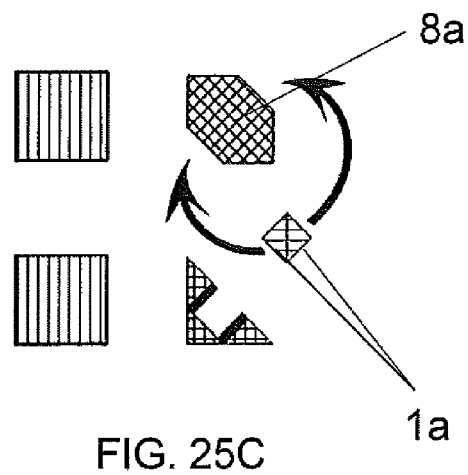
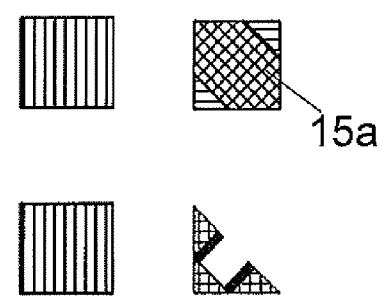
FIG. 25C          FIG. 25D
FIG. 25E

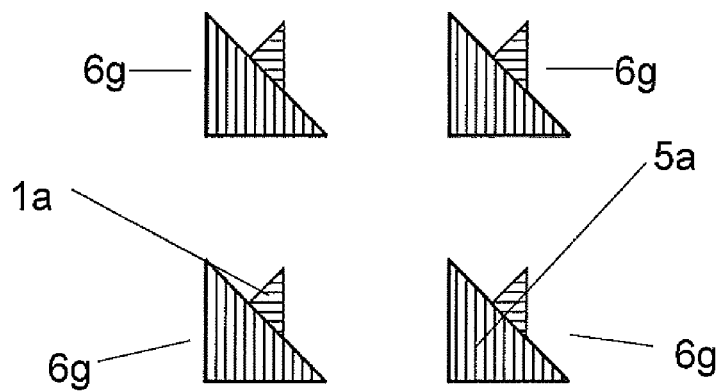
FIG. 28A
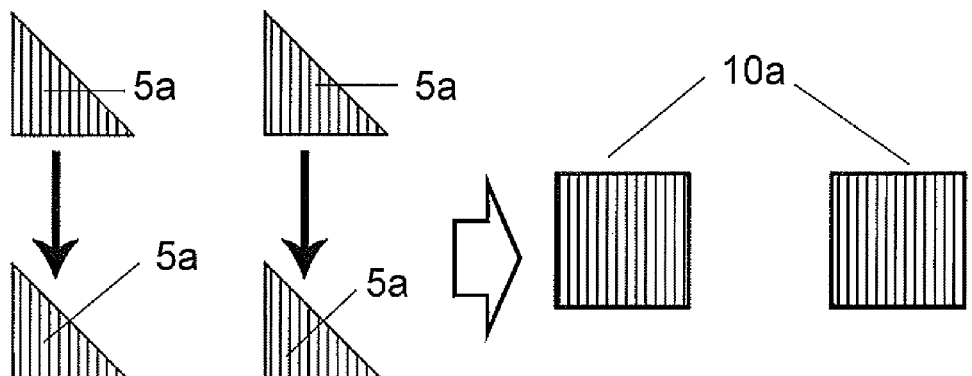
FIG. 28b
FIG. 28C
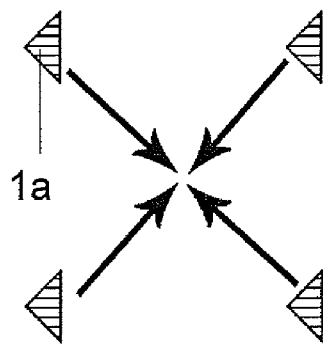
FIG. 28D
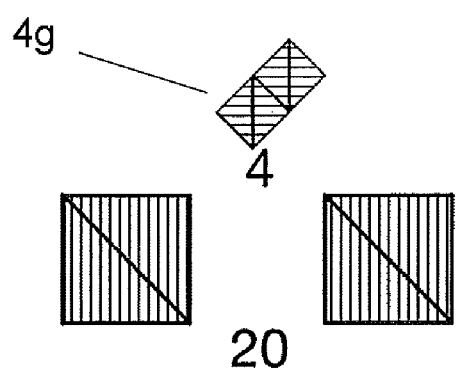
FIG. 28E

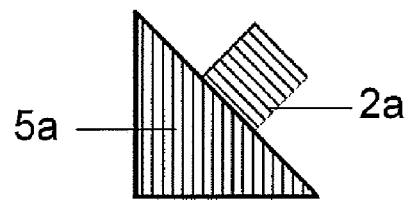
FIG. 32A
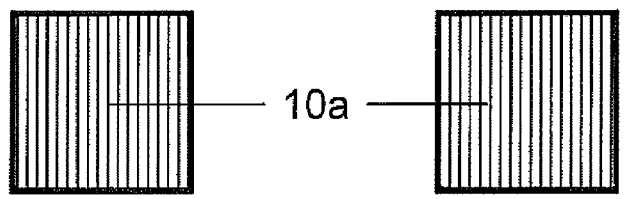
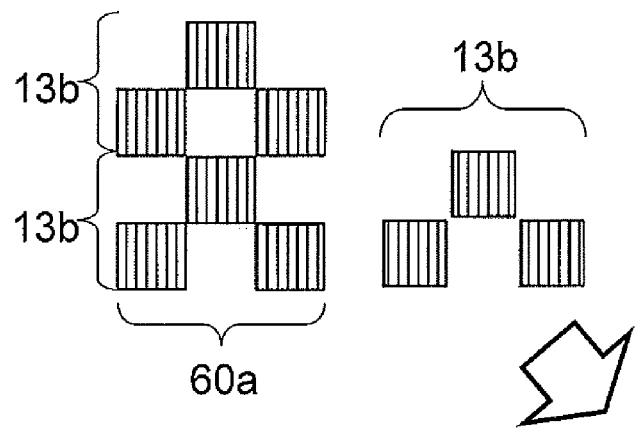
FIG. 32B
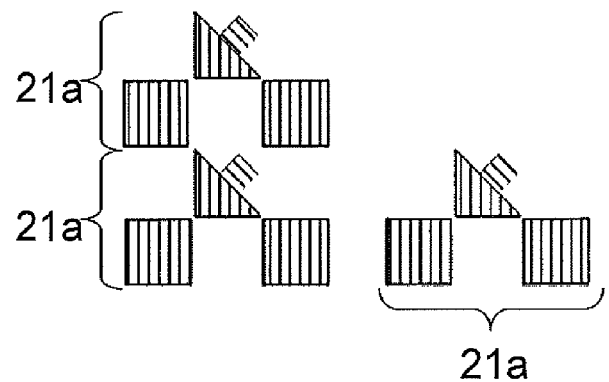
FIG. 32C

FIG. 38A
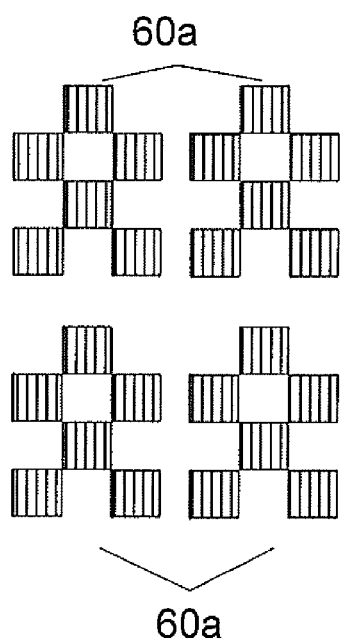
FIG. 38B
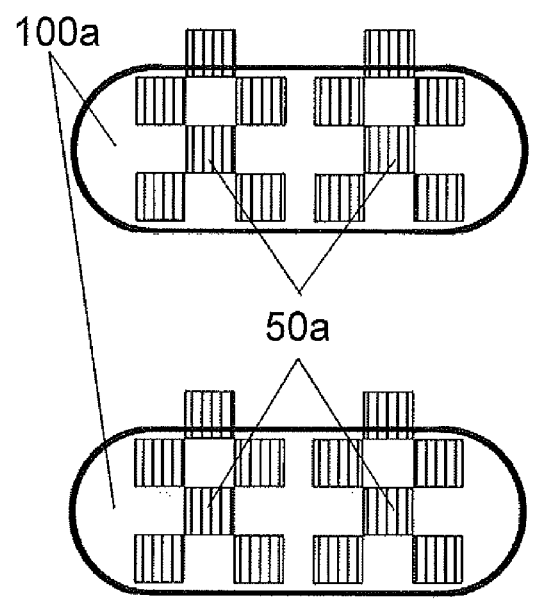
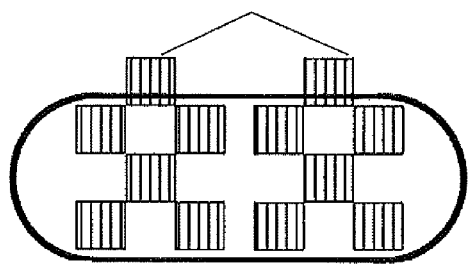
FIG. 38C
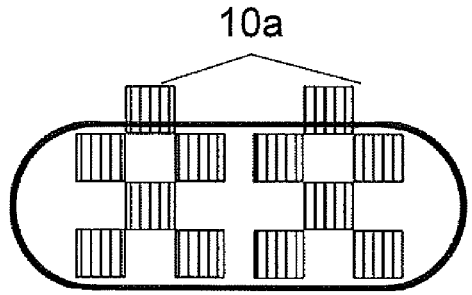

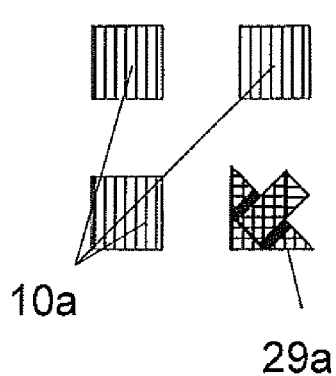
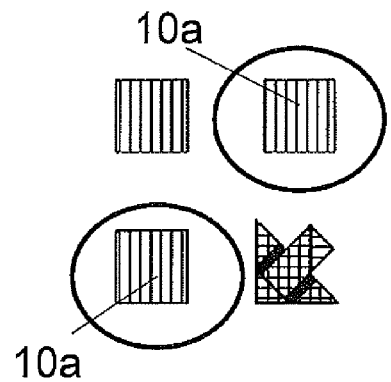
FIG. 43A          FIG. 43B
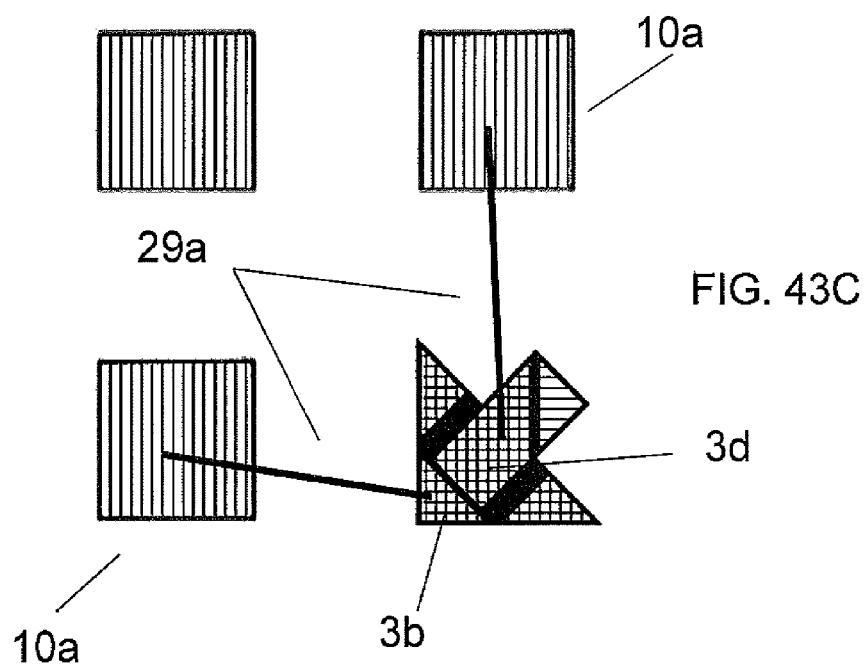
FIG. 43C

32d

33a

33b

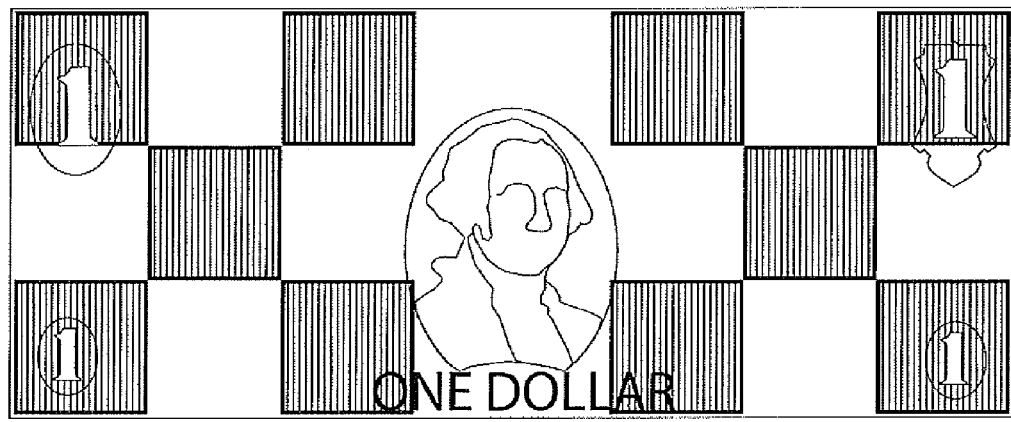
35a
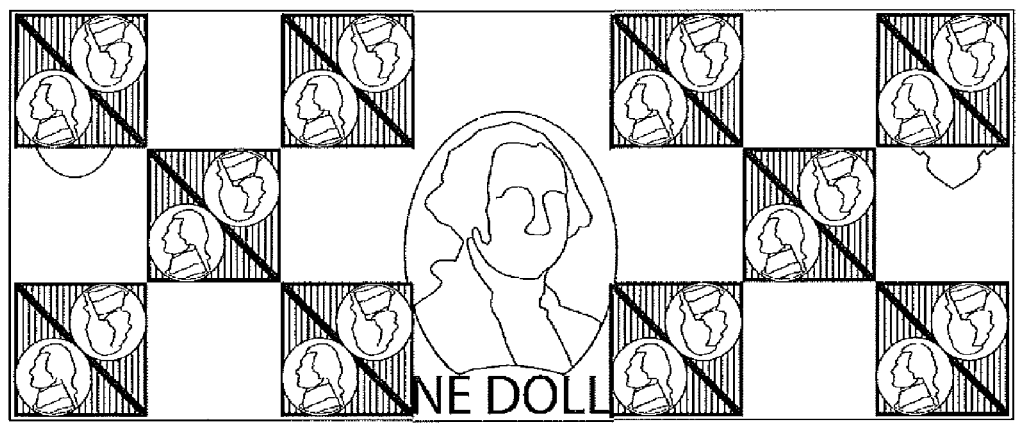
35b
FIG. 55

3b  3bb

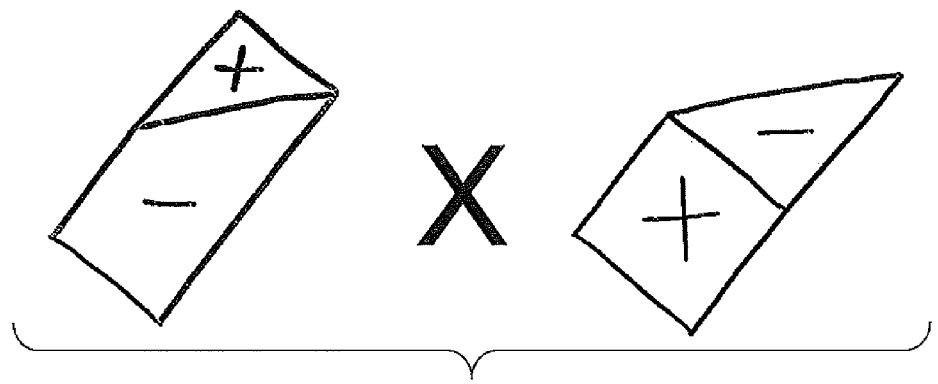
44a
FIG. 64A
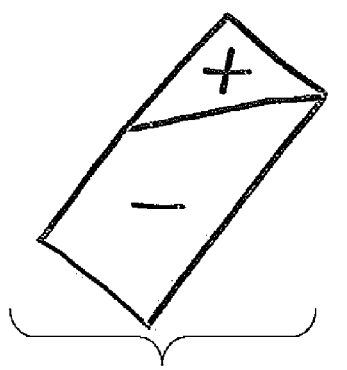
44b
FIG. 64B
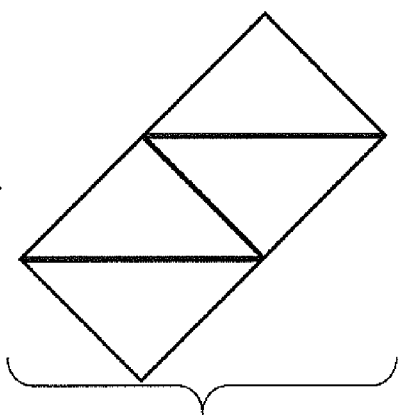
44c
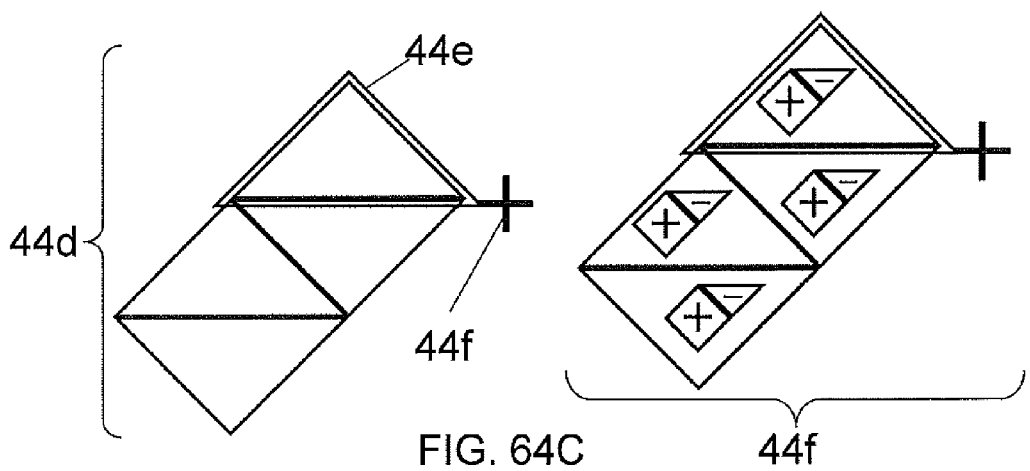
FIG. 64C (1 2/7)

+ (2 6/7)

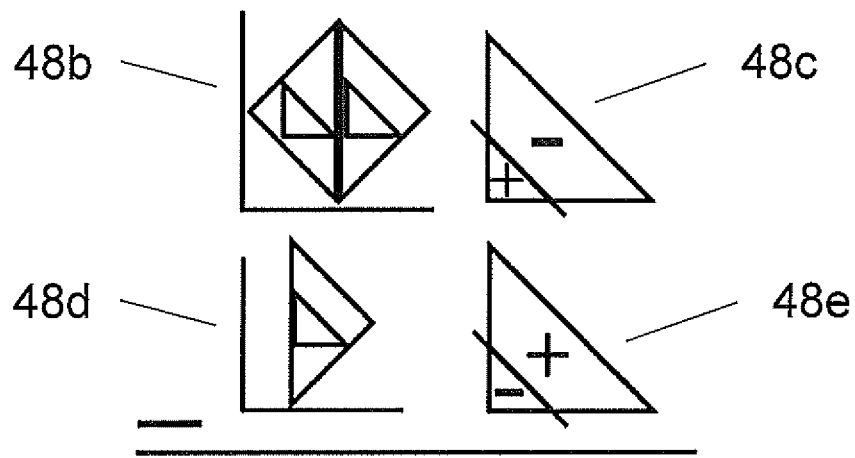
FIG. 68A
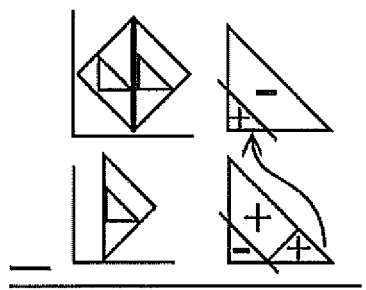 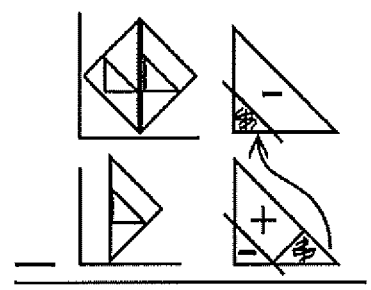
FIG. 68B  FIG. 68C

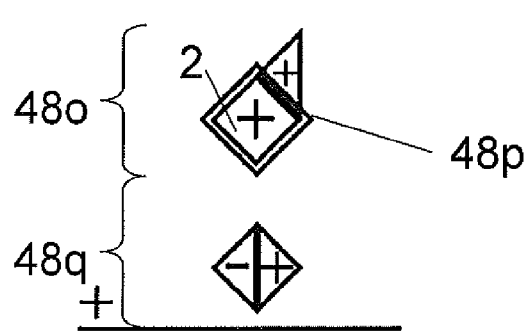
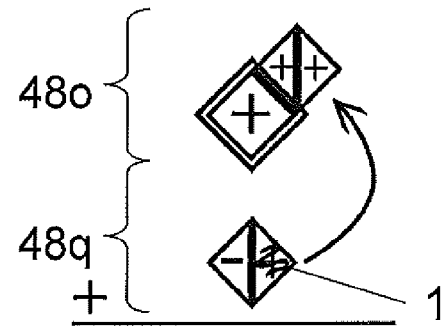
FIG. 69A  FIG. 69B
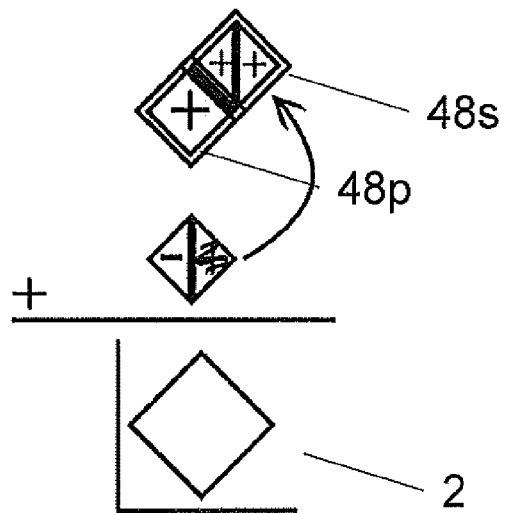
FIG. 69C

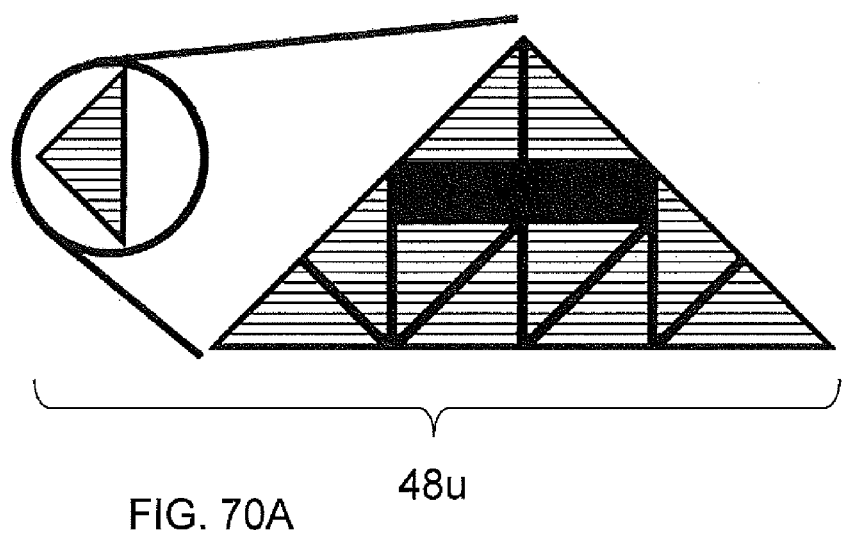
FIG. 70A    48u
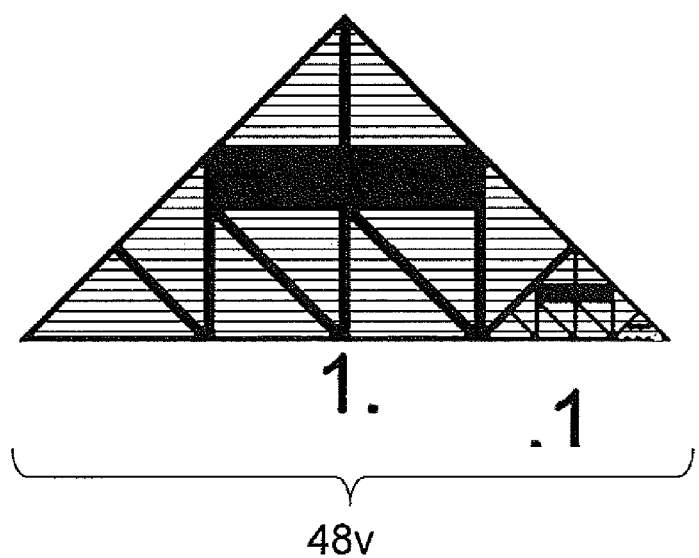
48v
FIG. 70B

METHODS AND APPARATUS FOR TEACHING READING AND MATH SKILLS TO INDIVIDUALS WITH DYSLEXIA, DYSCALCULIA, AND OTHER NEUROLOGICAL IMPAIRMENTS

CROSS-REFERENCE TO RELATED APPLICATIONS

This is a Continuation In Part application of non-provisional application U.S. Ser. No. 12/927,356, titled Methods and Apparatus for Teaching Reading and Math Skills to Individuals with Dyslexia and Other Neurological Impairments, including Phonetose, SHAPE MATH™, Conceptual Clarifiers, Internet Speaking Reference Chart, Speaking Phonetose Program, Phonetic Hangman, Alternating Line Highlighting, and English Grid, filed Nov. 12, 2010, which claims priority from U.S. Provisional Patent Application No. 61/260,481, titled METHODS AND APPARATUS FOR TEACHING READING AND MATH SKILLS TO INDIVIDUALS WITH DYSLEXIA AND OTHER NEUROLOGICAL IMPAIRMENTS, INCLUDING PHONETOSE, SHAPE MATH™ CONCEPTUAL CLARIFIERS, INTERNET SPEAKING REFERENCE CHART, SPEAKING PHONETOSE PROGRAM, PHONETIC HANGMAN, ALTERNATING LINE HIGHLIGHTING, AND ENGLISH GRID, filed Nov. 12, 2009, both pre-incorporated herein by reference.

FIELD OF THE INVENTION

Teaching methods and apparatus for teaching reading and math skills to individuals with dyslexia and other neurological impairments.

BACKGROUND OF THE INVENTION

Dyslexia is a learning disorder that manifests itself primarily as a difficulty with reading and spelling. It is separate and distinct from reading difficulties resulting from other causes, such as a non-neurological deficiency with vision or hearing, or from poor or inadequate reading instruction. It is estimated that dyslexia affects between 5% to 17% of the U.S. population.

Although dyslexia is thought to be the result of a neurological difference, it is not an intellectual disability. Dyslexia is diagnosed in people of all levels of intelligence: below average, average, above average, and highly gifted.

Dyslexia symptoms vary according to the severity of the disorder as well as the age of the individual.

Pre-school age children. It is difficult to obtain a certain diagnosis of dyslexia before a child begins school, but many dyslexic individuals have a history of difficulties that began well before kindergarten. Children who exhibit these symptoms have a higher risk of being diagnosed as dyslexic than other children. Some of these symptoms are:
Learns new words slowly;
Has difficulty rhyming words, as in nursery rhymes;
Late in establishing a dominant hand.
Early elementary school-age children:
Difficulty learning the alphabet;
Difficulty with associating sounds with the letters that represent them (sound-symbol correspondence);
Difficulty identifying or generating rhyming words, or counting syllables in words (phonological awareness);
Difficulty segmenting words into individual sounds, or blending sounds to make words (phonemic awareness);
Difficulty with word retrieval or naming problems;
Difficulty learning to decode words;
Confusion with before/after, right/left, over/under, and so on;
Difficulty distinguishing between similar sounds in words; mixing up sounds in multisyllable words (auditory discrimination) (for example, "aminal" for animal, "bisghetti" for spaghetti).
Older elementary school children:
Slow or inaccurate reading.
Very poor spelling;
Difficulty associating individual words with their correct meanings;
Difficulty with time keeping and concept of time;
Difficulty with organization skills;
Due to fear of speaking incorrectly, some children become withdrawn and shy or become bullies out of their inability to understand the social cues in their environment;
Difficulty comprehending rapid instructions, following more than one command at a time or remembering the sequence of things;
Reversals of letters (b for d) and a reversal of words (saw for was) are typical among children who have dyslexia. Reversals are also common for children age 6 and younger who don't have dyslexia. But with dyslexia, the reversals persist;
Children with dyslexia may fail to see (and occasionally to hear) similarities and differences in letters and words, may not recognize the spacing that organizes letters into separate words, and may be unable to sound out the pronunciation of an unfamiliar word.

The complexity of a language's orthography, or writing and spelling system, has a direct impact on how difficult it is to learn to read in that language; formally, this is the orthographic depth. Although English has an alphabetic orthography, it is a complex or deep orthography that employs spelling patterns at several levels. The major structural categories that make up English spelling are letter-sound correspondences, syllables, and morphemes. Some other languages, such as Spanish, have alphabetic orthographies that employ only letter-sound correspondences, so-called shallow orthographies. It is relatively easy to learn to read in languages like Spanish; it is much more difficult to learn to read in languages that have more complex orthographies, as in English. Logographic writing systems, notably Chinese characters, pose additional difficulties.

From a neurological perspective, different types of writing, for example, alphabetic as compared to pictographic, require different neurological pathways in order to read, write and spell. Because different writing systems require different parts of the brain to process the visual notation of speech, children with reading problems in one language might not have a reading problem in a language with a different orthography. The neurological skills required to perform the tasks of reading, writing, and spelling can vary between different writing systems and as a result different neurological skill deficits can cause dyslexic problems in relation to different orthographies.

There is no cure for dyslexia, but dyslexic individuals can learn to read and write with appropriate educational support. For alphabet writing systems, the fundamental aim is to increase a child's awareness of correspondences between graphemes and phonemes, and to relate these to reading and spelling. It has been found that training focused towards visual language and orthographic issues yields longer-lasting gains than mere oral phonological training. The best approach is determined by the underlying neurological cause(s) of the dyslexic symptom.

People with dyslexia are often gifted in math. Their three-dimensional visualization skills help them "see" math concepts more quickly and clearly than non-dyslexic people. Unfortunately, difficulties in directionality, rote memorization, reading, and sequencing can make the math tasks so difficult that their math gifts are never discovered. In particular, many dyslexic children and teens have problems in some areas of math, especially the multiplication tables, fractions, decimals, percentages, ratio and statistics. Thus, good methods for teaching math to dyslexic individuals emphasize their visualization skills.

The present invention provides methods and apparatus for teaching reading and math skills to individuals with dyslexia and dyscalculia. The same methods and apparatus may also provide similar aid to individuals with similar cognitive disorders, such as aphasia. The tools of the present invention can be used in combination with other programs and systems. Primary users are dyslexics, but other customers could include students studying English as a second language and the Conceptual Clarifier's could be used by those suffering from aphasia and averbia. Conversely, the tools could also be used to help dyslexics learn other languages. The syllable form of PHONETOSE™ can be used by a student to help learn syllable languages such as Korean and Japanese. The tone system could also help a dyslexic student learn Mandarin or Cantonese Chinese.

SUMMARY OF INVENTION

The present invention includes a phonetic alphabet with clarifiers and modifiers that aid in the teaching of reading skills to individuals with dyslexia, dyscalculia, and other neurological impairments when the letters of present invention are connected horizontally in series with clarifiers and modifiers to form a word, a phrase, a sentence, and/or a paragraph. The present invention further includes mathematical symbols for teaching math skills to individuals with dyslexia, dyscalculia, and other neurological impairments when predetermined geometric shapes are arranged to form numbers of a base 10 counting system that are capable for using in additional, subtraction, multiplication, division. The present invention of mathematical symbols includes whole numbers, real numbers, integers, fractions, and decimals. The present invention also includes 2D and 3D tools and methods of using same.

One embodiment of the phonetic language system of the present invention includes: a letter guide that lists letters and corresponding sounds for a written orthography in one or more scripts for each letter; conceptual clarifiers for distinguishing homophones; and a letter organization system of the letters. The system further comprising a computer keyboard layout that converts the written orthography for use on a computer standard keyboard. The conceptual clarifiers are a series of abstract symbols positionable at an end of each homophone of the homphones to distinguish the each homophone from other homophones having the same phonetic spelling. The system further comprising a coding system including "@" for a vowel, "*" for a consonant, "#" for the rest of the word, and "/" for a syllable division. The system further comprises a computer-based system for constructing words on a timeline and generating the sound of the each letter in the written orthography. A computer-based system can include a display of the letters in the written orthography wherein activation of each letter generates the coding system and the sound for each letter.

BRIEF DESCRIPTION OF THE DRAWINGS

FIGS. 1A-1L are illustrations of the PHONETOSE™ letter guide, including a list of all the PHONETOSE™ letters and sounds they make in all three scripts in both upper and lower case;

FIG. 1O is an example of tone variation marks in of the present invention PHONETOSE™;

FIG. 1P is an example in "in syllable" tone variation marks of the present invention in PHONETOSE™;

FIG. 1Q is an example of the volume variation mark of the present invention in PHONETOSE™;

FIGS. 1S-1Y are the 8 and 5 tone range of the present invention in PHONETOSE™;

FIG. 2A is an example of how to look up homophones in the PHONETOSE™ letter organization system using the Internet speaking reference chart.

FIG. 3 is one embodiment of a PHONETOSE™ keyboard layout;

FIGS. 3A-E are magnified views of select keys of the keyboard shown is FIG. 3;

FIGS. 4A-C are the list of Conceptual Clarifiers;

FIGS. 5A-E are a list of English Grid examples;

FIG. 8 shows an example of the horizontal form of syllable PHONETOSE™ for the word "computer" in Phonetic Hangman;

FIG. 9 shows an example of the vertical form of syllable PHONETOSE™ for the word "computer" in Phonetic hangman;

FIGS. 11B-12 shows SHAPE MATH™ numbers 1-10, a fifty, one hundred and 60 pattern, and the zero spacers;

FIG. 13 shows the ascending SHAPE MATH™ colors;

FIGS. 14-15 show different kinds of ten shapes;

FIGS. 21 A-F show place value subtraction;

FIGS. 23-25 show manipulation within the ten shape pattern;

FIGS. 26-34 are examples of multiplication techniques;

FIGS. 35-38 demonstrate time conversion;

FIGS. 48-58E show SHAPE MATH™ currency and demonstrate its application;

FIGS. 59-69C show SHAPE MATH™ fractions and demonstrate their application; and

FIGS. 70-77 demonstrate the use of percentages in SHAPE MATH™.

DETAILED DESCRIPTION OF THE INVENTION

Figure 1M:
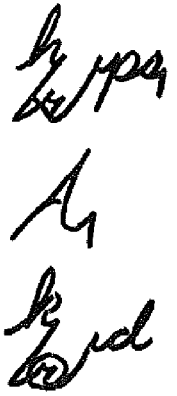
FIG. 1M is a list of syllable writing examples of the present invention in PHONETOSE™.

The present invention includes a phonetic alphabet with clarifiers and modifiers and mathematical symbols and methods of teaching and using same. The phonetic alphabet and method of teaching and use is referred to herein as PHONETOSE™. The mathematical symbols and method of use is referred to herein as SHAPE MATH™. The present invention discloses examples of color schemes associated with numbers or symbols or blocks or geometry shapes. There examples are for illustrative purposes and are not meant to limit the invention.

Phonetose™

PHONETOSE™ or "Fa3nedo2s" is a one-to-one phonemic correspondence alternative written orthography for English that is used as a tool to help dyslexic phonemic awareness and used for many of the other inventions as a reference tool. The principal design is to help dyslexics learn to read by allowing them to learn each sound in English without the confusion of digraphs trigraphs and diphthongs. PHONETOSE™ is designed to avoid many of the problems of other writing systems by applying an understanding of the unique difficulties of dyslexics. The principles and concepts of PHONETOSE™ are described below.

Letter Properties. Every letter follows the principle of self containment, the principle that each letter is unique and without the use of diacritics, which are symbols above or below the character to distinguish sounds. However, PHONETOSE™ does have its own set of modifiers. The key to these modifiers is that they are in the same horizontal, linear visual path as the letter they are modifying (for example, the modifier is not above or below the adjacent character. This avoids the visual tracking difficulties that come with severe dyslexia. With diacritics, a severe dyslexic can read through the word and miss the diacritics because they are not in the same visual path. These modifiers are a backwards slash over a character and a circle made from the last line of the character similar to the circle around the "@" sign. However, these letters with the modifiers should be taught as wholly unique letters. This is similar to how the Korean alphabet is taught as a syllable language like Japanese when its syllable parts could be taught as separate components. There are also many letters that are wholly unique to PHONETOSE™. Many of these are combinations of the two letters that make the Digraph of these sounds in English. This fusion allows for a more easy transition to English writing. While other letters have absolutely no connection to written English.

PHONETOSE™ letters do not have names as in English were a "w" is called "doubleyoo". In PHONETOSE™, the name of the letter is the sound it makes. The Japanese also use the system of not having names for their letters. To further clarify a sound you can refer to its characteristics. For instance, you could say whether it is a constant sound like "h" or a sound with a quick attack like "k". It could be a voiced sound like "b" or an unvoiced sound like "p". It can be a consonant or vowel. Notably, a vowel in PHONETOSE™ is a little bit different than in English. A vowel in PHONETOSE™ is a sound that is made entirely with the voice box and is one of the sounds required to be paired with a consonant to make a syllable. These classifying characteristics clear up the confusion between vowels and consonant that is found in other classifying systems where "h", "w" and "r" are in a lingual limbo. The reason there are no names for the letters is so the student will think of the sound and not its name. The names of letters are a form of disassociation that can cause another layer of confusion that a student must then filter through. This is not a problem in PHONETOSE™.

There are multiple types of PHONETOSE™ script. There are Cursive, Printed and PHONETOSEJI™ forms. The first two are as their names suggest but the third one is a bit more complicated. PHONETOSEJI™ is a way of typing PHONETOSE™ on a conventional QWERTY keyboard without special software. It is very similar to the Romanization of the Japanese language in that it is a Romanized version of PHONETOSE™. It uses a combination of letters and numbers that correlate to the single letters of the other two script forms. Letter/number combinations correlate to the placement of the characters in the letter chart of all the PHONETOSE™ letters (see FIG. 2). For example, in this script the "or" sound in English would be expressed "r3" because this sound is the third "r" sound. This is not the preferred PHONETOSE™ script and is only used when access to a PHONETOSE™ keyboard is not available. It lacks the one to one phonemic correspondence of the other scripts but the fact that numbers are used for the digraphs instead of two letters eliminates a lot of the confusion that comes from English spellings. Most importantly, these letter/number combinations are 100% consistent. Also, three consonant digraphs are reintroduced for this form; ch, th, sh. It is less confusing to reintroduce these than to give them letter/number combinations. As a teaching tool, this PHONETOSE™ script can be used as a transition step to get the student used to tracking two characters to make a single sound in a 100% consistent environment. This is a crucial step to learning many languages including French and English.

Letter Sounds. Referring to FIGS. 1A-L, PHONETOSE™ has a Letter Guide that lists forty-nine (49) PHONETOSE™ letters and sounds they make in all three scripts in both upper and lower case. The letters "C". "Q," and "X" are not included in the present invention phonetic alphabetic.

Conceptual Clarifiers. Now referring to FIGS. 4A-C, the Conceptual Clarifiers are the homophone distinguishing system for PHONETOSE™. It is a series of symbols that only come at the end of a word that distinguish words that sound the same but have different meanings from each other. A more complete explanation of Conceptual Clarifiers, as well as a list of the Conceptual Clarifiers and their meanings can be found below in the section named "Conceptual Clarifiers."

Figure 2:
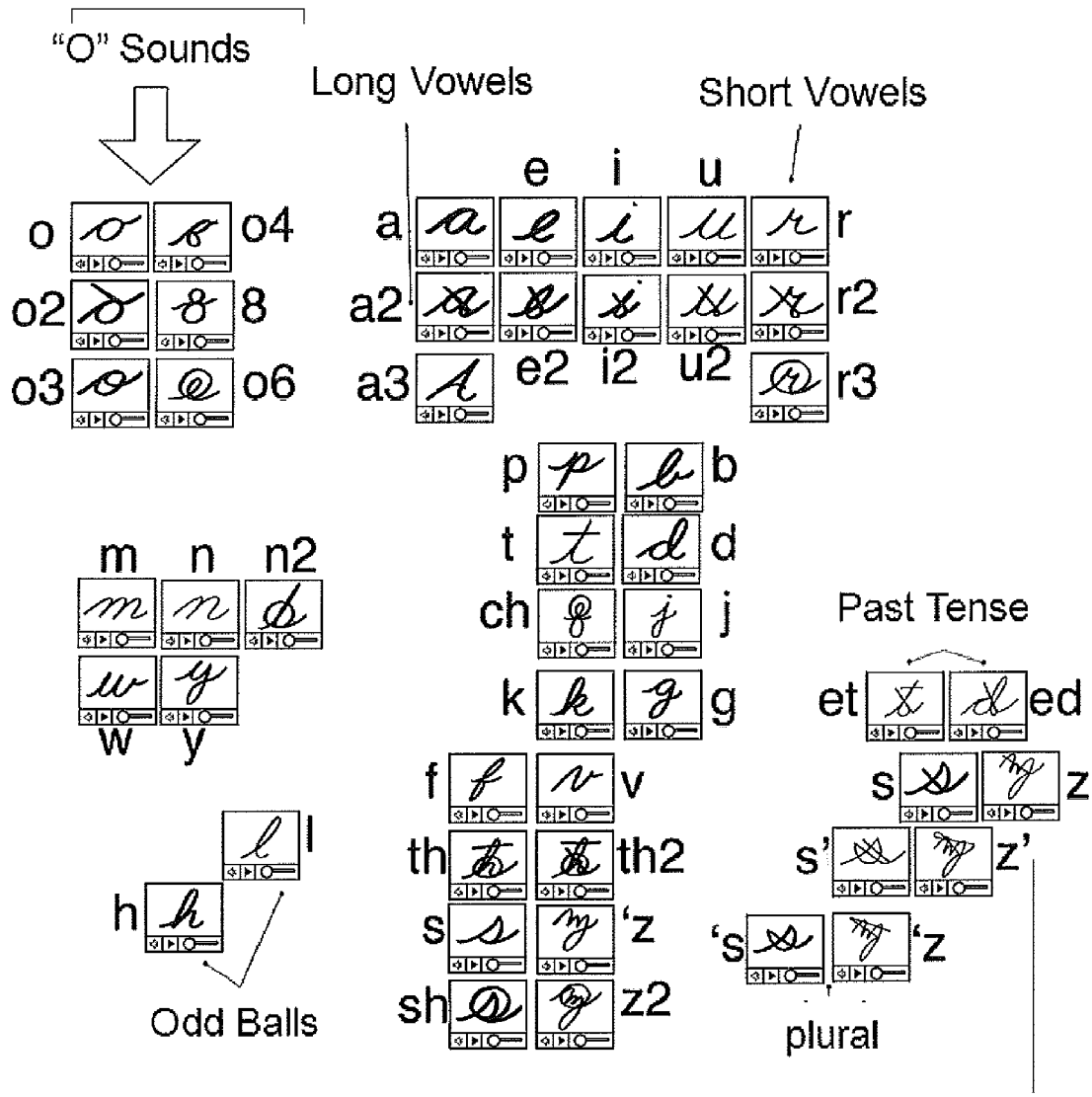
FIG. 2 is an exemplary letter organization system of PHONETOSE™.

Grouping System. Referring to FIG. 2 (PHONETOSE™ Letter Organization System), the PHONETOSE™ letter grouping system and alphabetical order are based from a few principles applied to several different areas of letter groups. The first group is the sounds that "o" makes. This section is comprised of six letters. The short "o" sound comes first as it does with all of the vowels. Next comes the long "o" which follows the pattern of the rest of the vowels. If the explanation of these groupings is to be practical and in order to eliminate the need to explain what sound I am referring to multiple times I will now switch to the PHONETOSEJI™ script for these sounds. Next is o3 which is placed in the last row of the first column so it is next to the letter it is most similar to which is o6. It is followed by o4 which is in the first row of the second column so it is next to the short "a" sound, which is the sound it is most similar to. Underneath that is the sound "8" which is there because this sound, if reversed, makes an o2 sound. The o6 is last and its placement has already been explained with the placement of o3.

The rest of the vowels are grouped in a separate section. The first row is made up of the short forms of the letters. As mentioned in the chart, this "u" makes the particular "u" sound found in the word hull. This is because this is the only sound wholly unique to "u" and, as a PHONETOSE™ principle, when a letter is used to make multiple sounds in English it only makes one unique sound in PHONETOSE™. This is the same reason that "y" only makes the "y" sound in words like young, even though it can make 4 other sounds in English; i, i2, e2 and a2. The next row is all the long forms of vowels. The following row is the third form letters which are the third form of a vowel. The a3 letter was made to solve the confusion over "u". "u" has two short forms and two long forms for a total of four different possible sounds. To cut through the confusion I made a separate letter for the important sound of a3. The other letter in this row, r3, was also created to avoid confusion. "R2" is a combined letter of the sounds "o" and "r" but this combination looks like an English "or". To eliminate this confusion there are separate letters for the r2 sound and the r3 sound. In PHONETOSE™, all three "r's" are vowels because they can be made solely with the larynx and can serve as a vowel when paired with consonants. Such as in the name Kirk, car and core.

Next are consonants that have been paired together because they have similar sounds. Unlike the next two sections, they do not have an unvoiced pair or a letter whose only distinction is being the non-voiced form of a voiced letter. The letters made closer to the front of the mouth go first followed by those that are progressively made further back in the mouth. The first row is m, n and n2 because these are all very similar sounds. The next row is w and y for the same reasons.

The next two sections are the voiced and unvoiced pairs. This can be a single group, but is preferably split into two sections. The first section is the rest of the consonants that have voiced and unvoiced pairs and have what is termed a "quick attack". This is a sound that cannot be continued indefinitely because the sound itself has a definite beginning middle and end. You can liken it to a symbol crash. You cannot audio loop a symbol crash and get a consistent unvarying sound. You will just hear the symbol crash multiple times. Letters like this are "t", "b" and "k". On the left column are the unvoiced letters and on the right are the voiced letters. Starting from the top are the letters made most forward in the mouth. At the bottom are those made closest to the back of the mouth.

The second section of voiced and unvoiced pairs are the unvarying sounds. These are the sounds that, if audio looped, you would not hear any variation from the beginning to the end. Letters like this include, "f", "s" and "z". This section uses the same characteristics of how far forward or back in the mouth the sound is made and the left and right columns in this section are for unvoiced and voiced pairs.

The next section is a combination of Conceptual Clarifiers and Phonetic letters. Whenever a "t" or "d" is used to make a word past tense, the "d" or "t" from the past tense section is used. The past tense "t" is always on the left in this section of the chart because it is an unvoiced letter. The past tense "d" is on the right because it is a voiced letter. These two letters are also placed high enough to be with the quick attack letters because "d" and "t" are quick attack sounds. Underneath these letters on the chart are the plural, possessive and plural and possessive "s" and "z". These are placed low enough to be with the constant state sounds because "s" and "z" are constant state sounds. These six letters were created to eliminate the need for apostrophes and to help clarify the meaning of words. Also, these "z" letters are included because in some words the "z" sound is used to make a word plural such as the word eyes. The "s" and "z" sounds in this Past Tense section are placed low so they correspond with the constant state sound section across the bottom of the chart.

The last group are the "oddballs" comprised of the letters "1" and "h". They do not fit into any other category except for constant state sounds. These two letters are placed in the noted order because "1" is made further forward in the mouth and only has a voiced form, so it is on the right. "h", on the other hand, only has an unvoiced form, so it is on the left. See FIG. 2.

In the future, another classification method could be whether a letter is made up of two sounds or one. For example, i2 can also be made with an a3 and e2, and a2 can be made with e and e2. Color may be used to distinguish these sections in order to avoid destroying the complex organizational structure that is already in place.

Keyboard layout. Referring to FIG. 3 (Keyboard Layout), to overlay 49 PHONETOSE™ letters onto a keyboard designed for 26 keys, each key function is configured equivalent to three keys. FIG. 3C shows an enlargement of the o key to show the three possible symbols it can produce based on which modifier keys are used. The upper left symbol is what the key will produce if pressed with no modifying keys. The upper right symbol is what the key will produce if the clarifying shift (see FIG. 3D) is pressed. The lower left symbol is what will be produced if the long vowel modifying key is pressed (see FIG. 3E). These modifying keys are called dead keys. You press the dead key first then you press the character that it will modify. In the case of the clarifier shift (see FIG. 3D), you can do combinations of clarifiers by pressing the clarifier shift (see FIG. 3D) and then pressing one or more clarifiers. The clarifier shift (see FIG. 3D) is turned off when the spacebar is pressed. The clarifier is always at the end of a word so the spacebar is always an effective way of deactivating the clarifier shift (see FIG. 3D).

The placement of the modifier keys (see FIG. 3A-3E) in relation to the rest of the keys plays an important function in eliminating dyslexic confusion and increasing efficiency. On this keyboard all the vowels are on the left side and all of the consonants are on the right. The long vowel shift (see FIG. 3E) is on the right side and pressed with the index finger when the hand is on the home row. This separates the work load and prevents the person from having to change hand positions constantly in order to get the long vowels. The clerical shift (see FIG. 3D) is on the third row from the bottom and pressed with the middle finger of the left hand. The modifier keys (see FIG. 3A-3D) are intentionally pressed with two different fingers to prevent dyslexics from confusing them. They are also placed on different rows for the same reason. The dead key long vowel shift (see FIG. 3E) can also be held down while pressing another key at the same time to modify a key.

The placement of the letters is designed to be as efficient as possible. The keyboard layout is configured to accommodate a different written orthography than English. PHONETOSE™ keyboard has a placement for punctuation: "t" is replaced with the long vowel shift (see FIG. 3E) and "h" is replaced with the PHONETOSE™ letter for the "th" sound. The letters "q", "x" and "c", are nonexistent on the PHONETOSE™ keyboard, since they are not included in the present invention phonetic language. All of the "r's" are placed on the left side because in PHONETOSE™ "r" is a vowel. The number line has been used for PHONETOSE™ letters and clarifiers. The placement of the letters on the fourth row from the bottom is designed to correspond to the placement of the longest fingers because these are the only ones that can reach the fourth row without the hand needing to be lifted. A long vowel shift (see FIG. 3E) or standard shift must be used to access the numbers on the number line. All of these symbols, i.e., ! @ # $ % ∧ & *, have been moved to the third row with "*" and "( )" remaining on the fourth row but the position has been altered. In the clarifier space, the "8" key is the symbol for abbreviation. See FIG. 3.

Now turning to FIGS. 3A-B for a magnified image of select keys, in order to switch to the QWERTY English layout, a user presses the one and two keys at the same time. To switch back, a user presses the same two keys again. This is the section of the keyboard covered with a combination Union Jack and United States flag in FIGS. 3A and 3B.

There are three different ways of writing numbers in PHONETOSE™. You can spell out the word of the number phonetically followed by the symbol clarifier. You can use the Arabic numerals or what the majority of nations think of as normal numbers (1, 2, 3, 4, 5, 6, 7, 8, 9). The last is called SHAPE MATH™ and is a nonabstract geometrically based numeral system that is covered further in the document in the section called SHAPE MATH™.

There is one more way to write PHONETOSE™ and it is the most unusual. The other writing method is designed for those that are transitioning from a syllable-based language to English. In some cases, a dyslexic who has been raised in a language that makes more phonetic sense than English (such as Italian or Japanese) will have the unusual symptom of only being dyslexic when they tried to learn a problem language such as English or French. The syllable form of PHONETOSE™ can be written horizontally or vertically and is based from the three part compound letter syllable writing system of Korean. Because there are over 130 different syllables possible in English unlike other languages such as Japanese with 48, it is beneficial to use the Korean—like system making the symbol for a syllable out of its component parts—which makes any combination possible without requiring a specialized symbol for each syllable. This writing system can also be used as a way to get students used to dividing words according to syllables. This is a very useful skill for reading because many rules as demonstrated elsewhere in the document are dependent on the number of syllables and syllable division.

There are three different ways of writing the syllable form of PHONETOSE™. The first way is to have the upper part of the symbol contain the first sound of the syllable. Below that is the vowel, and to the right are any subsequent consonants ending the syllable. Even if the vowel is the initial sound in a syllable, it is still below all the other sounds. A consonant blend stays on the first part of the symbol, and the rest of the symbol goes underneath it. All parts of the syllable are connected. If the syllable is just a single sound, the sound is enlarged to be the size of a compound syllable. The next syllable is not connected to the last. At the end stroke of the end character of a syllable is a downward mark that tells the user that there are more syllables in this word. As a result, a dyslexic reader always knows when one word ends and another one begins. The last syllable of the word does not have this downward mark and can have just the normal last stroke or a conceptual clarifier. The second way of writing the syllable form of PHONETOSE™ is to have the different syllables connected. However, in this way of writing, you can only use it horizontally because the distinction between syllables would be impossible vertically. The third way is to simply group the PHONETOSE™ letters in printed form in the same pattern as the other two ways of writing syllables already mentioned. You can write the cursive form horizontally or vertically.

Dyslexics may prefer the vertical writing because writing up and down is either relative to the force of gravity or relative to the body. It also avoids confusion over bilateral symmetry or the confusion over left and right that cause dyslexics so much trouble.

An alteration to the "L" in this form of writing has been made to make a more clear distinction between short "e" and "L". This modified "L" can be seen in FIG. 1M. Examples of syllable PHONETOSE™ writing can be found in FIG. 1M ("Syllable Writing Examples"). This form of writing could be the solution to the PHONETOSE™ speaking program. Applying this syllable language to the PHONETOSE™ speaking program would make it sound as fluent as the hypothetical Japanese version of that program. An interface could enable a user to input the individual letters and have the machine group them into syllables.

Figure 1N:
FIG. 1N is a list of syllable possibilities of the present invention in PHONETOSE™.

Alternatively, a good organizing system for all of the syllables from the PHONETOSE™ alphabetical order can be provided. This system allows the student to learn patterns in the English syllables and to start thinking in syllables instead of adding them on as an afterthought as they do in current Orton Gillingham programs. With this technique, new rules can be derived from the patterns that can only be noticed when you convert English into a syllable language. The organization system is referenced according to the first sound of the syllable. Syllable groups are further broken down according to whether the first sound, the last sound or a combination of the two is a consonant or a consonant blend such as kl and gl. This grouping and all the different kinds of syllables in English is shown in the English Grid technique by FIG. 1N ("Syllable Possibilities"). Since "r" is a vowel, the *r blends are considered a consonant vowel blend. Phonemic correspondence of English is drastically increased when viewed from a syllable perspective. This grouping can allow for the speaking PHONETOSE™ program to use English letters arranged in syllables.

Tone Languages. In some languages tone is a distinguishing attribute of sounds. The same sound to an English speaker would be two different sounds to somebody from a tone language. Tone in this sense means the pitch or frequency variation in the sound will distinguish one sound from another. One of the main reasons the present invention does not use diacritics in PHONETOSE™ was so frequency variation and volume variation can be placed above words without being confused with diacritics. One continuous line is used from one end of a word to the other. The angle of the line denotes how quick the frequency or volume change is. An immediate change from one section of a word to another will be a square looking wave. A gradual transition will look more like a gradual stock market climb. This is like the upward turn in frequency that you hear in a question. If a user is writing in the syllable form of PHONETOSE™ he or she uses the same continuous line, but it is placed on the right side of the syllables starting from the top. When writing horizontally, a user places the line above the syllables in the same way as he or she would normally write PHONETOSE™ Volume change and frequency variation do not usually vary within a syllable, so the syllable form of PHONETOSE™ does not inhibit the use of frequency variation marks. Frequency variation that is specific to a particular word is very rare in English, but there are a few examples, like in the adapted French expression "la de da". This expression would sound very odd if said with the same relative frequency for each syllable. In PHONETOSE™ it is written like the two examples in FIGS. 1O and 1P ("Tone Variation Marks"). The waveform looking symbol to the leftmost part and topmost part of these lines tell you that this is a frequency variation line and not a volume variation line.

A volume variation line would look like the example in FIG. 1Q ("Volume Variation Marks").

The few examples of English words that could be better clarified with a frequency variation mark are always relative frequencies to the rest of the word. For example, the "la" syllable only has to be higher in frequency than the next syllable for it to sound correct. English does not have distinct tones only rarely relative tones. Mandarin Chinese has frequency variation that is dependent on whether the syllable increases from high to low or low to high or other combinations of varying pitch within a syllable. In this case, the angle of the line would show a user whether the pitch is increasing, decreasing, or staying the same within the syllable. The next example is not a real Chinese word, but a made up word that demonstrates how this system would work for a language like Mandarin Chinese. FIG. 1O ("Tone Variation Marks") and FIG. 1P ("In Syllable Tone Variation Marks") provide examples of how you write "cho4" with the beginning part of the syllable starting with a low-frequency and increasing in frequency. The next syllable is "yo2n" at the beginning or the syllable having a high pitch lowering to a lower pitch. The last syllable, "so2" has the frequency variation of the first. There also is a much more precise way of writing syllables in PHONETOSE™ which a user can encode called tone letters.

Tone Letters. Tone letters similar to the ones in the international phonetic alphabet can go into the structure of the syllable. This system can represent, pitch shifts, the tone for an entire syllable, or a word. Like the international phonetic alphabet, this tone system is based from a musical staff. In the present invention, the highest three frequencies point toward the vowel in a syllable. The two lowest frequencies face away from the vowel so they do not overlap the vowel or the consonant. These tone lines are put on the lines that connect the vowels to the consonants in the syllable. The centermost tone has a downward stroke to make it clearer that it is the center tone. To apply Frequency Variation Marks to an entire word, a user marks the first syllable of the word and assumes that it applies to the entire word if no other syllable has a Frequency Variation Mark. For contour tones, a user can do different combinations of the high and low marks. If the entire syllable is a single tone, a user can mark either one of the syllable-vowel-consonant connection sections. Dyslexics would often confuse which one to mark, so this is beneficial.

While extremely rare, some languages have eight tones. In order to code eight tones, instead of five, add a three staff section at the top of the system structure that is indented from the previous tone line to distinguish these three extra tones from the others. See FIG. 1R (8 and 5 tone range). The indentation and the lines always face towards the vowel. This add-on will make this system compatible with the previous system. A person switching between 5 tone and 8 tone languages will not have to learn two completely different systems. A user dealing with a syllable that does not have a consonant at the beginning or the end or no consonants simply draws the lines that would connect the consonants as if they were there, and draws the tone lines as normal. If the spoken language requires a third pitch in the same syllable, a user can add another tone symbol after the final consonant of the syllable, and it will be facing away from the vowel. These symbols are designed so that the letters will not get in the way. It is easy to remember because there is no other way for these symbols to be oriented—since the letters and tone symbols would overlap otherwise. Relative orientation is not a problem for dyslexics so this system is relative to the consonants.

Conceptual Clarifiers

Figure 4A:
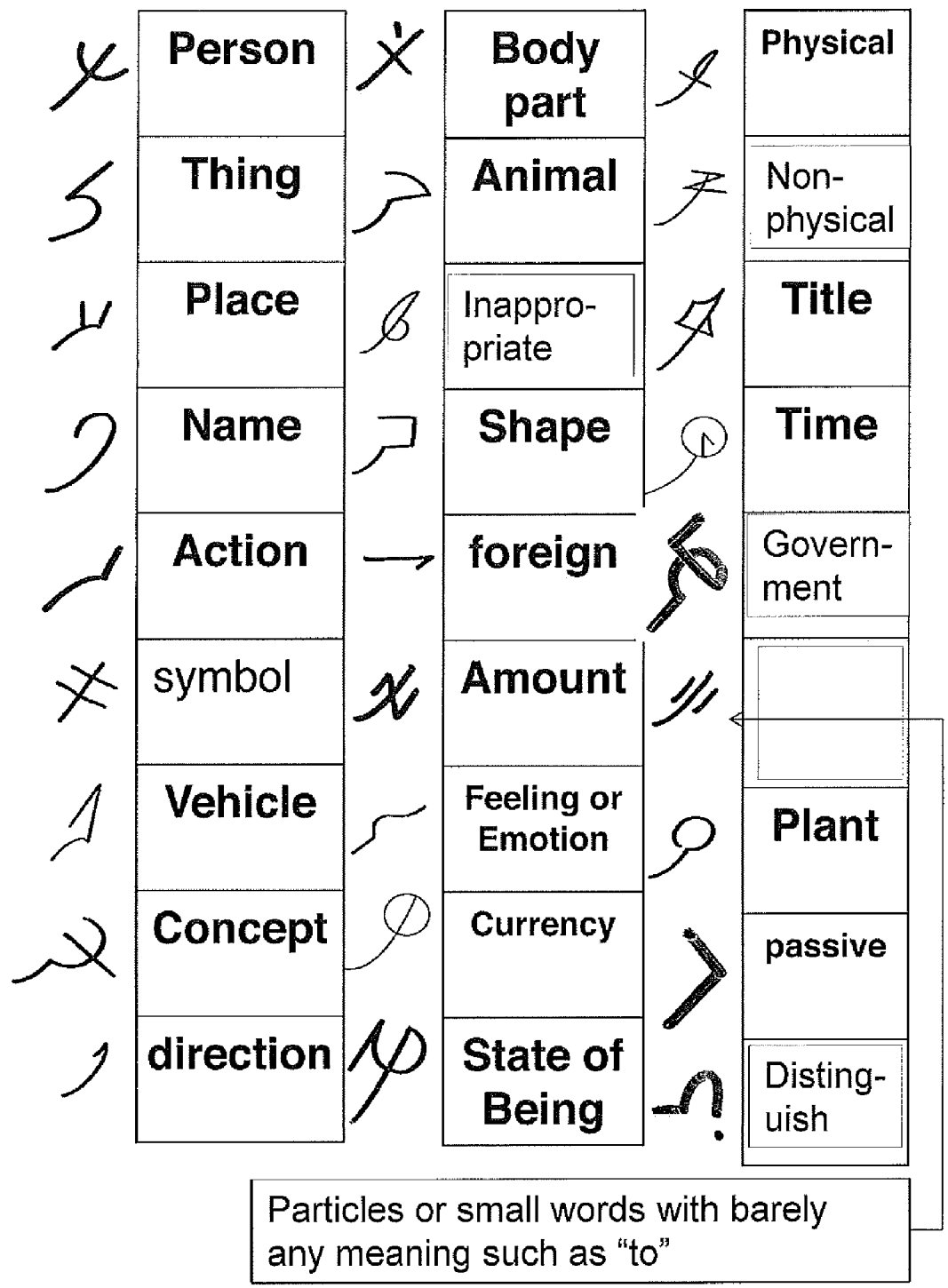

Now referring to FIGS. 4A-C, the Conceptual Clarifiers are the homophone distinguishing system that is used by PHONETOSE™, wherein a series of abstract symbols at the end of a word distinguishes words that sound the same but have different meanings from each other within the one to one phonemic correspondence context of PHONETOSE™. It is also used by English Grid (discussed below) to show conceptual context.

Since the PHONETOSE™ language has a one to one phonemic correspondence, each letter only making one sound, homophones like "to", "too" and "two" are written exactly the same way. The only difference between these words is their meaning. This is where the Conceptual Clarifiers come in. They have broad meanings meant to distinguish these homophones from each other. They make no sound of their own and have certain traits that prevent them from being confused with phonetic letters. In cursive PHONETOSE™ these characters are made from the last stroke of the last letter in the word. All of the Clarifiers are designed to not have a last stroke that could be connected to another cursive letter. The purpose for this is to physically make it impossible for the conceptual clarifiers to go anywhere else, but their proper place at the end of a word. In the printed form of PHONETOSE™ it is simply drawn from the last letter. This is done by underlining the last letter and extending the Clarifier from the underline stroke (see FIG. 1S).

Referring to FIGS. 4A-C, the Clarifiers are a very flexible system and a user can use different combinations of Clarifiers to adjust or create new meanings. For example, the Clarifier for group of people is a combination of the Clarifier for amount and person. The Clarifier for food is comprised of plant, animal and part. This is because food is plant animal parts. There are many different combinations but as long as the meaning is clear more combinations are possible.

There is the potential for Conceptual Clarifiers to greatly help those that are not native speakers of English. For example, if a foreigner does not know the word for knife, he could type the word "cut" and attach the "thing" Clarifier. Conversely, he could type the words "knife", "saw", "blade", "ax", "hatchet" or "scissors" and attach the "action" Clarifier.

There is an application for these Clarifiers to be used in English writing in addition to PHONETOSE™. The same technique that was described for foreigners could be used to help those suffering from phonemic aphasia or averbia. In the case of averbia, a person, because of brain injury, cannot recall any verbs. If this person is using a computer interface, he or she could type in the noun and put the action Clarifier on the end of the word. The computer would detect the difference between the word and the Clarifier and bring up a list of words that he could have meant. If he or she also cannot read verbs there could be pictures to further clarify. In the case of anomic aphasia, a more broad condition causing a person to have trouble naming a wide variety of things, the sufferer could use the Clarifier the same way as the foreigner.

Some sufferers can not name any colors. In this case, they could name anything that was that color. He or she would put the state of being clarifier at the end of the word. Then, he or she could select the word they wanted from the menu. For example, let us say someone is trying to think of the word green. He or she can type the word "apple" and then attach the "state of being" clarifier. A list of all descriptors for the word "apple" is generated, i.e., "sweet", "juicy", "red", "green", "yellow", etc. . . . and he or she would be able to choose green. This process can work in many different ways. A user would also be able to do a list for clarifiers that match the words that are being used. For example, if a user is looking for the word "regime", he or she would type the word "Communism" and attach the nonphysical "thing" clarifier, which then would generate the list: "government", "regime", "Cold War", "socialism", "propaganda", "revolution" and "the Iron Curtain". The user would then choose "regime". If the user had put the place clarifier on, the generated list would include "China", "Cuba", "Soviet Russia", "Russia", "East Germany" and so on.

There are two characters that are not really clarifiers but are in this category because they have nowhere else to go. These two symbols are how PHONETOSE™ handles abbreviations, acronyms and contractions. When a contraction is made, it is spelled out phonetically like any other PHONETOSE™ word and then it is separated by a slash between the last syllable or dominant sound in the contraction. For example: don't (see FIG. 1T), wasn't (see FIG. 1U), doesn't (see FIG. 1V).

The thought process behind this is that since the word is phonetically spelled out, putting the separator where the missing letter is doesn't make sense. Thus, a need exists for separating the words that can be logically thought out without thinking of the origin of the words. Syllable division turned out to be the most logical choice.

The other strange outlier symbol is the one used for abbreviations. They have a symbol (see FIG. 1W) placed around them. The end of this symbol has a clarifier of the abbreviation attached to it. The abbreviations are printed if they maintain the English letters, and if they are written out phonetically as they are pronounced, they are written in cursive PHONETOSE™ Words that have been accepted into English as words that were once abbreviations or acronyms need not have the symbol placed around them. An example would be laser or scuba. But they can be placed in the symbol if you wish to make reference of their abbreviated nature. It is a way for the student to not confuse English words even when he has to use them. Words from foreign languages that are put directly into a document without changing their spelling to PHONETOSE™ are also printed. If both the English abbreviation and the PHONETOSE™ spelling are given, it is written as shown in FIG. 1X. In more casual writing, the printing for such acronyms and abbreviations can be enough to distinguish them from proper PHONETOSE™ words.

Alternatively, if a word's abbreviation is the intended pronunciation, no symbol is needed around it if it is spelled out in PHONETOSE™. If the symbols surround it, then the full word is pronounced. For example, if a user intends to have the abbreviation "intro" pronounced "introduction", then he or she would write it with the abbreviation symbol (see FIG. 1W) around it. If a user wants the word to be pronounced "intro" (see FIG. 1Y), then he or she does not. This rule exists to prevent confusion with abbreviations that are pronounced like normal words.

This same rule applies to acronyms. If a user intends for the letters to be pronounced, then he or she writes out the name of each letter with the Symbol Clarifier after each one and an optional Clarifier on the last letter referring to what the abbreviation is. Instead, if he or she wants the reader to read to what the abbreviation is referring, then he or she puts the abbreviation symbol around it. The important thing is that the user always knows how the abbreviation is supposed to be read.

English Grid

Referring to FIGS. 5A-E, English Grid is an alternative coding system for already existing rules known as Orton Gillingham rules. Specifically, English Grid is a way of referencing Orton Gillingham rules by using a series of symbols that show word context in a series of levels that can show spelling, pronunciation and conceptual context. PHONETOSE™ is used as a pronunciation guide.

English Grid is designed to create the context of reading rules and a set of symbols that replace long explanations. A student, instead of remembering a long explanation, can remember the visual layout that shows the context of how a reading rule really works so it can be more easily applied to words that the student does not know. This is not possible with the current Orton Gillingham coding system, because they use letters as symbols for consonants and vowels. For example, the letter "C" is used as the symbol for consonants but this does not work in the actual context of letters because it is a letter itself. The symbol for vowel is an even bigger problem because it is a "v" which is a consonant but it represents vowels. In contrast to Orton Gillingham, the present invention has four symbols that represent different aspects of word context, a vowel is represented with an "@", a consonant is represented with a "*", the rest of the word is represented with a "#", and syllable division is represented with a "/". Note: the "/" is also used in Orton Gillingham programs. Using these four concepts, as represented with symbols, things that otherwise take many words to describe can be described in just a few symbols. For example, as shown in FIG. 5A, an "a" at the beginning of a word or at the end of a word makes the sound of a short "u". You would have to use 16 words to express this, but this rule with English Grid is just six symbols. English Grid goes way beyond just reducing the number of characters.

For a few rules, the way that the word is constructed is dependent upon whether a prefix or suffix is used. A prefix is coded as "#)", and a suffix is coded as "(#". These two codes are designed so the "(" is facing the letters of the word. If it is important for the suffix to start with a certain letter, the user can put the letter inside a suffix, i.e., "(t#". In the event a user wants to encode an entire word that is part of another word, as in the case of compound words, he or she can encode it as "(#)". As an example "fire(#)" could refer to firehouse, firefighter etc.

Further English Grid examples are shown in the four figures labeled FIG. 5B. The top space of each figure is reserved for context clues, i.e., Conceptual Clarifiers or national flags. A Conceptual Clarifier from the homophone distinguishing system used in PHONETOSE™ can be placed in the top space to indicate when to use a particular rule, such as when to use "ee" at the end of a word, instead of "y", to make the long "e" sound. FIG. 5B(i) is the rule that says when the word is an action with a long "e" at the end of the word, and it has more than one syllable, the word uses a "y" at the end of the word to make the long "e" sound. FIG. 5B(ii) is a rule that says if the word is a person or thing, the long "e" sound at the end of the word is spelled "ee". FIG. 5B(iii) says if the word is an action and has a long "i" at the end of a one syllable word, the word is spelled with a "y". FIG. 5B(iv) is a rule that says if the word is derived from either Italian or Japanese, the long "e" sound is made with an "i". To show this, flags can also be placed in the topmost portion of the grid to demonstrate when a particular rule should be used. Spellings vary according to the country they come from. It is a much faster process in this contextual visual format. This technique also makes learning spelling in other languages a lot easier. Rules for Norwegian, French, Spanish and even Japanese can be written in this grid format.

The bottom blocks in FIG. 5B are used for syllable numbers. In English the number of syllables determines what kind of spelling you use and what sound the letters will make. Since the "/" is the symbol for syllable if the word rule applies when there is one syllable there will be one "/". If the word rule requires that the word have two or more syllables there are two "/"s. The slash can also be used inside the English letter block to show the context of whether the rule comes before or after the end of a syllable. This applies for the "@" and "*" as well.

As a further example, an "s" surrounded by two vowels will sound like a "z" as seen in FIG. 5C A "u" at the end of a syllable will be long as shown in FIG. 5D. The grouping of rules is also important. Rules that are related to each other are grouped together so the relation between them is visually represented. See FIG. 5E (English Grid Sample Page). It is better for these groupings to occur in asymmetrical patterns to assist in dyslexic visual tracking. It is an advantage for English Grid to not follow a traditional grid pattern.

Internet Speaking Reference Chart

See FIG. 2 and FIG. 2A of the present invention that further includes a speaking webpage activated by clicking on a PHONETOSE™ letter whereby the computer will pronounce the sound that it makes. This makes the reference chart at FIG. 2 easy to use—even for those that cannot read—and also lessens the dependence on teachers for instruction. When a user clicks on the picture of the letter, he or she will be able to see all the English Grid rules for the letter, and, if he or she clicks on the play button directly underneath the picture, he or she will hear the sound of that letter. This process can be implemented in iweb by putting a picture over top of the video file. The picture is of the same letter as the video file. A hyperlink is then connected from the picture that is over top of the video file to another website page that has the English Grid rules for that letter on it. This complicated technique is used because video files in iweb cannot have hyperlinks, but pictures can.

Figure 2B:
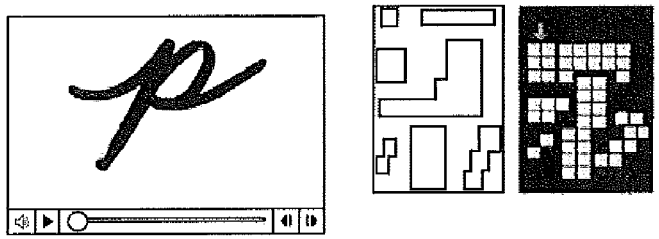
FIG. 2B is an example of an homophone page.

Additional information on this program, which otherwise has been called the "Gillinet", is set forth below and shown in FIG. 2A. The Gillinet can also be used to reference homophones. On the page that shows the English Grid rules for a particular sound is a hyperlink that takes you to a page of homophones distinguished with the Conceptual Clarifier. They are arranged with the Conceptual Clarifier after the English spelling of the words and the PHONETOSE™ pronunciation are underneath all of the homophones that are pronounced the same way. They are grouped according to initial sounds. Below is an example of a rule page with a link to a homophone page. The icon for the homophones for this sound is in the upper left corner. The next page is the homophone page see FIG. 2B.

Speaking PHONETOSE™ Program

Figure 6A:
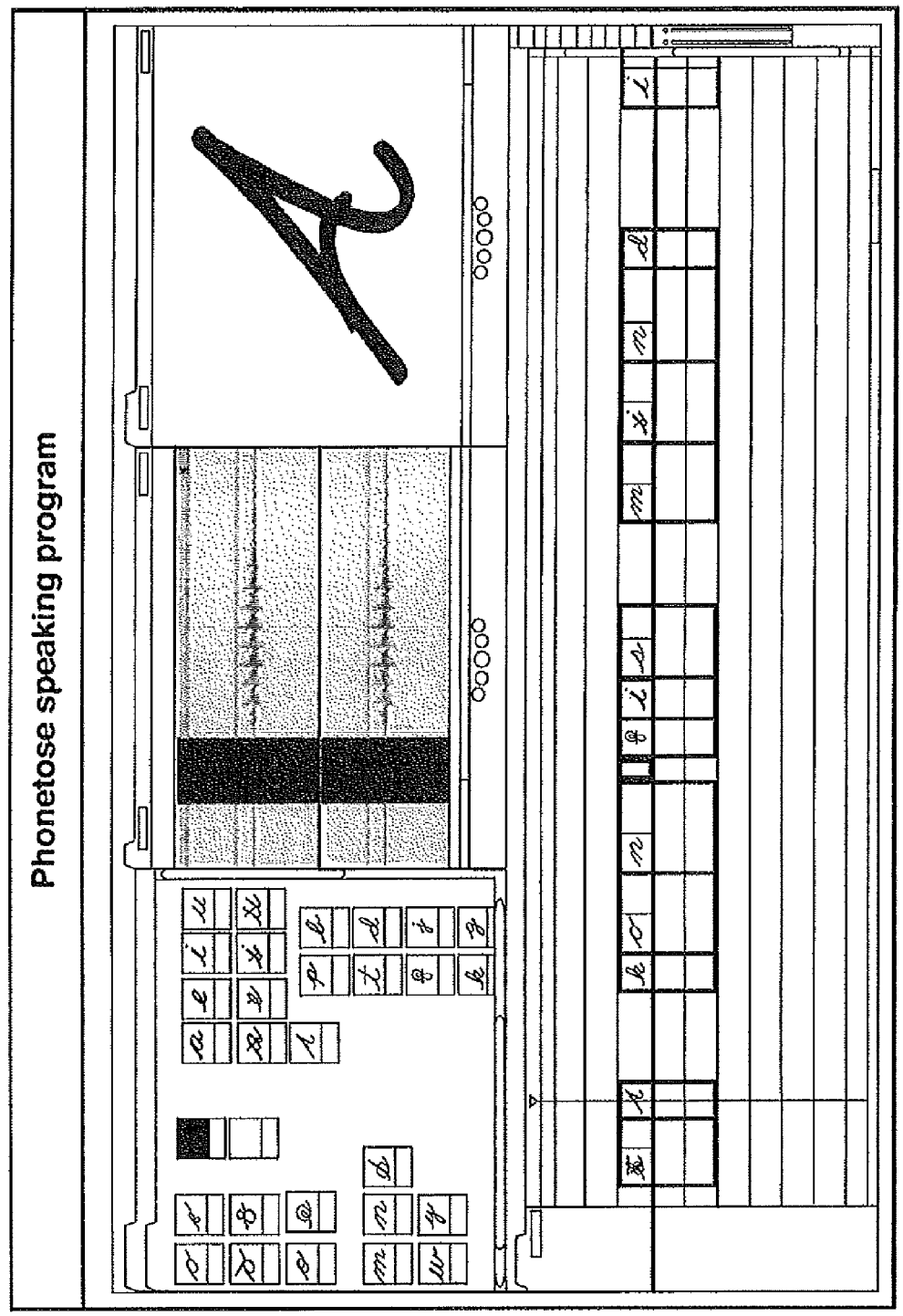
FIGS. 6A-B are illustrations of one embodiment of a PHONETOSE™ speaking program.
Figure 6:
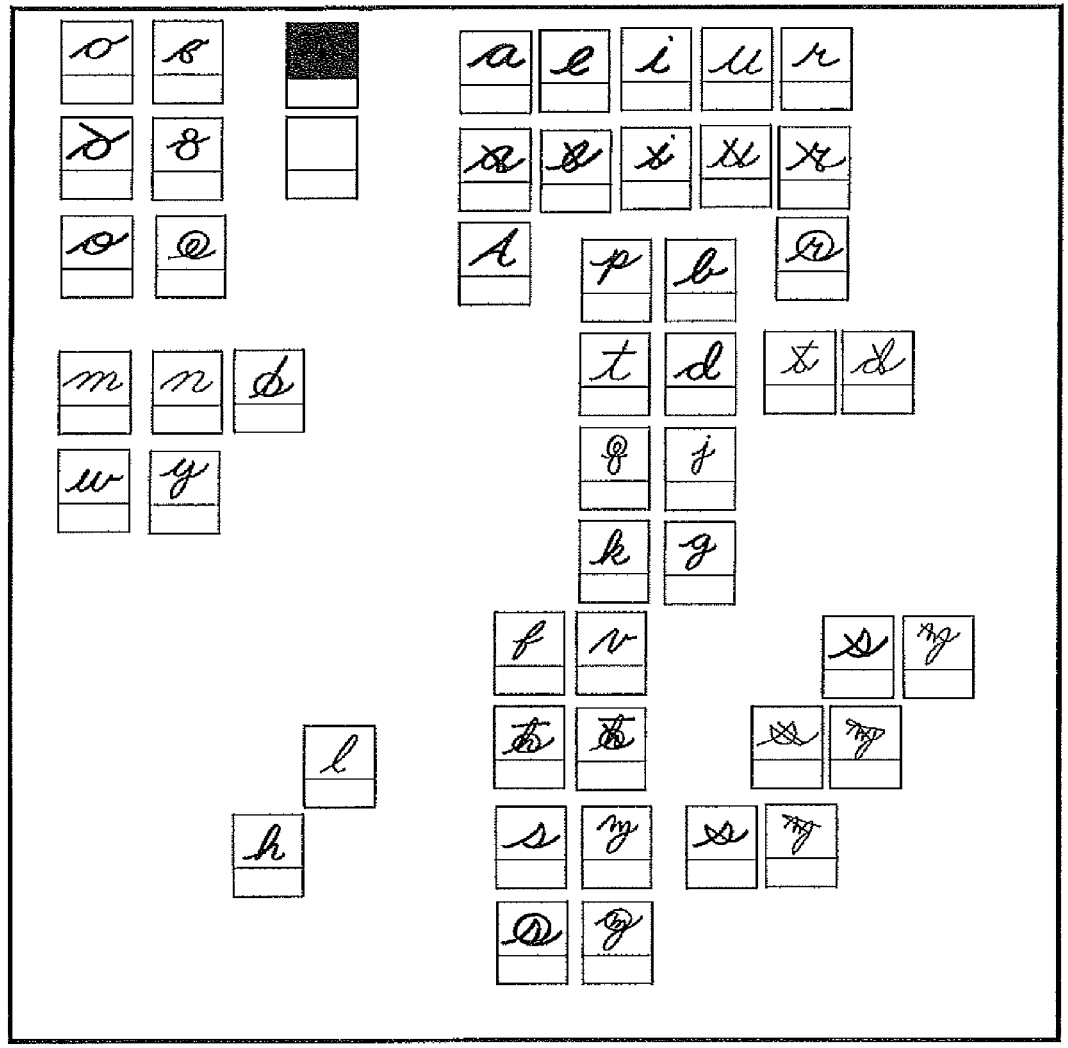

Now referring to FIGS. 6A-B, the Speaking PHONETOSE™ Program uses a nonlinear editing system as a one-to-one phonemic correspondence speaking program (see FIG. 6A) by using the sounds in PHONETOSE™ to allow the student to construct words phonetically on a timeline.

Turn to FIG. 6A for another one embodiment of this invention having the nonlinear editing program called Final Cut Pro that can be used to take video clips of the sounds that the letters make and link them with pictures of the letters. Other similar editing programs can also be used. The user can take the letters from the browser in the upper left-hand corner of the program and drag them into the timeline at the lower center of the program and string together lines of phonetic parts. The user can then play these parts and have the program say the words aloud. To make it easier to understand longer words, a blank video clip can be added for a space between syllables. This program helps students understand the word more clearly, and also helps them learn how to separate syllables. All three previously mentioned scripts are in this program. The Conceptual Clarifiers can be accessed as well. In one embodiment, if a user puts the clarifier at the end of a word, it will not make any sound, but if the user double clicks on it in the browser, after a short delay, the program will say what the clarifier means.

In one embodiment, this process is accomplished by having a section of the clip with no audio, followed by a section of the clip with the explanation. A user can set in and out points for a clip. These points determine how much of the clip will be shown when a user plays it in the timeline. A user sets the out point to before the silence. However, if a user double-clicks on the clip, and presses play, the program will track in the viewer where a user will be able to hear the explanation after the program plays through the short silence at the beginning. As such, the user can access the entire clip in the viewer, and not just what he or she selected for the timeline.

This program serves as another way of referencing symbols without requiring a teacher, even for the illiterate. One problem with the program is that because the sounds are simply put together, they lack the stress of accent that makes speech sound natural. In other embodiments, this issue is overcome by having the letters not directly represent the sound but according to the letter combinations, such that the program makes the same sounds but with their accent or stress altered. Most importantly, the word or letter combinations would be grouped according to syllables, with a unique recording being referenced for that particular syllable.

Conceptual clarifiers can also be accessed through this program. The organization of the Conceptual Clarifiers in the PHONETOSE™ speaking final cut program is similar to the organization of the PHONETOSE™ alphabetical order. They are set up in asymmetrical groups with the broadest conceptual clarifier at the top showing what kind of clarifiers are underneath it. For example: the person clarifier is on top with the name, title, action, body part, state of being, and foreigner clarifiers underneath it because these are all clarifiers that deal with people.

FIG. 6B is an isolated view of the PHONETOSE™ letters in the browser shown in 6A.

Phonetic Hangman

Figure 7:
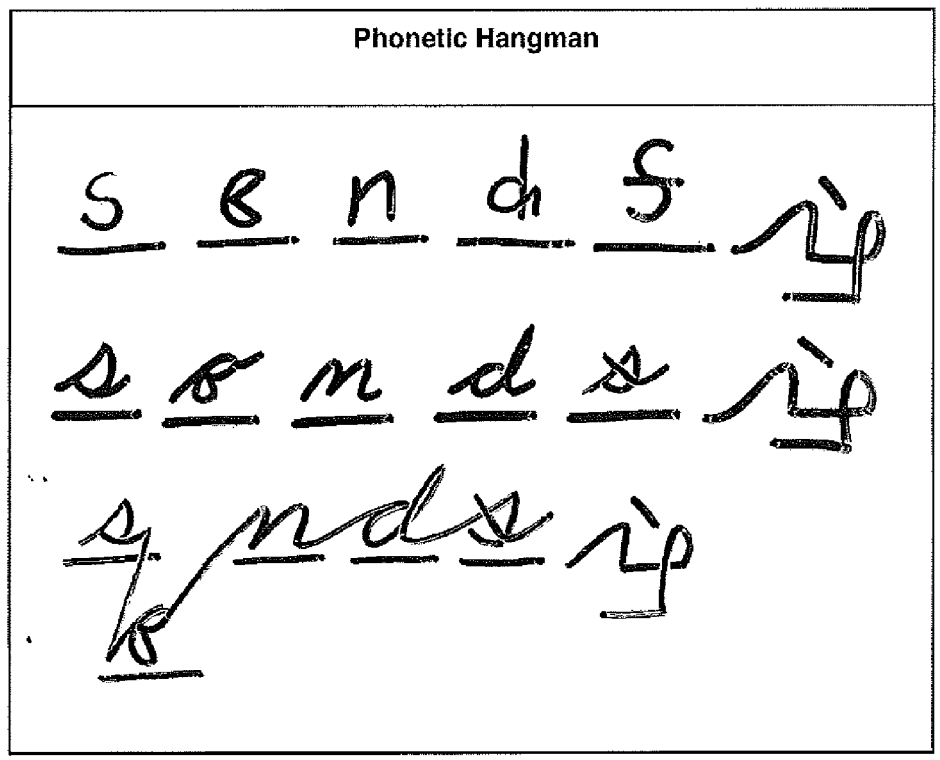
FIG. 7 is an example of Phonetic Hangman.

Referring to FIGS. 7, 8 and 9 in Phonetic Hangman instead of guessing the letters that make up a mystery word, a player guesses the sounds. In this invention, two "hang people" are provided because there are a lot more sounds than traditional Latin or English letters. When a sound is guessed, a player says the sound, not the letter, because there are no names for the letters. If you use sub-clarifying letters in the word, the person running the game puts down any of the letters that make that sound. For instance, in the word "sounds" (which is depicted in FIG. 7), there is a normal "s" and a plural "s". If a player guesses "s", that person gets credit for both of these occurrences. To make the game easier, you can give the student or the person guessing the clarifier for the word. An example of this hangman structure is seen in FIG. 7. At the top of the structure is the printed form of PHONETOSE™; below that is the cursive form of PHONETOSE™; and below that is the syllable form of PHONETOSE™. The clarifier at the end of the word means "language part". If a player uses the horizontal form of syllable PHONETOSE™ the next syllable would be to the right if this word had more than one syllable. If a player uses the vertical form of PHONETOSE™ the next syllable would be underneath this one if there is another syllable to this word. FIG. 8 shows an example of the horizontal form of syllable PHONETOSE™ for the word "computer" in Phonetic Hangman; FIG. 9 shows an example of the vertical form for the same word. This game can allow people to learn the clarifiers, phonetic structure, and even syllable usage. The syllable form allows games to go faster because knowing the kind of syllable greatly reduces the possibilities. For the example of "sounds" as shown in FIG. 7, the types of consonants and vowels can be shown as "*@***". In Phonetic Hangman, the last blank space of a syllable in a multi-syllable word has a downward mark—the same way the last letter of a syllable in a multi-syllable word does. This way, a player can tell where one syllable begins and another syllable ends.

Alternating Line Highlighting

Figure 10:
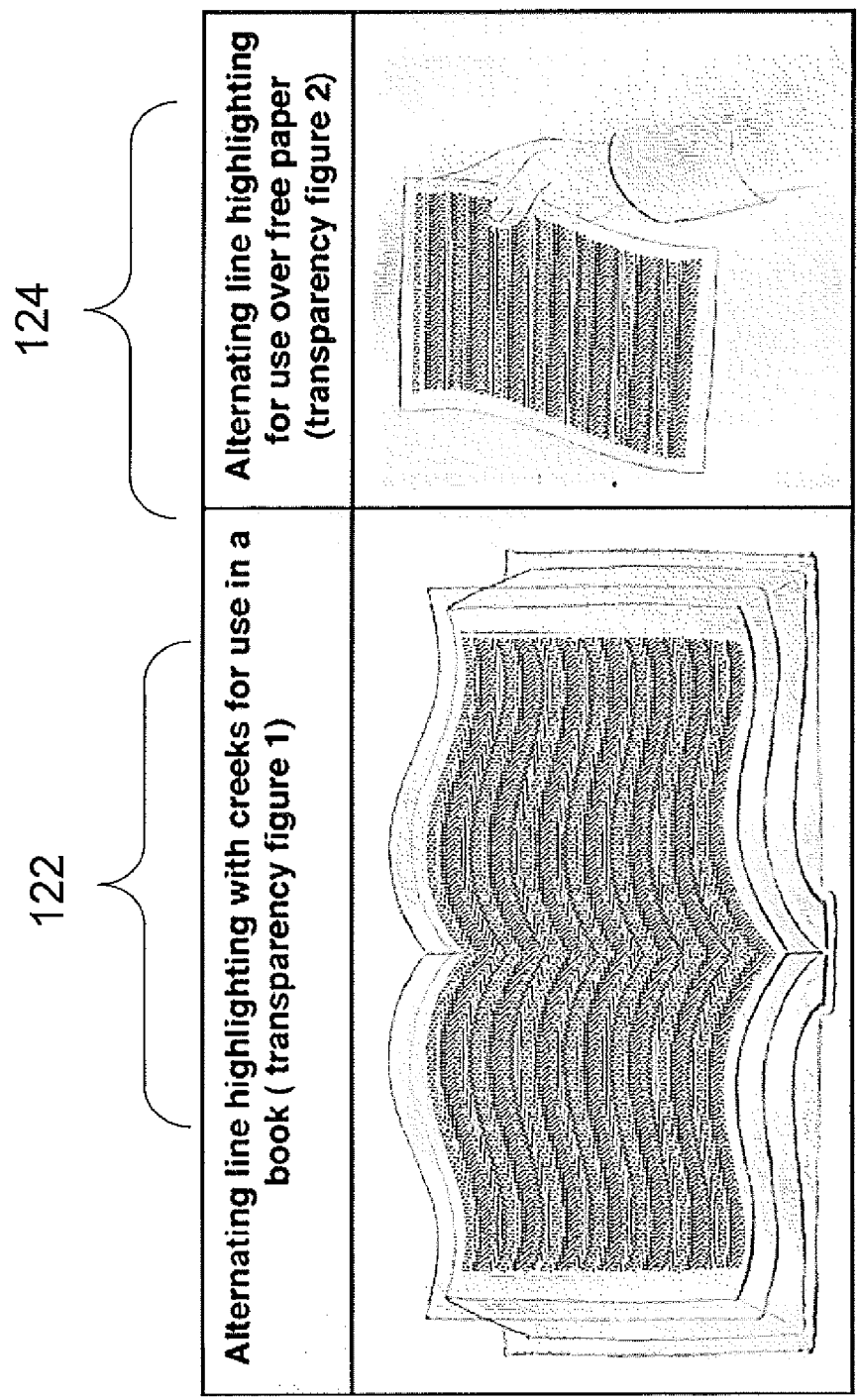
FIGS. 10A-B are examples of the Alternate Line Highlighting transparencies.

Alternate line highlighting (see FIG. 10) is a transparent overlay of alternating lines of color (for example, green, yellow, red, blue, orange) that assists with visual tracking for dyslexics. The transparency with a series of highlighting lines that go down a transparency in a color pattern. The colored lines are designed to be the height of the letters and the width of the page. It is laid over top of a page to assist in dyslexic visual tracking.

There are two basic designs. The first is an overlay that is just a transparency that can go over scripts or papers 124 (see FIG. 10B). The second is a transparency that is longer and has a crease in it that allows it to be held easily in a book 122 (see FIG. 10A).

SHAPE MATH™ Basic Introduction

With SHAPE MATH™, basic math operations can be calculated by visualizing and manipulating shapes that each represent a quantity. Instead of adding abstract symbols, which is hard for a discalculic, a SHAPE MATH™ user can visualize the combination of various shapes.

Figure 11A:
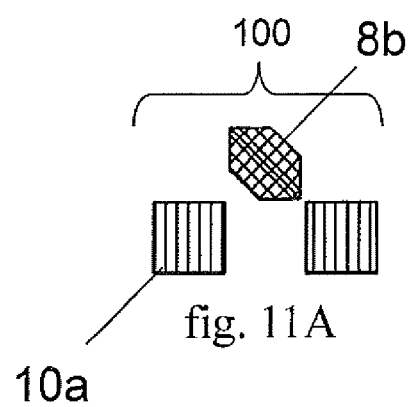
FIG. 11A is an example of a representation of 28 according to one embodiment of the present invention.

FIG. 11A is an example of the number 28 when expressed with SHAPE MATH™ symbols. These symbols will be described in more detail later in the document.

This section demonstrates the basic principles of SHAPE MATH™ by introducing the one, two, three and five shapes and demonstrating how they can be combined to make a ten shape. These numbers were selected because they are the basis of all the larger numbers.

The yellow outer three shape 3b represents the quantity of 3 and the green two shape 2a (shown in FIG. 11B) represents the quantity of 2. A two shape 2a and three shape 3b, when combined together, make a green and yellow five shape 5b which represents the quantity of 5. This composite five shape is equivalent to the solid red five shape 5a because the value of a SHAPE MATH™ number is determined by its size and outline.

Figure 11B:
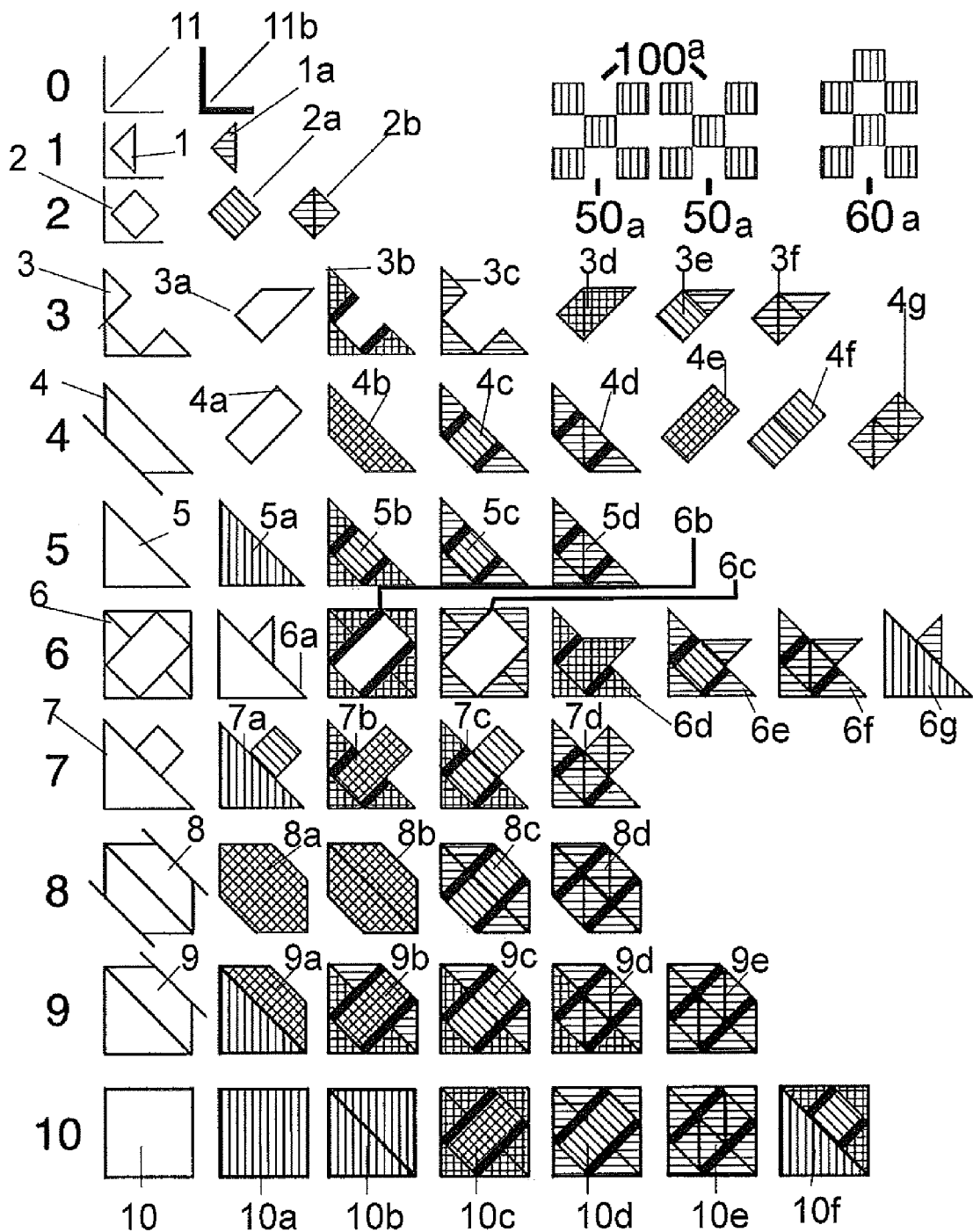

A two shape 2a, three shape 3b and five shape 5a can be arranged to make the square shape that represents 10 10f (see FIG. 11B). The ten shape is the standard unit of value when combining shapes because modern math operates on a base ten system. There are many different ways to make a ten shape, including a solid red square 10a.

Every shape in SHAPE MATH™ can be broken down into one triangles 1a (see FIG. 11B) which represent the quantity of 1. For example, ten shape 10e is made out of 10 one triangles 1a and the zero spacers (see FIG. 12).

One of the purposes of the zero spacers (see FIG. 12) is to allow ten equally sized right triangles (ten one triangles 1a) to be compiled into a square (ten shape 10). A square is easy to visualize and without the spacers, a square could only be made from differently sized one triangles 1a. The zero spacers are also used to fit other numbers into the ten square 10 and assist in visual tracking (which is hard for discalculics and dislexics) by separating inner and outer shapes. The zero spacers represent the number 0 if you rearrange them into an L shape 11b (see FIG. 11B).

Shape Colors

The following section explains examples of the SHAPE MATH™ colors from 1-5 but is not intended to limit the present invention to any particular color scheme. The primary purpose of color or shading differences is to assist the student in distinguishing the numeric shapes.

The SHAPE MATH™ numbers and colors go 1 blue, 2 green, 3 yellow, 4 orange, and 5 red (see FIG. 13).

Scientifically, blue is a warmer color than red but SHAPE MATH™ colors ascend according to the scale of cultural subjective perception. Cool objects from everyday life tend to be blue and thus blue falls on the cool end of this spectrum. This is the opposite of red which typically signifies that something is hot, such as a flame. Thus, red falls on the hot end of this spectrum. The intuitively ascending colors are easier to remember and visualize.

Inner and Outer Shapes

It is important to note that some SHAPE MATH™ numbers can have different forms which are labeled either inner or outer. An outer shape, when arranged into a ten shape, touches its border. An inner shape, when arranged into a ten shape, is entirely surrounded by other shapes. The inner six is an exception to this rule and the specifics of this will be addressed later in the document.

Numbers 1-5

The following section explains some of the important details about SHAPE MATH™ numbers below 5.

The inner four shape 4f can be made by combining 2 two shapes 2a (shown in FIG. 11B). Inner 4 shapes are typically orange 4e and when placed within the ten square, they are always surrounded by other shapes such as the 2 outer three shapes 3b seen in ten shape 10c.

The outer four shape 4b (see FIG. 11B) is composed of a two shape 2a, 2 one triangles 1a and two zero spacers as seen in four shape 4c. It is larger only because of the zero spacers. It is important to put the zero spacers in when forming the outer four shape so that it lines up with other shapes within the square ten shape.

The inner three shape 3d and outer three shape 3b (shown in FIG. 11B) follow the same rules of nomenclature that were previously applied to the inner and outer four shapes.

Numbers 6-10

At this point, SHAPE MATH™ numbers 1-5 have been introduced and briefly explained. The following are various examples of SHAPE MATH™ numbers 6-10 and how they are made by combining numbers 1-5. While this section does not exhaust all possibilities, it shows some of the more common ways of compiling the larger digits.

Six shape 6b is made with 2 outer three shapes 3b (shown in FIG. 11B) while the equivalent six shape 6c is made from inner three shape 3d and outer three shape 3b. Additionally, Six shape 6g is made with five shape 5a and one shape 1a (see FIG. 11B).

Seven shape 7a is made with five shape 5a and two shape 2a while the equivalent seven shape 7b is made with outer three shape 3b and inner four shape 4e (see FIG. 11B). Additionally, seven shape 7c is made with outer three shape 3b and 2 two shapes 2a.

Eight shape 8b is made with 2 four shapes 4b (see FIG. 11B).

Nine shape 9a is made with five shape 5a and four shape 4b (see FIG. 11B).

The ten shape (shown in FIG. 14) can be made out of 2 outer three shapes 3b and 2 two shapes 2a while the ten shape (shown in FIG. 15) can be made out of 2 outer three shapes 3b and four one shapes 1a.

FIG. 16A-16F show examples of various SHAPE MATH™ numbers. FIG. 16A is a 3 shape composed of 3 one shapes. FIG. 16B is a four shape composed of a three shape and a one shape. FIG. 16C is a five shape composed of a four shape and one shape. FIG. 16D is a six shape composed of a four shape and two one shapes. FIG. 16E is a seven shape composed of a four shape a one shape and a two shape. FIG. 16F is ten shape composed of a four shape and two three shapes.

Written Form

The next section will cover the written form of SHAPE MATH™ and further explain the zero spacers.

A user of the written form of SHAPE MATH™ can complete most of the common operations that are traditionally performed by writing problems with Arabic numerals. Instead of Arabic numerals, however, SHAPE MATH™ written numbers are used to express and track the quantities involved. These written SHAPE MATH™ numbers, which omit the colors, look very similar to the standard SHAPE MATH™ numbers with the exception of the written one shape 1 and written two shape 2 (shown in FIG. 11B). Without color, one shape 1a and two shape 2a could be confused with five shape 5a and ten shape 10a, respectively. Thus, zero spacers are placed around the written one and two shapes to distinguish them from five and ten shapes. Zero spacers are used because they do not represent any value and when oriented against each other into a right triangle, they form the corner of an empty ten shape 11b. Placing the one and two shapes within the context of the corner of a ten shape will distinguish them by showing their relative size to 10. For added distinction, the written one shape 1 and two shape 2 are turned to make them look different from the written five shape 5 and ten shape 10.

Figure 17:
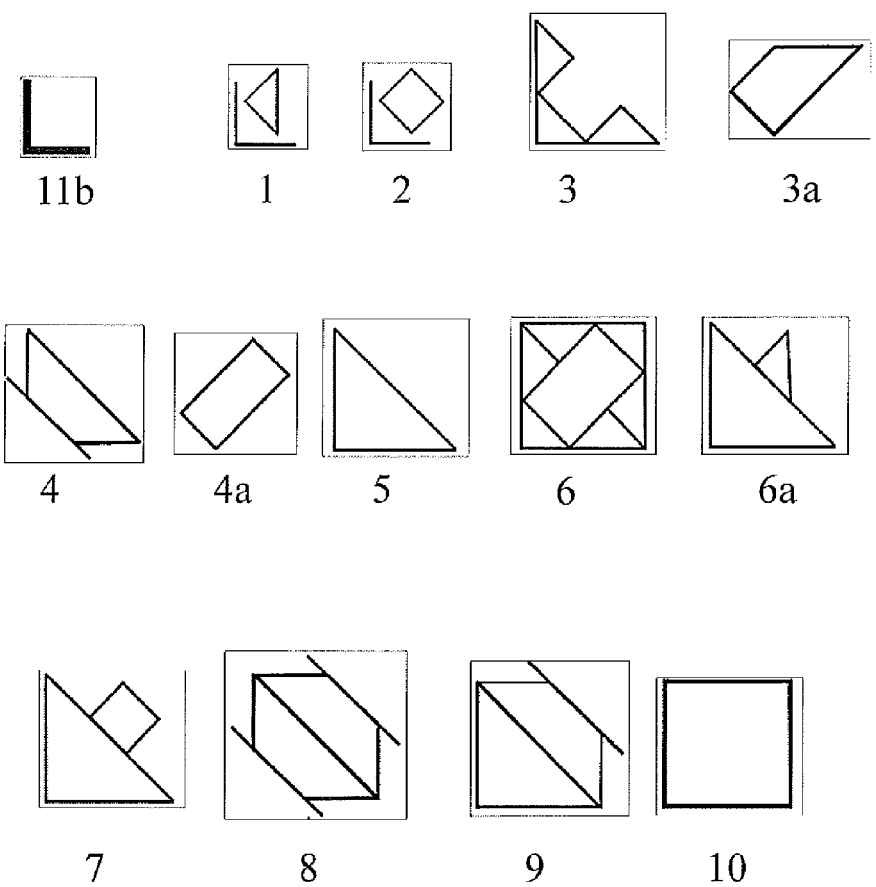
FIG. 17 shows the written form of numbers 1-10.

Now turning to FIG. 17 for all of the SHAPE MATH™ written numbers which include zero spacers 11b, one shape 1, two shape 2, outer three shape 3, inner three shape 3a, outer four shape 4, inner four shape 4a, five shape 5, outer six shape 6, inner six shape 6a, seven shape 7, eight shape 8, nine shape 9 and ten shape 10.

The lines on the written eight shape 8 and nine shape 9 are extended to exaggerate the specific qualities of their shape and make them different from the written ten shape 10 when handwriting is naturally sloppy. If a user of the system gets the written outer four shape 4 confused with other numbers, they can add an extended line like in the case of the written eight shapes 8 and nine shapes 9.

If someone using the system gets confused by the negative space inside of the written outer six shape 6 they can cross out the center. This will make sure they do not think there is a written four shape 4a in the center, which would indicate the quantity of ten.

Addition

The following section will explain the basics of mental SHAPE MATH™ addition using several examples. The process described is also how a student would use the SHAPE MATH™ pieces, a learning tool that will described later in the document.

Figure 18A:
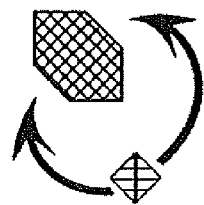
FIGS. 18 A-B demonstrate mental SHAPE MATH™.
Figure 18B:
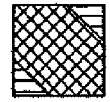

For the problem 8+2 eight shape 8a and 2 one shapes 1a can be visualized and the one shapes placed on each flat corner of the eight shape 8a (see FIG. 18A). This arranges the addends (8 and 2) of the addition problem into a ten shape 10a (see FIG. 18B).

For the problem 5+2=7 five shape 5a and 2 shape 2a can be visualized and combined to create the mental image of seven shape 7a (see FIG. 11B).

For the problem 3+4 outer three shape 3b and inner four shape 4e can be visualized and combined to create the mental image of seven shape 7b (see FIG. 11B).

For the problem 7+3 seven shape 7a and outer three shape 3b are combined to make ten shape 10e (see FIG. 11B).

For the problem 3+3+4 outer three shape 3b can be combined with another outer three shape 3b to create six shape 6b (see FIG. 11B). Then, inner four shape 4e can be imagined in the empty space within six shape 6b to create ten shape 10c (see FIG. 11B).

In SHAPE MATH™, the completion of very basic addition problems is no different than the creation of larger numbers from base numbers and very little memorization is required.

Written SHAPE MATH™ and Place Value

The next section outlines the specifics of written SHAPE MATH™ addition using a place value system that allows SHAPE MATH™ users to work with larger numbers.

Figure 19:
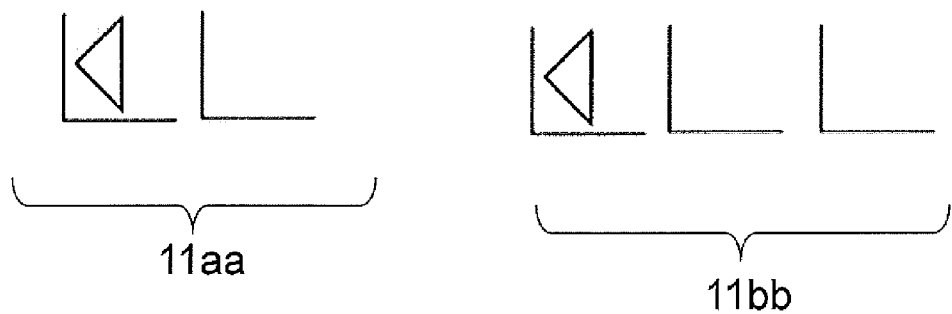
FIGS. 19A-B shows the quantities of 10 and 100.
Figure 20A:
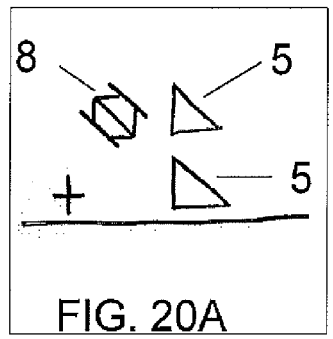
FIGS. 20 A-F show place value addition.
Figure 20B:
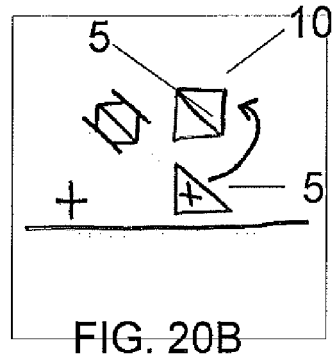
Figure 20C:
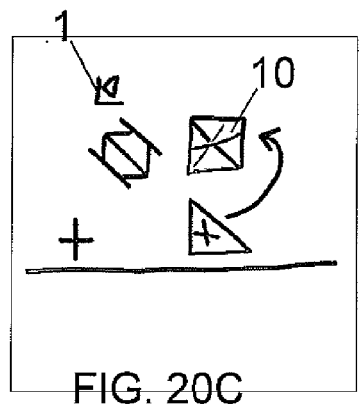
Figure 20D:
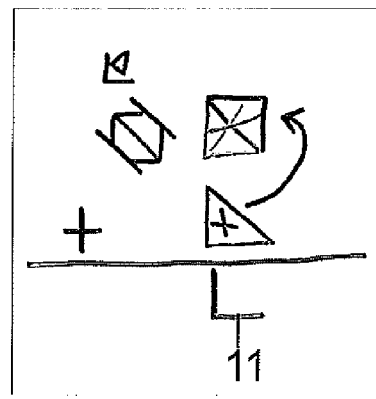
Figure 20E:
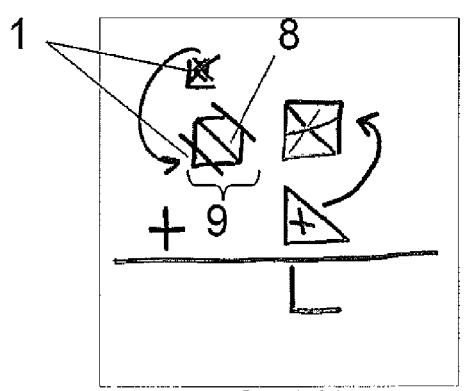
Figure 20F:
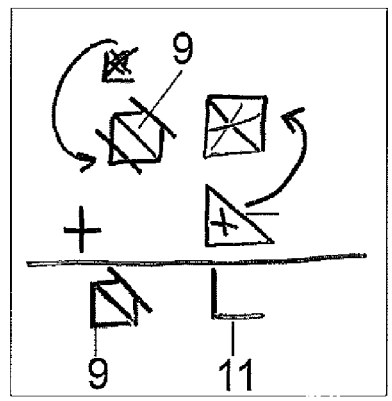

Place value is when a numbers place within the context of another number determines that digits worth. The 1 in the number 10 represents ten things while 1 in the context of 100 represents one hundred things. Similarly, in SHAPE MATH™, a one shape 1 followed by a zero shape 11 seen in place value representation 11aa (shown in FIG. 19A) represents the quantity of ten while a one shape 1 followed by 2 zero shapes 11 shown in place value representation 11bb (seen in FIG. 19B) represents the quantity of one hundred.

The following section will demonstrate the use of the place value system in SHAPE MATH™ as it applies to larger addition and subtraction problems. When using a place value system, one can perform mathematic operations at a specific place value at a time. These place values are organized into columns in both standard math and SHAPE MATH™. Since each column in a ten based system can hold only the numbers 1-9, one can use the SHAPE MATH™ techniques for basic addition to complete the math necessary for each column. Instead of memorizing the sums of all possible combinations of digits in each column, a SHAPE MATH™ user can apply the mechanical principles of basic SHAPE MATH™ addition to find the sums of those columns. When the sum of the ones column is greater than ten, that ten shape must be carried to the next column were it is expressed with a one shape. To perform the basic operations within each column, someone using SHAPE MATH™ would draw arrows to track the movement of the shapes being combined, redraw those shapes at the ends of the arrows and then cross off the original location of the relocated shapes.

The following example demonstrates this process.

FIGS. 20 A-F shows the addition problem 85+5. The first step of the method, seen in FIG. 20A, is to express the problem with SHAPE MATH™ numerals using eight shape 8 in the ten's place (or left column) and five shape 5 in the one's place (or right column), both in the top row, to form 85 and five shape 5 in the one's place of the bottom row to represent the quantity of 5. The next step, shown in FIG. 20B, is to draw an arrow to take the lower five shape 5 and add it to the upper five shape 5 to form a ten shape 10. The lower five shape 5 is then crossed out. The next step, shown in FIG. 20C, is to cross out the ten shape 10 from the one's place (or right column) and carry that quantity to the ten's place (or left column) where it becomes a one shape 1. A zero shape 0 is then placed in the one's column (right column) of the answer row as seen in FIG. 20D because everything in the one's column has been crossed out. The next step, shown in FIG. 20E, is to add the 1 and the 8 of the ten's column. This is done by drawing an arrow from one shape 1 to eight shape 8, crossing off one shape 1 and re-drawing one shape 1 at the end of the arrow to make the eight shape 8 into a nine shape 9. In the final step, shown in FIG. 20F, nine shape 9 of the ten's column is brought down to the answer row. Together, the nine shape 9 and zero shape 11 of the answer row represent the quantity of 90, which is the solution to the problem.

Now, turning to FIGS. 21A-F for the subtraction problem 70–25. Like the previously explained addition problem, the first step of the method is to express the problem with SHAPE MATH™ numerals as shown in FIG. 21A using a seven shape 7 in the ten's place (or left column) and a zero shape 11 in the one's place (or right column) of the minuend (top row), to form 70 and a two shape 2 in the ten's column (left column) and a five shape 5 in the ones column (right column) of the subtrahend (bottom row) to form 25. Since five shape 5 of the one's column of the bottom row is greater than the zero shape 11 of the ones column of the top row, the quantity of ten must be borrowed from the ten's column. This is done by crossing out a one shape 1 from the seven shape 7 of the tens column, drawing an arrow from that one shape 1 to the space above the zero shape 11 in the one's column and drawing a ten shape 10 at the end of the arrow as demonstrated in FIG. 21B. The next step is subtracting five shape 5 from the borrowed ten shape 10. To do this, an arrow is drawn from five shape 5 to ten shape 10 and the ten shape 10 is divided into two five shapes 5. The five shape 5 from the bottom row is crossed off along with one of the five shapes 5 of the top row as demonstrated in FIG. 21C. The uncrossed shapes of the ones column can then be totaled and moved to the answer row. In this example, a five shape 5 remains and is drawn in the answer row as shown in FIG. 21D. The next step is to subtract the ten's column of the bottom row from ten's column of the top row. To do this, the two shape 2 of the bottom row is divided into 2 one shapes 1. An arrow is then drawn from one shape 1 of the bottom row to one shape 1 of the top row and both one shapes are crossed off as demonstrated in FIG. 21D. This step only subtracts the first one shape 1 of the bottom row. The next one shape 1 of the bottom row is subtracted by crossing it off, dividing the five shape 5 from the top row into a four shape 4 and a one shape 1, and crossing off the one shape 1 created by this division as demonstrated in FIG. 21E. Next, the uncrossed shapes of the tens column can be added for a total of 4, which is expressed as a four shape 4 in the answer row of the tens column to complete the answer of 45 as seen in FIG. 21F.

Patterns

Figure 22:
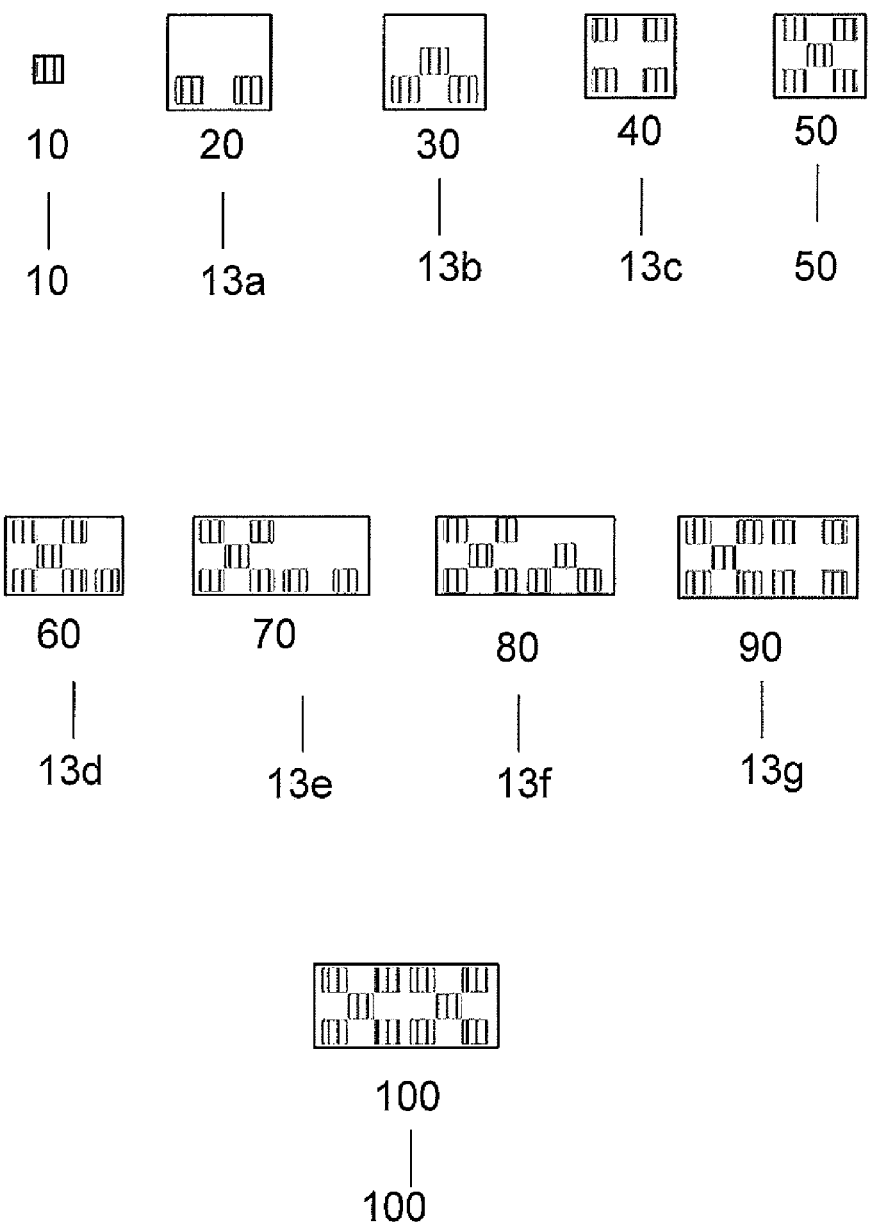

The next section introduces the patterns of ten shapes (referred heretofore as ten shape patterns) used to represent multiples of ten. The fifty pattern 50a (shown in FIG. 11B) is the basis of the ten shape patterns. Ten shape patterns below 50 maintain the basic structure of the fifty pattern with the necessary number of ten shapes removed. Ten shape patterns above fifty are combinations of fifty patterns and lower ten shape patterns. The ten shape patterns representing 10 through 100 are (shown in FIG. 22). The X pattern is used to represent 50 because X is easy to visualize mentally and the corners of each cube touch the corner of the center cube which creates negative space to distinguish each cube from the other. The ten shape patterns are used to complete addition and subtraction problems for multiples of ten using a system of direct representation instead of a place value.

Figure 23:
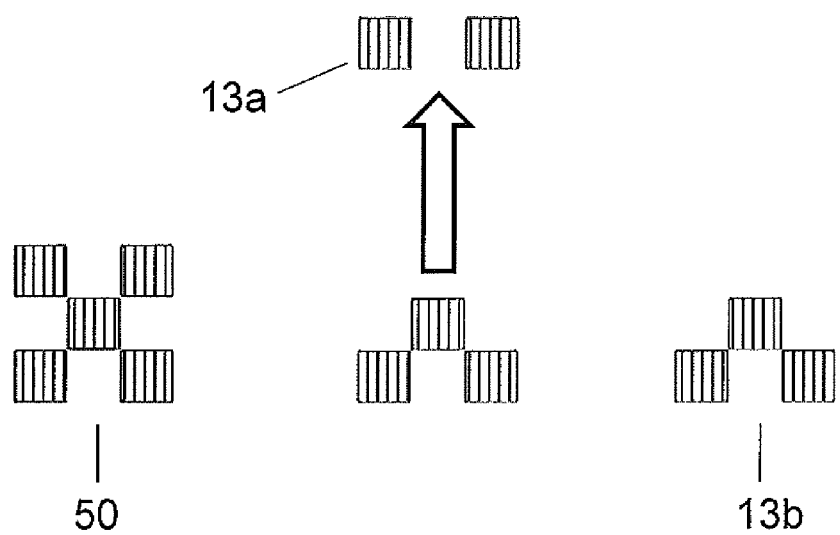

For the problem 50−20 (see FIG. 23), a SHAPE MATH™ user will first imagine a fifty pattern 50. The user will then imagine removing a twenty pattern 13a, leaving a 30 pattern 13b.

Figure 24:
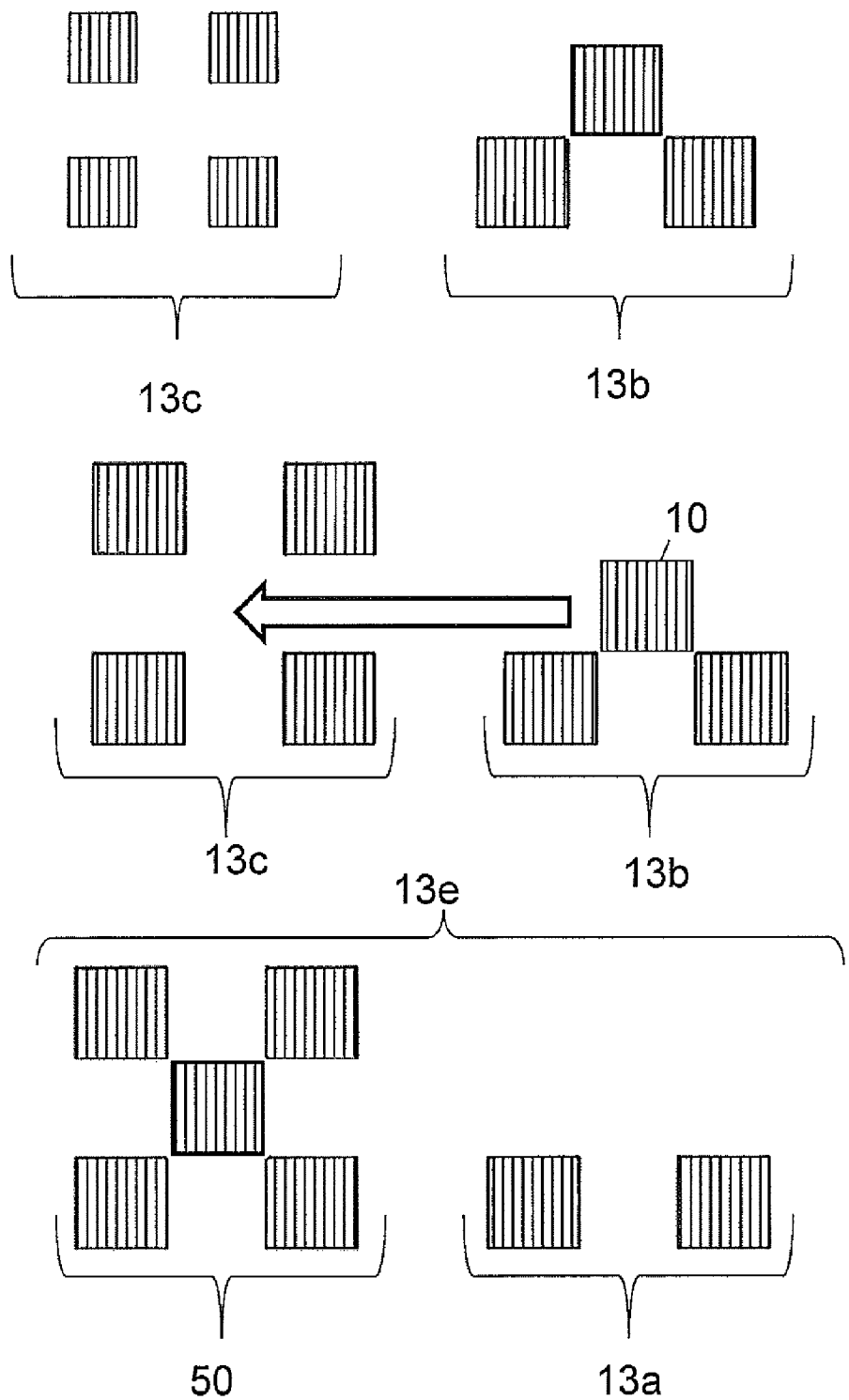

For the problem 40+30 (see FIG. 24), a SHAPE MATH™ user will imagine both a 40 pattern 13c and a 30 pattern 13b arranged side by side. Then the user will imagine sliding the top ten shape 10 of the 30 pattern 13b into the center space of the 40 pattern 13c. The result is a 50 pattern 50 next to a 20 pattern 13a, which together constitute a 70 pattern 13e, the answer to the problem. Because the basic structure of the fifty pattern is maintained, mentally manipulating the pieces is both easier and results in recognizable patterns.

Mental SHAPE MATH™ not Divisible by Ten

The next section will explain SHAPE MATH™ addition of larger numbers not divisible by ten while using direct representation instead of the place value system. While the previously described written form of SHAPE MATH™, which does rely on a place value system, allows users to do problems of any size, it is very difficult to do mentally because you have to keep track of a lot of things in your head at one time. On the other hand, direct representation allows users to visually regroup the quantities involved without worrying about their place values. Because of this, each shape always maintains the same value throughout the completion of the problem and is easier to track and manipulate. A SHAPE MATH™ user will begin by constructing the problems using both ten shape patterns and SHAPE MATH™ numerals. In the case of addition, the numbers below ten will be combined into ten shapes which will then be placed within the structure of the 50 pattern to make their final sums easily recognizable.

For the problem 18+15 (see FIGS. 25A-E), a student will imagine a ten shape 10a and an eight shape 8a to represent 18 and a ten shape 10a and a five shape 5a to represent 15 as demonstrated in FIG. 25A. It is important to note that the SHAPE MATH™ numerals are being arranged into the structure of the ten shape patterns. The next step is to combine any shapes less than ten into ten shapes. First, the five shape 5a from addition representation 14a is divided into a three shape 3b and 2 one shapes 1a as demonstrated in FIG. 25B. Next, the one shapes 1 are moved to either side of the eight shape 8 as shown in FIG. 25C to complete ten shape 15a which is shown in FIG. 25D. A user will then convert the ten shape 15a of fourth addition representation 14d to the standard red ten shape 10a, to complete the mental image shown in FIG. 25E. At this point, the SHAPE MATH™ numerals are in standard form and arranged into the ten shape pattern structure, making the final quantity of 33 easily recognizable to some with practice using the SHAPE MATH™.

Multiplication of Lower Numbers

The next section will introduce the principles behind SHAPE MATH™ multiplication for lower numbers. The goal when multiplying lower numbers is to rearrange the SHAPE MATH™ numbers into groups of 5 or 10 so their quantities can be visualized easily. This is done by mentally placing instances of the multiplied shape within a ten shapes.

Figure 26:
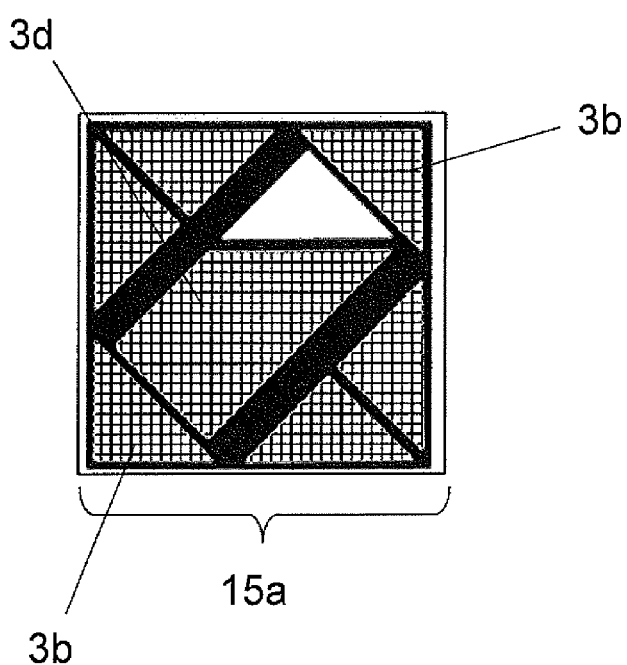

For the problem 3×3, shown in FIG. 26, a student would imagine an outer three shape 3b, then a second outer three shape 3b to form the outline of a six shape 6b, then an inner three shape 3d within six shape 6b so that the user imagines nine shape 15a.

Rearrangement

The next section will explain the first SHAPE MATH™ multiplication technique: rearrangement. Rearrangement, which was just demonstrated in its simplest form, involves moving some of the shapes to make the product of multiplication problems more recognizable.

Figure 27A:
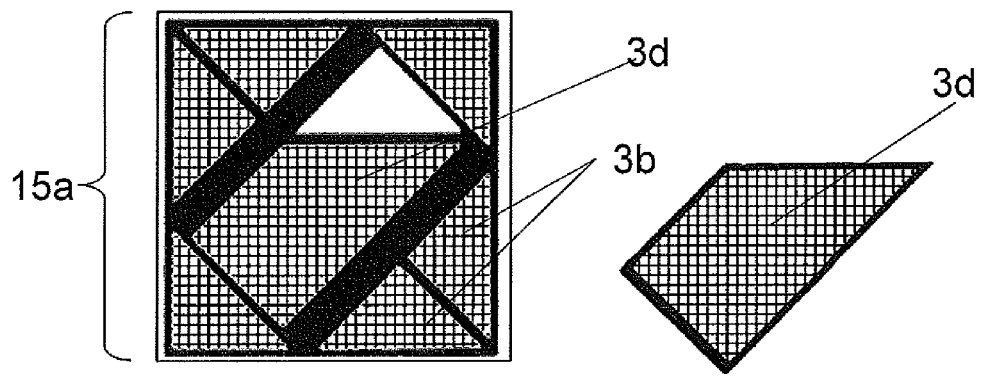
Figure 27B:
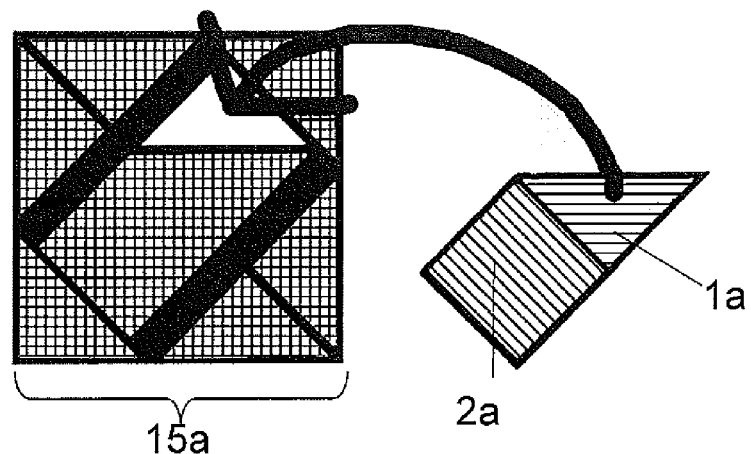
Figure 27C:
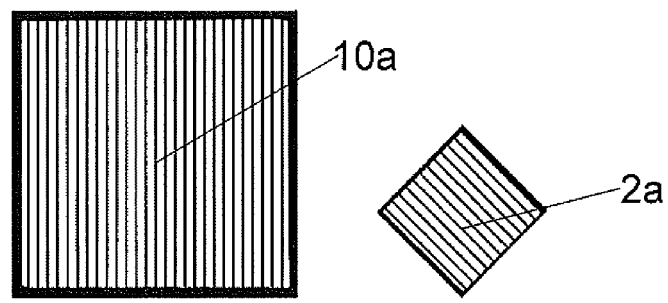

For the problem 3×4, (shown in FIGS. 27A-C) which has a product greater than ten, the student will first visualize 4 three shapes, making sure to place as many three shapes as possible within the outline of a ten shape. The first 3 three shapes are imagined as nine shape 15a and consist of 2 three shapes 3b and one three shape 3d while the 4th three shape 3d is imagined by itself as shown in first FIG. 27A. FIG. 11B shows three shape 3b when separated from other shapes. In the next step, shown in FIG. 27B, the isolated inner three shape 3d (from above) is divided into a two shape 2a and a one shape 1a. Then, the one shape 1a is moved into the empty space within shape 15a. When all the space within the outline of shape 15a has been filled, it can now be imagined as standard ten shape 10a shown in FIG. 27C. After the one shape has been moved, only the two shape 2a remains next to ten shape 10a so that the quantity of 12 can be easily recognized.

Counting Onward

The next section will explain the second SHAPE MATH™ multiplication technique: counting onward. This technique involves counting the ten or five shapes and then tallying what is left over. If the rearrangement technique has already been properly applied, the left over quantities from counting onward will be minimal.

For the problem 6×4 (shown in FIGS. 28 A-E) the student would imagine 4 six shapes 6g arranged into the context of a ten shape pattern as seen in FIG. 28A. It is important to note that shapes are almost always imagined in the context of this pattern if the quantities allow it. Imagining them this way makes them easier to visualize and remember and gives a basic structure to their arrangement that can remain consistent throughout various multiplication techniques that may be a applied to a single problem. When applying the technique of counting onward to this problem, a student would first count the five shapes 5a, for a total of 4, which should be easily recognized as the quantity of twenty when the images are mentally placed into a ten shape pattern as shown in FIG. 28B (ignore arrows for now). If is easier to visualize, one would combine the five shapes 5a from 16b into 2 ten shapes 10a, the results of which are shown in FIG. 28C. After the fives are counted, the one shapes 1a shown in FIG. 28D can then be counted (effectively rearranged), totaling 4 in this case and represented by four shape 4g from FIG. 28E, which is easily recognizable as the quantity of 24.

Subtraction

The next section will explain the third SHAPE MATH™ multiplication technique: subtraction. This technique is used when one of the multipliers is 8 or 9. A student will complete the problem as if the 8 or 9 shapes are actually ten shapes. Then, the student would count the shapes that had to be added to the 8 or 9 shapes and subtract that total from the product created by completing the problem as if they were ten shapes. See FIG. 11B for representations of eight shapes, nine shapes, and ten shapes.

Figure 29:
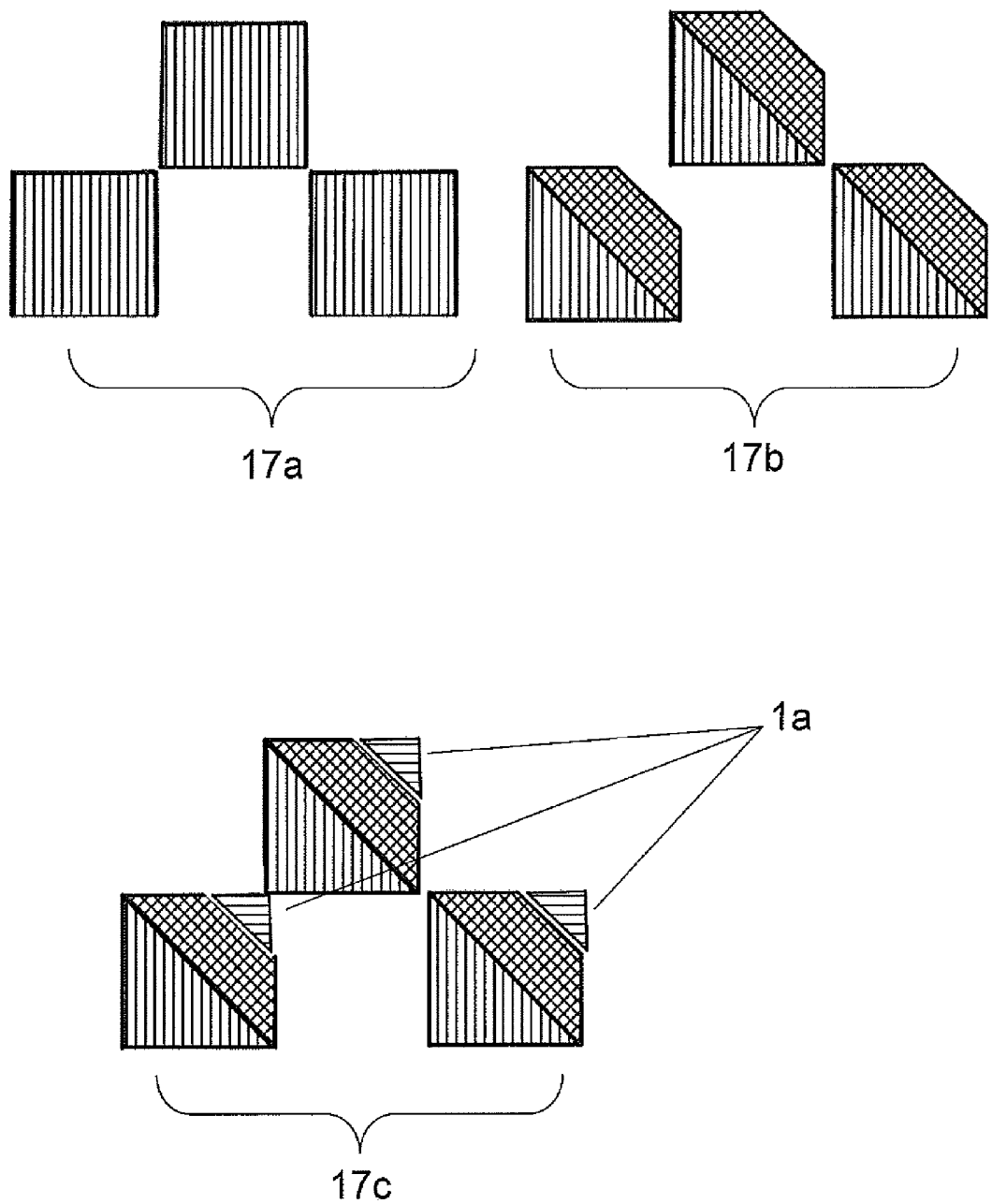

For the problem 3×9, (shown in FIG. 29) a student would create the problem 3×10 by imagining 3 ten shapes 10a as a thirty pattern as shown in first multiplication representation 17a. Then, the student will convert the ten shapes 10a into 9 shapes as shown in second multiplication representation 17b. In order to convert the ten shapes 10a into nine shapes 9a, a one shape 1a had to be removed from each ten shape 10a. These one shapes 1a are visually represented in third multiplication representation 17c, and total 3, which will be obvious to any student creating this mental image. The quantity of 3 is then subtracted from the quantity of 30 using techniques from the subtraction section and the answer of 27 is calculated.

Splitting

The next section will explain the fourth SHAPE MATH™ multiplication technique: splitting. When working with multiplication problems such as 5×6 or higher, a discalculic will not have the working memory to employ only the rearrangement and counting onward techniques. Splitting allows SHAPE MATH™ users to divide larger multiplication problems into two smaller problems.

Figure 30A:
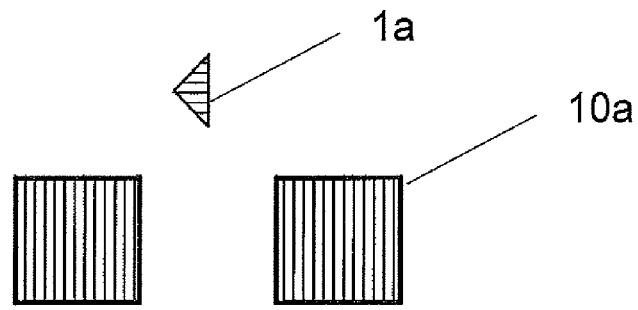
Figure 30B:
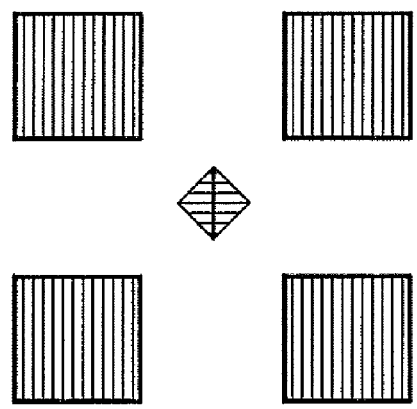

The problem 6×7 can be broken down into 2 instances of the problem 3×7. The sub-problem 3×7 can be solved more easily and its answer can then be added to itself to find the answer to 6×7. When possible, it is best to split the even multiplier of a multiplication problem. This is because even numbers can be split evenly and easily. One could complete the problem 3×7 in several ways using the previous multiplication techniques. If the student works within the ten shape pattern, the answer to 3×7, shown in FIG. 30A, will be composed of 2 ten shapes 10a and 1 one shape 1a. To add this quantity to itself (or double it), a student can imagine a second instance of the mental image for 21 seen in FIG. 30A and then slide both instances together to form the pattern shown in FIG. 30B, which is easily recognizable as a representation of the quantity of 42.

Figure 31:
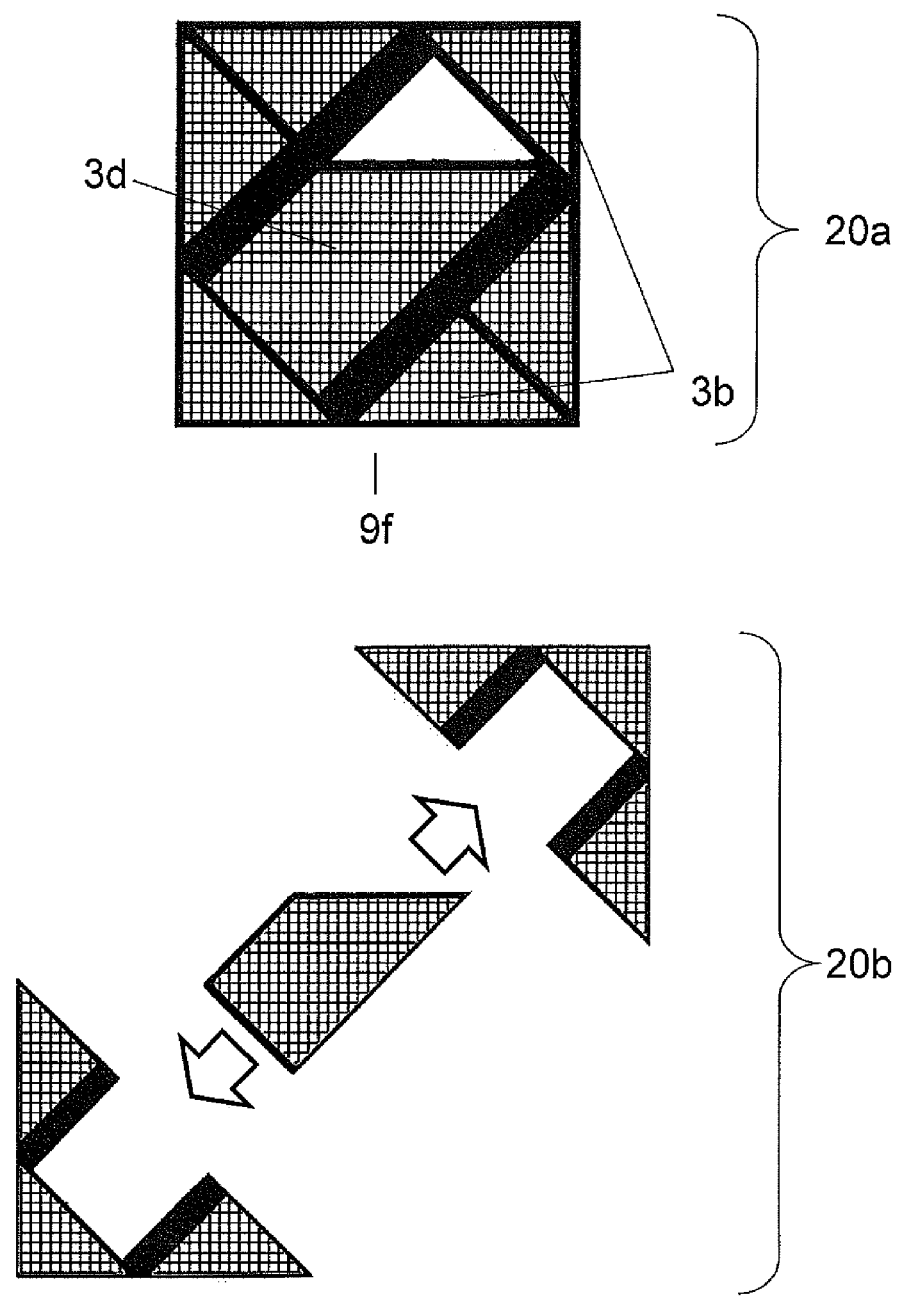

Some larger problems require special techniques to complete. The problem 9×9, for example, contains no even multipliers. Instead of splitting the 9's in half they must be broken into thirds. In order to do this, a SHAPE MATH™ student will first imagine the nine shape 9f from first multiplication representation 20a (shown in FIG. 31). This nine shape 19a is composed of 2 three shapes 3b and 1 three shape 3d for a total of 3 three shapes. A student can move the mental images of these shapes apart to visually represent the division of a nine shape into 3 three shapes, a process demonstrated in second multiplication representation 20b.

Figure 33:
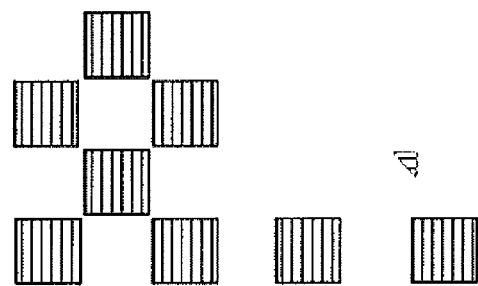

Once the 9 has been broken into 3's, one can complete the simpler problem of 3×9 and triple the answer. The earlier SHAPE MATH™ techniques are sufficient to find that 3×9=27. However, adding together 3 instances of 27 can be confusing and may require too much working memory to use only the addition techniques from earlier sections. In order to find the answer to 27+27+27, a SHAPE MATH™ user must be familiar with 60 base operations. Much like the ten shapes are single conceptual unit that represents the quantity of ten, a 60 pattern 60a (shown in FIG. 11B) is a single conceptual unit that represents the quantity of 60. In the context of this problem, a SHAPE MATH™ user will first arrange the quantity of 27 into 2 ten shapes 10a, a five shape 5a and a two shape 2a to make a 27 pattern shown in FIG. 32A. The user will then create a mental image of three 27 patterns 21a within the context of a 90 pattern shown in FIG. 32B. The 90 pattern 21b uses the 60 base system described earlier and is composed of a 60 pattern 60a and 30 pattern 13b. When the user replaces the thirty patterns 13b with 27 patterns 21a, the mental image from FIG. 32C is created. Imagining the 27 patterns 21a within the 90 pattern 21b helps to simultaneously visualize all the shapes involved because they are placed within the context of larger conceptual units. Once the user has imagined the pattern from FIG. 32C, they can use the subtraction technique of multiplication explained earlier to determine that 1 three shape 3b (see FIG. 11B) is missing from each thirty pattern, for a total of 3 three shapes. These 3 three shapes can be compiled into a 9 shape 20a (shown in FIG. 31) using the addition techniques described earlier. This nine shape can then be subtracted from the 90 pattern shown in FIG. 32B so that the user has the mental image (shown in FIG. 33), which can be recognized as the quantity of 81. This process may seem complicated to someone already familiar with standard math, however, it easier for a dyscalculic to perform these steps than to memorize nearly 100 solutions to 100 problems. Each step in the process follows a logical progression that manipulates shapes within conceptual units that are easy to visualize and group together.

Place Value Multiplication

Figure 34:
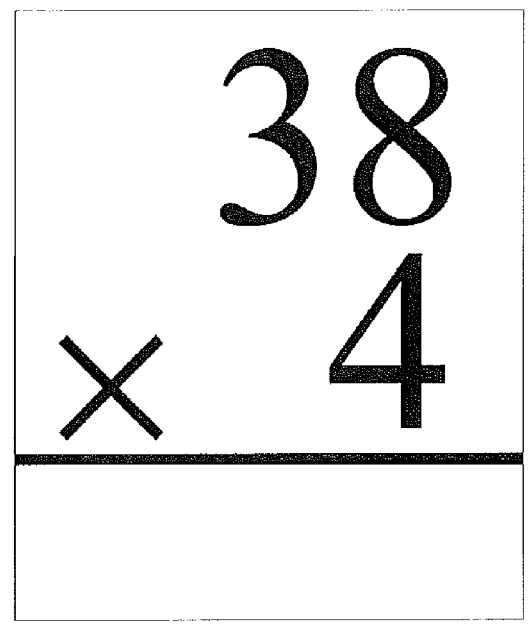

Once the techniques for completing times tables up to 9×9 are learned, a SHAPE MATH™ user can apply them within the place value system of standard math in order to complete larger problems. For example, FIG. 34 shows the problem of 38×4 as it would be seen in standard math. The previously described techniques can be used to multiply 4×8 and 4×3 to complete the basic multiplication needed when completing the problem within the structure of standard math. The problem is not demonstrated with a figure including SHAPE MATH™ numbers because the process can be completed by applying the previously explained multiplication techniques to the structure of multiplication seen in standard math.

Time Conversion

Figure 35:
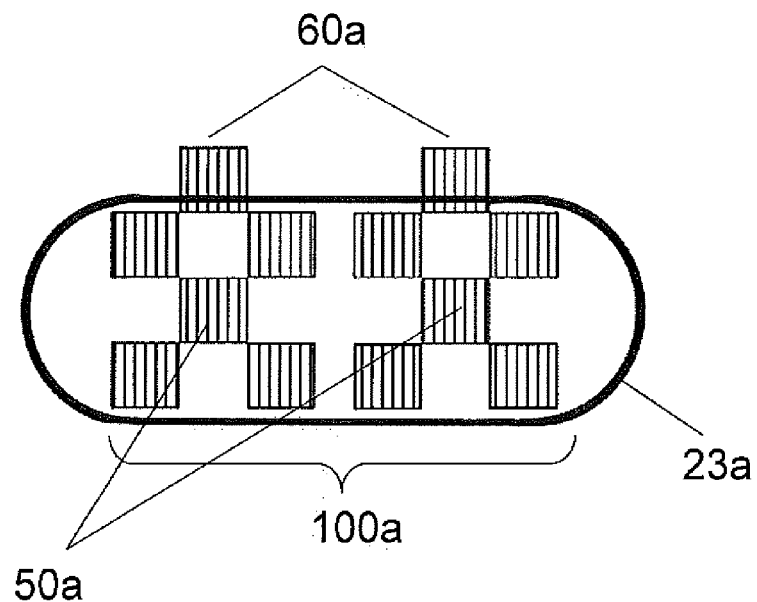

Now, turning to FIG. 35, the next section will demonstrate how SHAPE MATH™ is applied to converting units of time (seconds, minutes, hours). Because the system of time has a base of 60, the 60 pattern 60a is used to express minutes or hours. If the 60 pattern 60a expresses an hour, then each ten shape 10a within the pattern expresses ten minutes, for a total of 60 minutes. Similarly, when a 60 shape 60a is used to express one minute, each ten shape 10a within the pattern expresses 10 seconds for a total of 60 seconds. The 60 shapes are easy to visualize in groups because each 60 pattern 60a contains a fifty pattern 50a (see FIG. 11B), and when those 60 patterns 60a are placed side by side (as shown in FIG. 35), the 50 patterns 50a within them form a 100 pattern 100a, which is separated by outline 23a. One should note that outline 23a exists in this figure purely to clarify which ten shapes 10a compose the 50 patterns 50a. When doing time conversation within the 60 pattern structure 60a, a SHAPE MATH™ user will count the number of ten shapes 10a and ad a zero to that total to calculate out how many minutes represented.

Minutes to Hours

Figure 36:
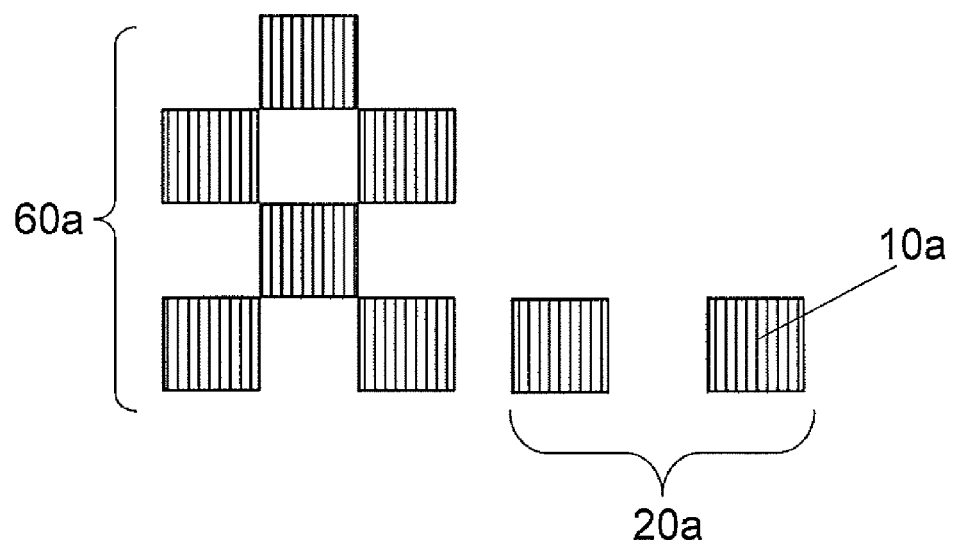

To convert 80 minutes into hours, the minutes are expressed as 8 ten shapes 10a and placed according to the convention of the 60 pattern to create the mental image shown in FIG. 36. The first 6 ten shapes 10a make up a 60 pattern 60a and the remaining 2 ten shapes 10a make up a 20 pattern 20a. Conceptually, a SHAPE MATH™ user will realize that the 60 pattern 60a represents one hour and the 20 pattern 20a represents the remaining 20 minutes, for a total of 1 hour and 20 minutes.

Figure 37:
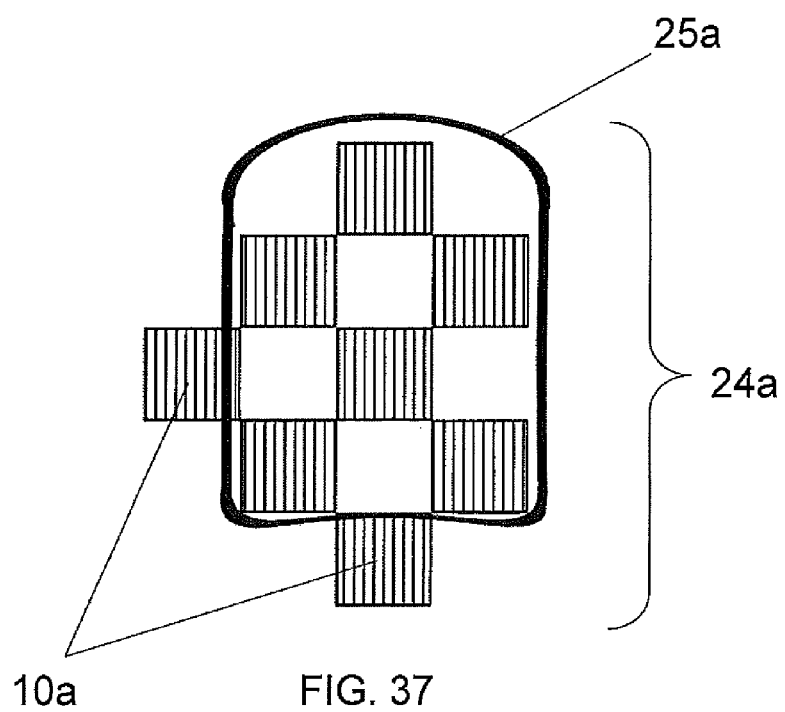

Another way of completing this problem is creating the mental image of an 80 pattern 24a (shown in FIG. 37). The user will mentally distinguish the 60 pattern (separated by outline 25a) from the remaining 2 ten shapes 10a for a total of 1 hour and 20 minutes.

Hours to Minutes

In order to convert hours to minutes, the ten shapes are totaled by conceptually separating the 50 patterns 50a, grouping them into 100 patterns (if necessary) and tallying the remaining ten shapes 10a. For example, to convert 4 hours into minutes (a process shown in FIGS. 38 A-C), a student would first create the mental image of 4 sixty patterns 60a as seen in FIG. 38A. Then, the fifty patterns 50a are distinguished and grouped into 2 one hundred patterns as seen in FIG. 38B. These 2 one hundred patterns 100a represent 200 minutes. The remaining ten shapes 10a, seen in FIG. 38C, are added for a total of 4 and represent 40 minutes, which can be added to the 200 minutes represented by the 100 patterns for the answer of 240 minutes.

SHAPE MATH™ Cube

Figure 39:
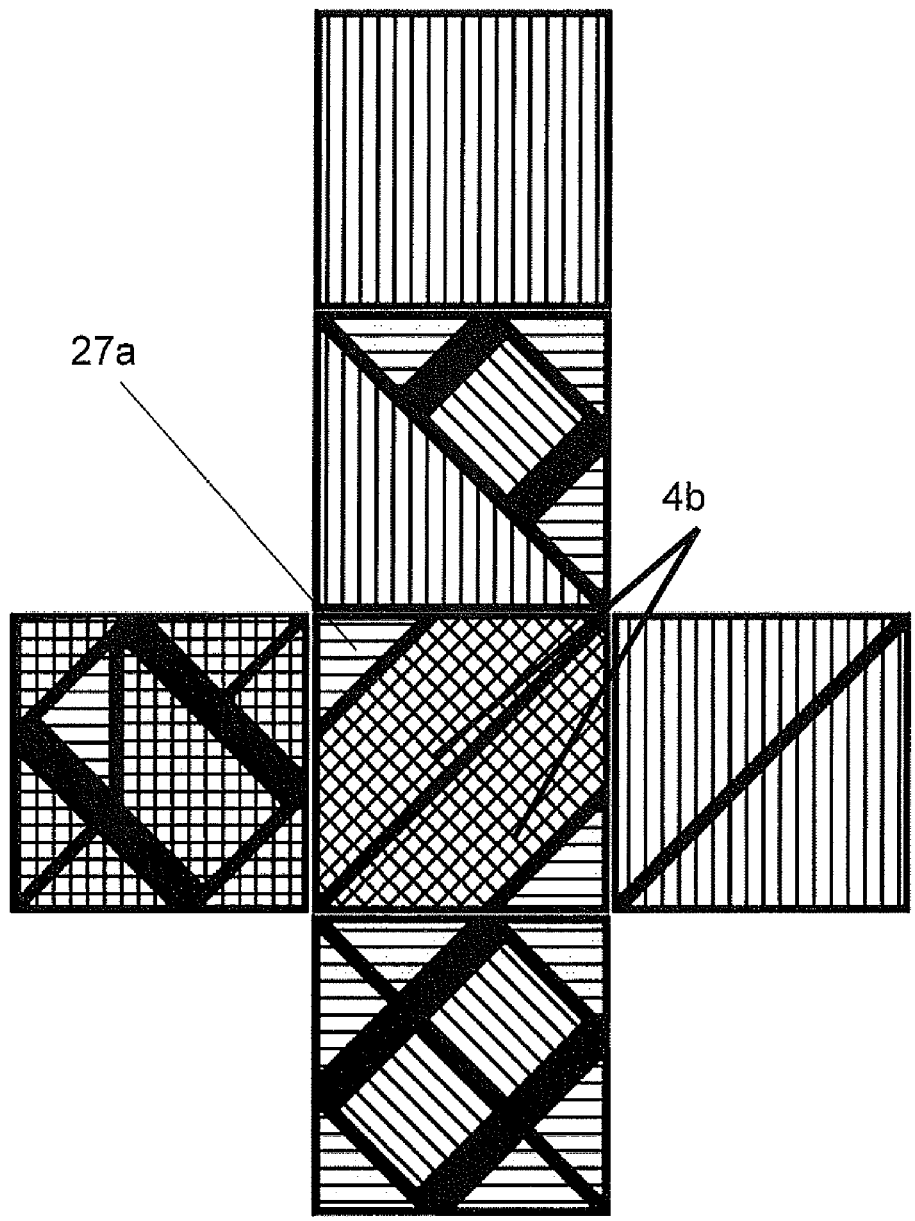
FIG. 39 shows a SHAPE MATH™ cube laid flat.

The next section will explain the SHAPE MATH™ cube, an instructional tool to aide in learning and operating with SHAPE MATH™. The SHAPE MATH™ cube is a physical cube with each side displaying a particular ten shape. FIG. 39 displays the faces of the cube before they are folded. A SHAPE MATH™ student can use the SHAPE MATH™ cube as a quick reference when there is a need to conceptualize particular ten shapes. For example, if a student needs to conceptualize a ten shape consisting of 2 four shapes, they could quickly browse the cube until their eyes find the four shapes 4b shown on ten cube face 27a. The SHAPE MATH™ cube is most useful in division when it becomes necessary to determine the multiples of a number within another number, as well as the quantity that remains after those multiples are determined.

Mental Division

Figure 40:
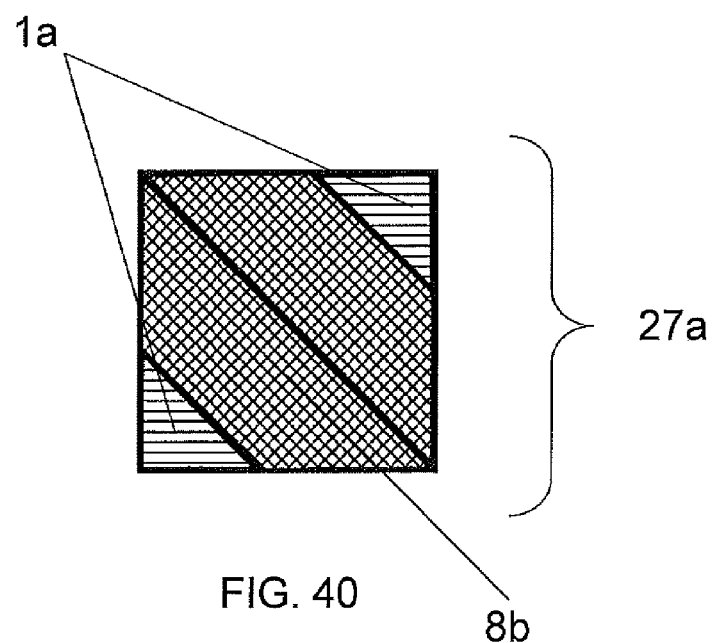
FIGS. 40-44 demonstrate mental division.

The next section will explain mental division using SHAPE MATH™ and the SHAPE MATH™ cube. When learning division, a student will start by dividing ten by various numbers. The problem 10÷8 would be solved by first searching the SHAPE MATH™ cube for face 27a (shown separately in FIG. 40) which displays an eight shape 8b (compounded from 2 four shapes) and two one shapes 1a. This visual indicates that the quantity of ten contains 1 instance of the quantity of 8 with 2 as a remainder.

Figure 41:
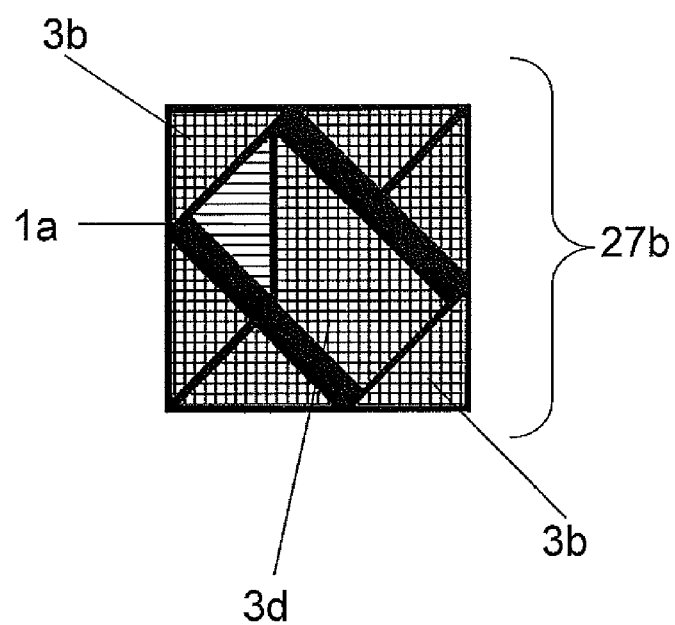

Similarly, when calculating 10÷3, a student would first search for cube face 27b (shown in FIG. 41). The 2 outer three shapes 3b and 1 inner three shape 3d can then be counted for a total of 3. The remaining 1 shape is easily recognized as the remainder so that cube face 27b indicates the answer of 3 with a remainder of 1.

Figure 42:
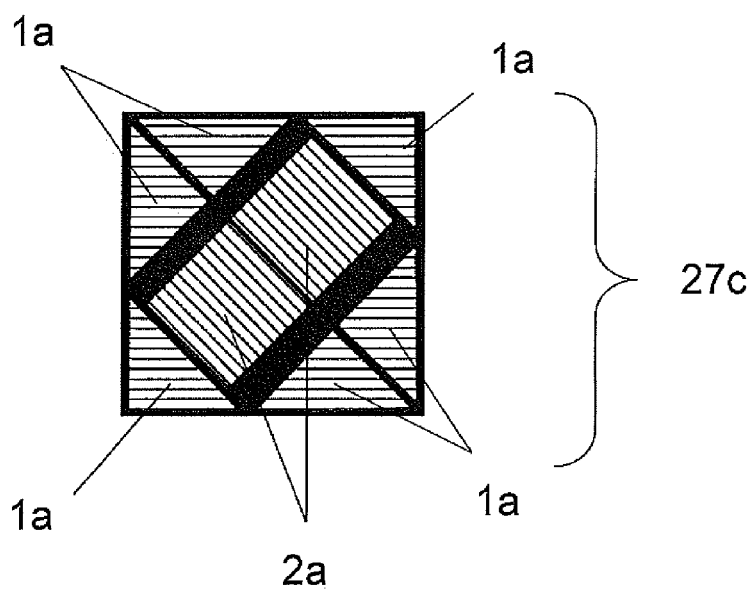

It is important to note that when dividing even numbers by 2, it is easier to divide the shape in half than to visualize and count the 2 shapes within a larger SHAPE MATH™ number. For the problem 10÷2, it is easier to visualize ten shape 10a (FIG. 11B) and divide it in half to make ten shape 10b (FIG. 11B) and determine the answer of 5. The alternative is to visualize cube face 27c (shown in FIG. 42) representing ten shape 10d, count the 2 shapes 2a and recognize that the remaining one shapes 1a can be combined to make 3 more two shapes 2d (FIG. 11B) for a total of 5.

When dividing with a divisor (number going into the dividend) larger than ten, a SHAPE MATH™ user will visualize the dividend (the number the divisor goes into) and then estimate the quotient (answer). The user will then visually distinguish a number of ten shapes within the dividend that is equal to their estimation of the quotient (answer). Those ten shapes are then combined with smaller shapes from what remains of the dividend in order to convert each ten shape into the quantity of the divisor. The instances of these groupings are then totaled for the answer, with a remainder existing for certain problems. This process may seem extremely confusing, however, an example demonstrates that it is more simple in practice.

Figure 43:
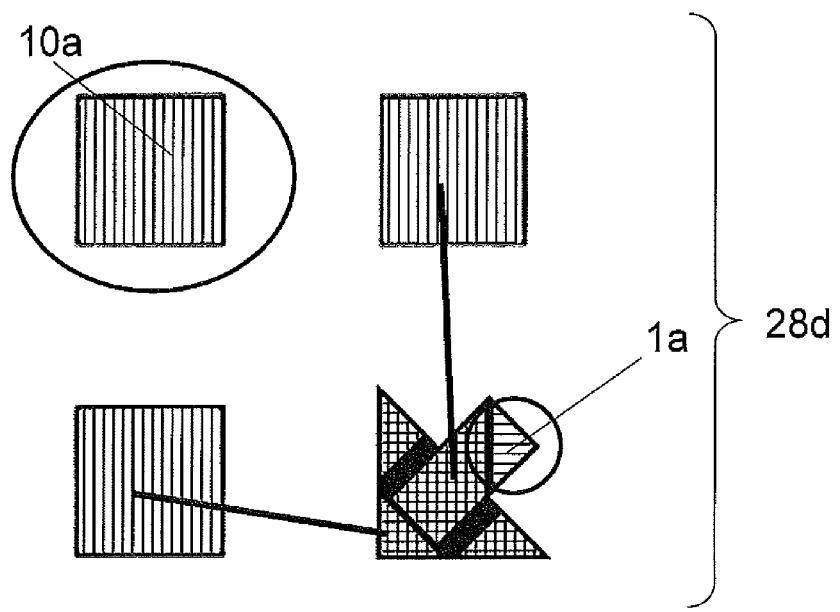

Now turning to FIG. 43 illustrating the completion of 37÷13 (shown in FIG. 43), the basic goal is to isolate ten shapes within the dividend (37) and combine them with left over shapes from that dividend to create instances of the divisor (13). In this problem, the process effectively combines ten shapes with three shapes to find the instances of 13 within 37. One would first draw a thirty seven pattern seen in FIG. 43A and consisting of 3 ten shapes 10a and seven shape 29a. For the purposes of this example, full color figures will be used instead of pencil drawings. The next step is to estimate the quotient (answer) and distinguish a number of ten shapes equal to that estimate. In this case, one would most likely estimate that 13 goes into 37 2 times and thus distinguish 2 ten shapes 10a marked in this example with a circle (not typically drawn in practice) as seen in FIG. 43B. Then, the distinguished ten shapes 10a are combined with inner three shape 3d and outer three shape 3b, a process that is marked by lines 29b (drawn in practice) in order to distinguish 2 separate instances of 13 (the divisor) within 37 (the dividend) as seen in FIG. 43C. It is important to note that seven shape 29a was chosen during the first step because it includes three shapes, the amount needed above ten to complete the divisor (13). The 2 instances of 13 (the divisor) that could be distinguished within 37 (the dividend) represent the quotient (the answer). Thus, before calculating the remainder, we find the quotient so far is 2.

Figure 44:
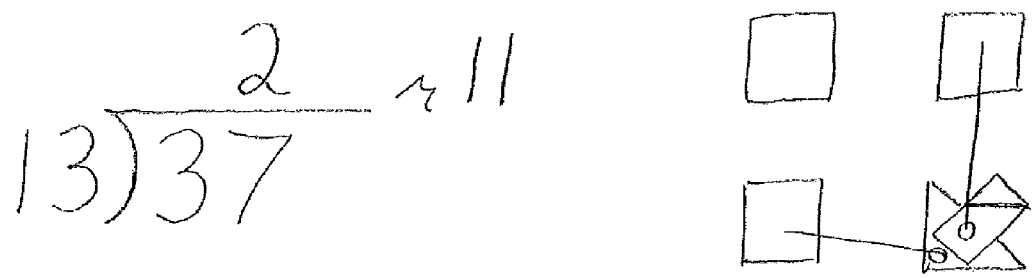

After the quotient (answer) is calculated, the remainder must then be calculated to determine an exact solution to the problem. This is done by counting the quantity of the shapes not included in the answer thus far. In this example, a ten shape 10*a* and a one shape 1*a* as see in FIG. 43D and marked by circles not typically drawn, are left as a remainder, and total 11 so that the final answer of 2 with remainder 11 is calculated. FIG. 44 shows this example as a SHAPE MATH™ student would write it in practice.

Mental Division (Direct)

Figure 45:
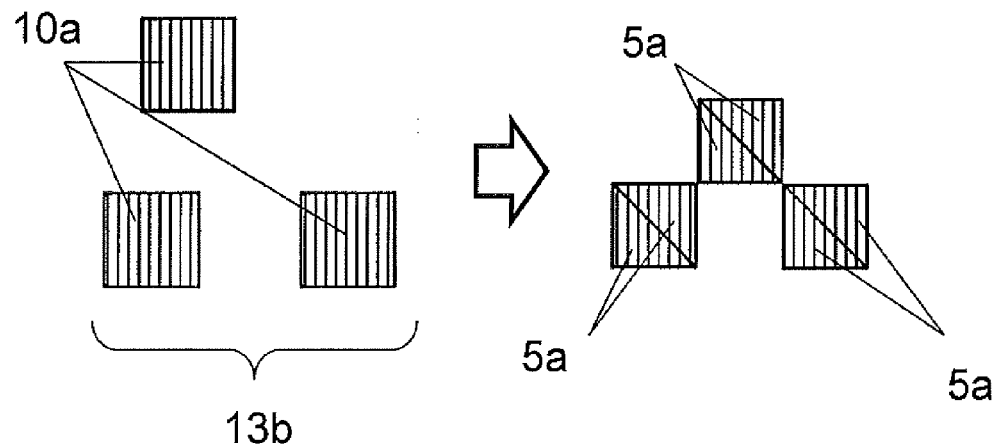
FIGS. 45-46 demonstrate direct mental division.
Figure 46:
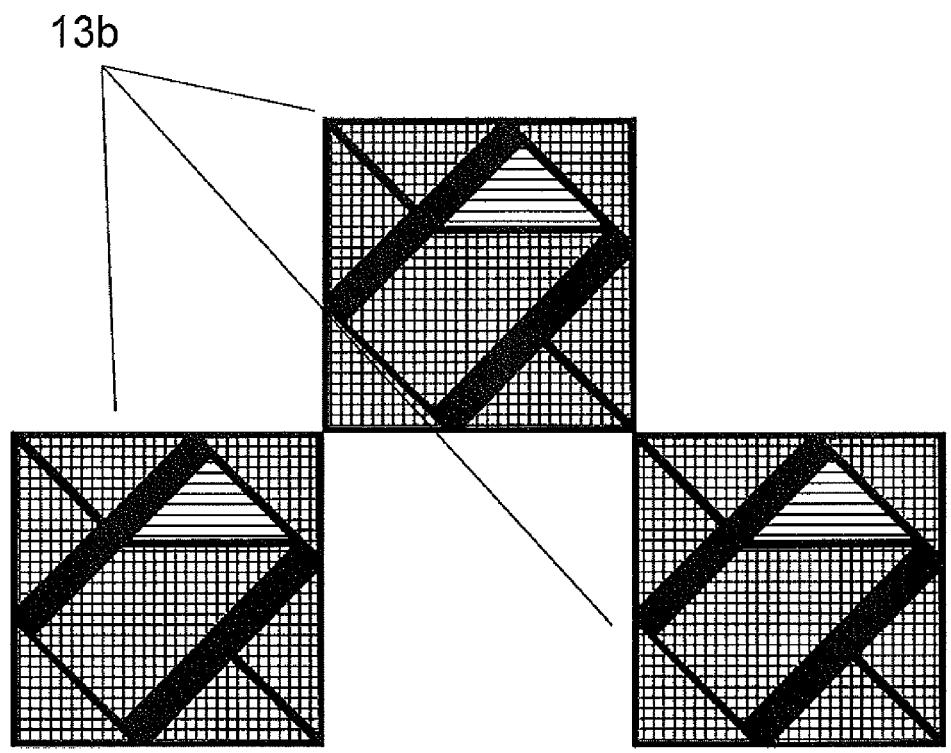

Certain division problems are simple enough to perform mentally by visualizing directly the instances of a divisor within a quotient. For example 30÷5 (see FIG. 45) is simple enough for a student to imagine 3 ten shapes 10*a* in a thirty pattern 13*a* and split them into 6 five shapes 5*a*. Even some problems that do not divide evenly (the shapes not the quantities) can be fully visualized mentally and the answers counted from this image. For example 30÷3 can be solved by visualizing 3 instances of ten shape 27*b* (shown in FIG. 46). The 3 three shapes per ten shape 27*b* can be added for a total of 9 and the remaining 3 one shapes 1*a* combined to make a 10th three shape, indicating 10 as the solution to 30÷3.

Long Division

Figure 47A:
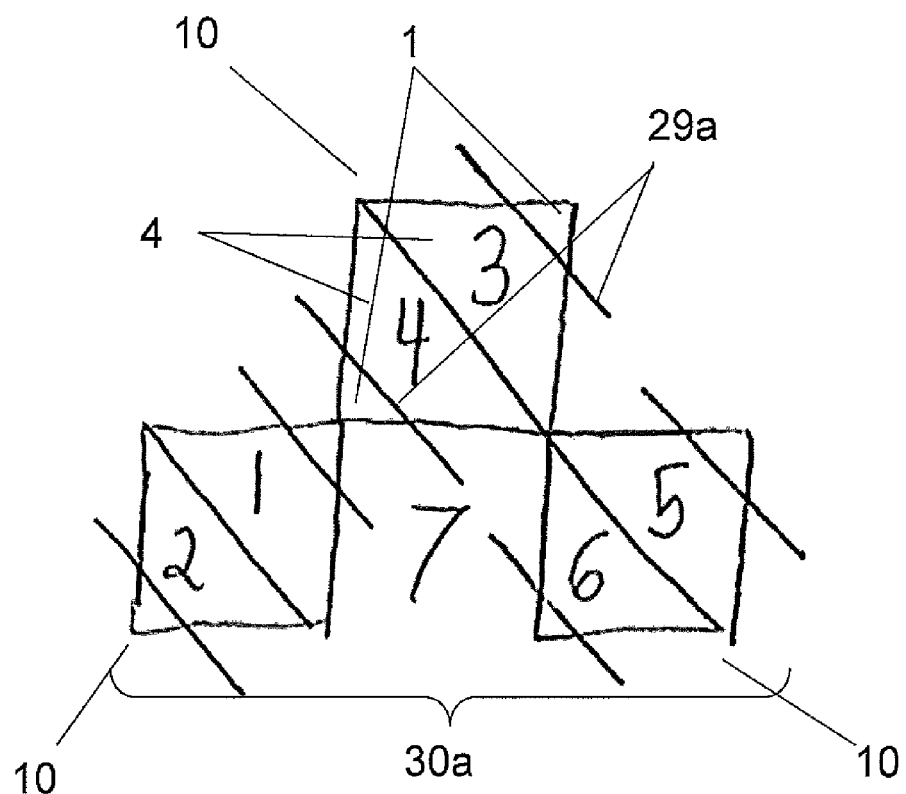
FIGS. 47A-B demonstrate long division.
Figure 47B:
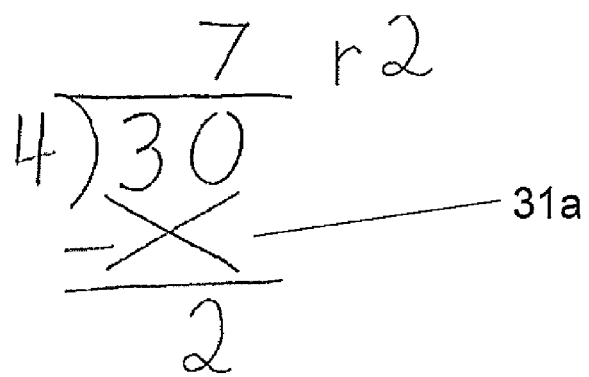

The next section will explain the techniques for completing long division with decimal solutions instead of remainders. The problem 43÷4 can be completed with the previously described techniques to yield the answer: 10 r3 (10 with remainder 3). However, sometimes solutions must be calculated in the form of a decimal. In SHAPE MATH™, remainders are converted to decimals in a way that is similar to standard math. The remainder is first multiplied by 10 and then divided by the original divisor. If the answer to this step also contains a remainder, the process must be repeated until the solution no longer contains a remainder. In this case the remainder is three and thus converts to 30 which is then divided by the original divisor of 4. Some SHAPE MATH™ users can complete this problem (30÷4) mentally, however, FIG. 47A demonstrates the written form of this equation and shows some of the conventions of written division not yet covered. The ten shapes 10 of the thirty pattern 30*a* are first broken into four shapes 4 by drawing slashes 29*a*. This divides each ten shape 10 into 2 four shapes 4 and 2 one shapes 1 (reference numbers are only added to the top ten shape). A SHAPE MATH™ user will then count the four shapes 4 by marking them 1 through 6. The remaining one shapes 1 are then totaled into groups of 4. In this case, one four shape 4 was made from totaling the one shapes 1 and marked with a '7' placed within the thirty pattern 30*a*. Since 2 one shapes 1 remain from this process, we know that 30÷4=7 r2. Sometimes larger problems require SHAPE MATH™ users to track these steps using standard long division. FIG. 47B shows the problem of 40÷3 as a SHAPE MATH™ user would write it to track their progress. The 'X' 31*a* is placed over the subtraction step because SHAPE MATH™ does not use subtraction to discover the remainder, but instead comes to this total by counting the remaining shapes that cannot be grouped into multiples of the divisor. In this case, 2 one shapes 1 remained after 30 was divided into 7 four shapes 4. Since the remainder of 2 still exists, the process must be repeated. Remainder 2 is multiplied by 10 and thus converted to 20 and then divided by the original divisor of 4. Written as a completed equation, this process reads 20÷4=5 r0. Since no remainder exists, we can now complete the final answer using the sub-answers from each step of this process. In this example, while completing (43÷4) we calculated the following equations: 43÷4=10 r3, 30÷4=7 r2, 20÷4=5 r0. Each time the remainder of the previous equation was multiplied by ten and became the dividend of the next equation. To find the final solution, the answers to each sub-equation must be written without remainders in order of completion. In this case the answers when written in this way read 1075. At this point, the decimal must be added to complete the solution. The placement of the decimal depends on the number of remainders that were given a zero (multiplied by ten). In this case 2 zeros were added and the decimal is thus placed two spaces from the far right making 1075 into 10.75, the decimal answer to 43÷4.

Money

Coins

Figure 48:
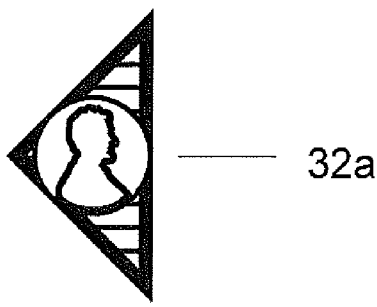
Figure 49:
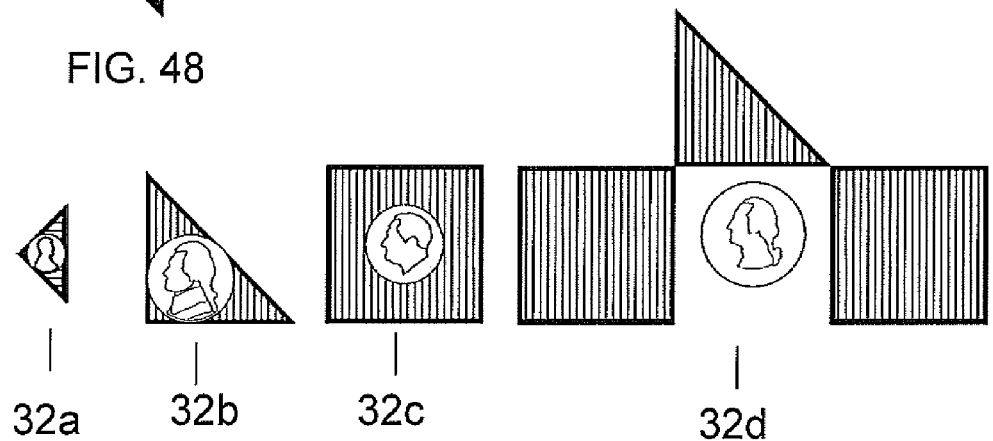
Figure 50:
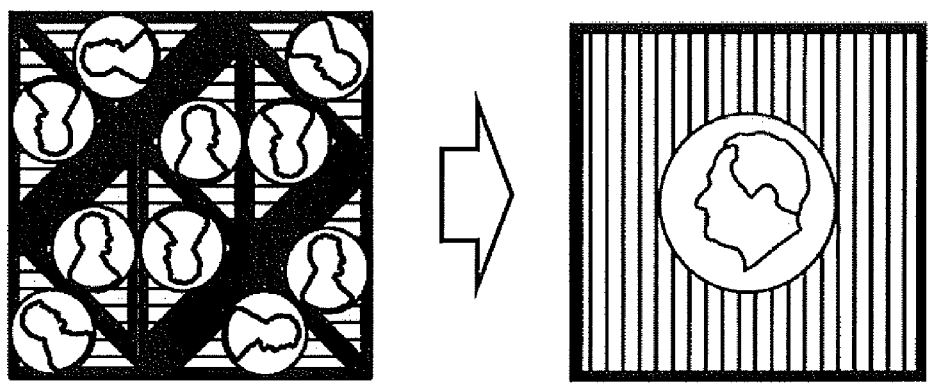

The next section will introduce the concepts and tools used to apply SHAPE MATH™ to money. Much like each digit has a corresponding shape, each denomination of U.S. currency also has a corresponding SHAPE MATH™ shape that is sized relative to its value. The base shape for SHAPE MATH™ money is the one triangle, which is used to make the SHAPE MATH™ penny 32*a* (shown in FIGS. 48 and 49). The higher SHAPE MATH™ coins (nickel 32*b*, dime 32*c*, and quarter 32*d*) which are shown in FIG. 49 are all built from SHAPE MATH™ pennies and can be combined using the same principles of standard SHAPE MATH™ shapes. For example, 10 SHAPE MATH™ pennies 32*a* can be combined into a ten shape 32*e* which is the equivalent in size and value to a SHAPE MATH™ dime 32*c*, (as shown in FIG. 50).

Figure 51A:
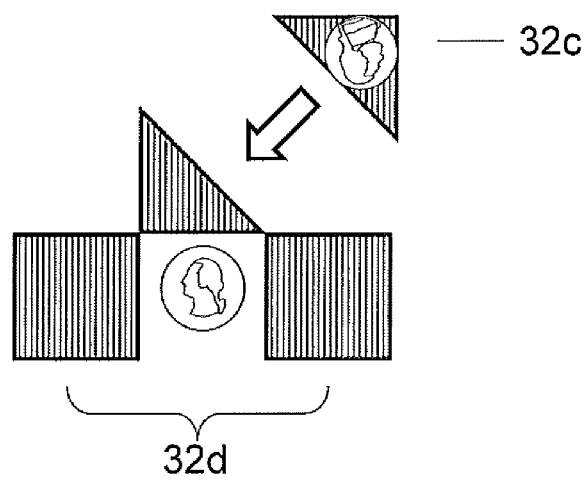
Figure 51B:
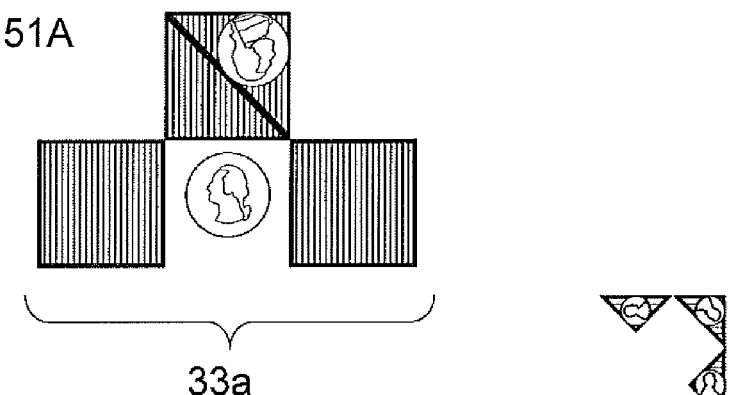
Figure 51C:
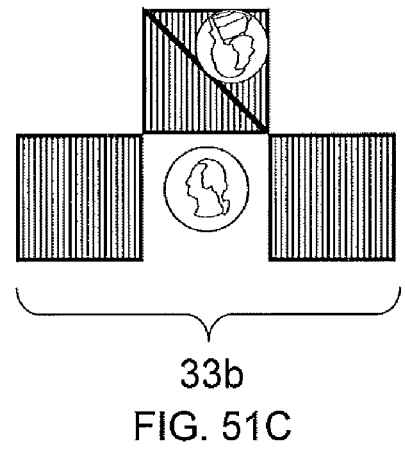

The SHAPE MATH™ coins will aid a discalculic when working out problems that deal with change. For example, a SHAPE MATH™ student may need to make 33 cents change. Using the SHAPE MATH™ coins, the denominations can be combined physically to create a 32 pattern. Turning to FIG. 51A, this construction will begin with a SHAPE MATH™ quarter 32*d* which is a particular 25 pattern. Then, a student will picture the addition of a SHAPE MATH™ nickel 32*c* in order to make a particular 30 pattern 33*a* (See FIG. 51B). Finally, 3 SHAPE MATH™ pennies are added to complete 33 pattern 33*b* (See FIG. 51C).

Figure 52A:
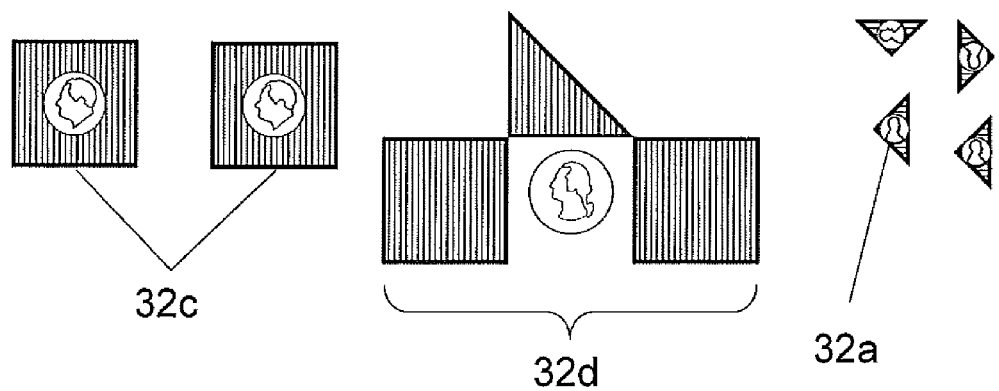
Figure 52B:
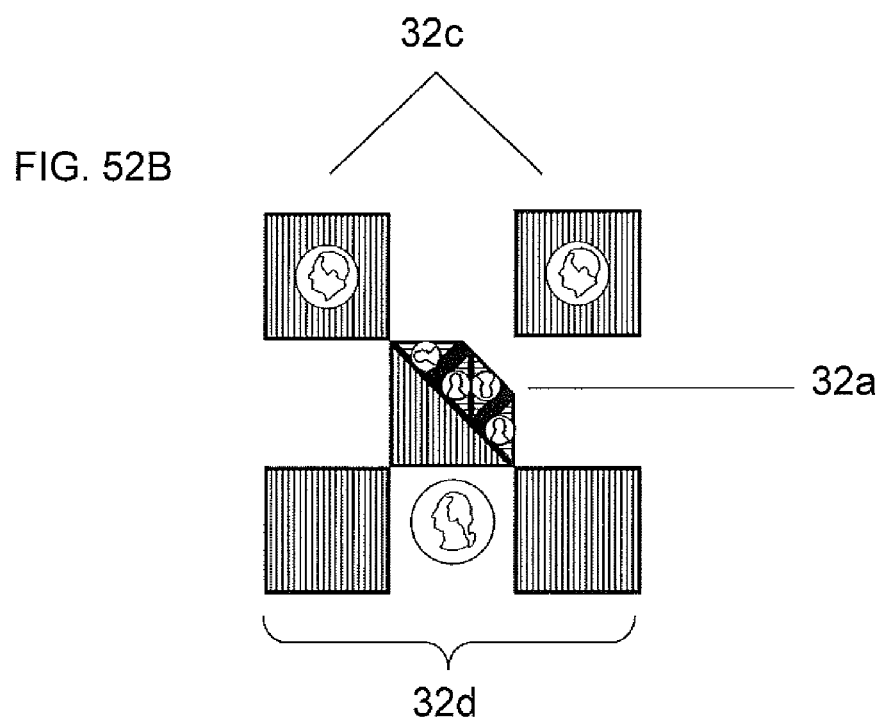

This additive process can also be used to complete addition problems as well. For example, a student may have 2 dimes 32*c*, a quarter 32*d*, and 4 pennies 32*a* (shown in FIG. 52A). If that student needed to calculate the sum of these coins, they could arrange the corresponding SHAPE MATH™ coins into the structure of the fifty pattern in order to show their total value. When 2 dimes, a quarter, and 4 pennies are rearranged into the structure of the fifty pattern, they create a 49 pattern (shown in FIG. 52B). Much like the application of the fifty pattern elsewhere in SHAPE MATH™, arranging the coins in this way makes their total value more obvious. A student may see a forty pattern and a nine shape or they may see a fifty pattern missing a one shape. In either case, the arrangement into logical patterns and consistency of relative sizes allows a dyscalculic to visualize the addition of coins. In this case, the sum of 49 cents is made obvious.

SHAPE MATH™ can also be used in subtraction problems dealing with money. Since most subtraction problems are too difficult to imagine while using SHAPE MATH™ coins, a written form of SHAPE MATH™ subtraction is used in which the minuend is represented by a pattern, the subtrahend crossed off, and the difference counted from the remaining shapes.

Figure 53:
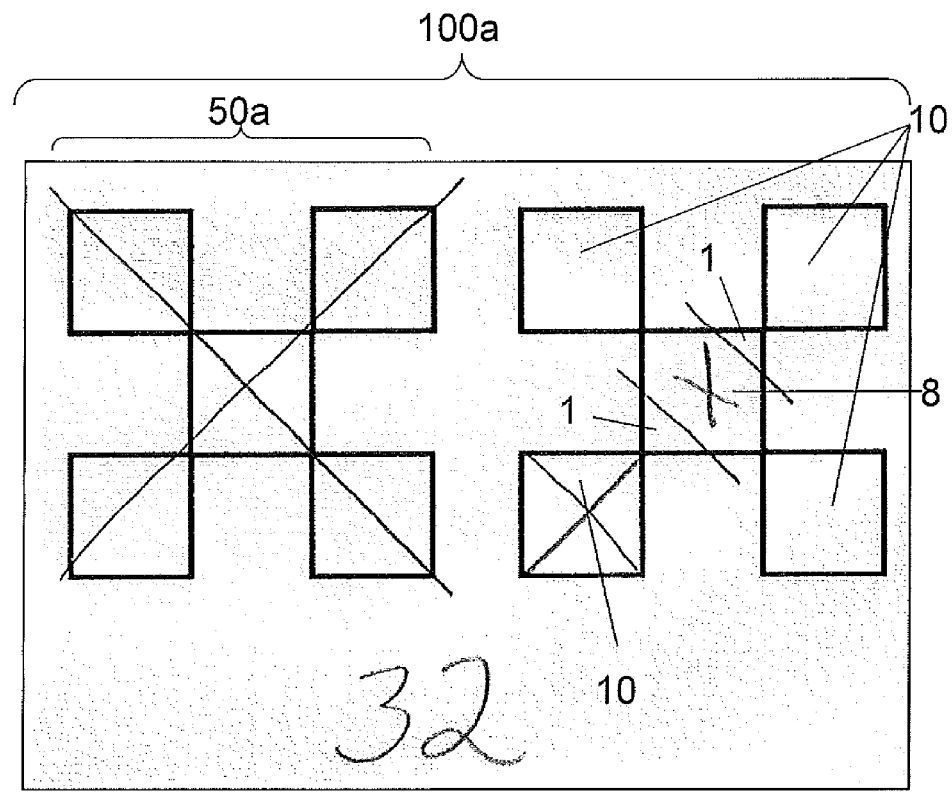

Now, turning to FIG. 53 for the problem (1 dollar-68 cents), a student would first imagine a 100 pattern to represent the 100 pennies within a dollar (shown in FIG. 53). Then the quantity of 68 would be crossed out from that 100 pattern by crossing out the fifty pattern 50*a*, then a ten shape 10 and finally an eight shape 8. Once the quantity of 68 has been removed, the remaining shapes can be totaled for the answer. In this case, 3 ten shapes 10 and 2 one shapes 1 remain indicating the answer of 32 cents.

Bills

Figure 54:
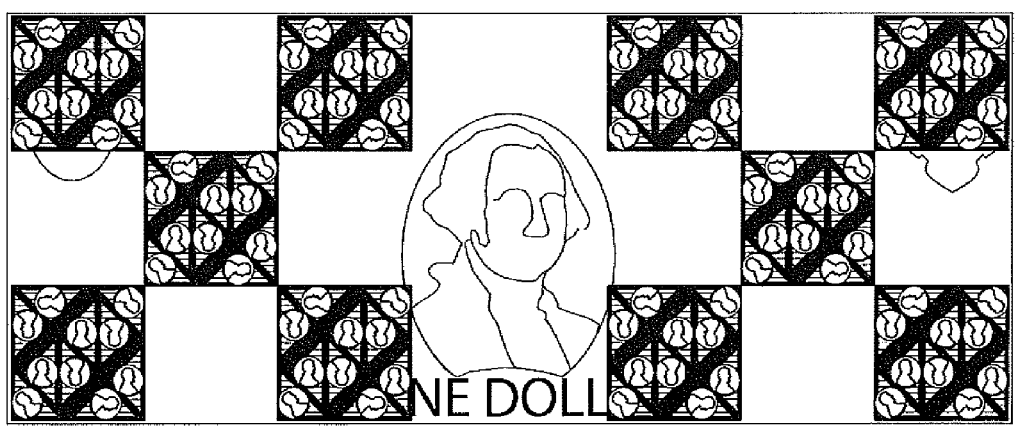

Thus far, coins have been represented with SHAPE MATH™. However, bills can also be represented within the same consistent system. A one dollar bill, for example, is composed of 100 SHAPE MATH™ pennies (as shown in FIG. 54). One should note the pennies are arranged into a one hundred pattern. This is the basic pattern of arrangement for all representations of a SHAPE MATH™ dollars made from coins. FIG. 55 shows the basic 100 pattern dollar and then a dollar composed of SHAPE MATH™ nickels 35b that fits within this pattern. The SHAPE MATH™ dollar composed of various coins is only used in smaller problems. For problems that involve manipulating larger bills, a different representation of the dollar is used.

Figure 56:
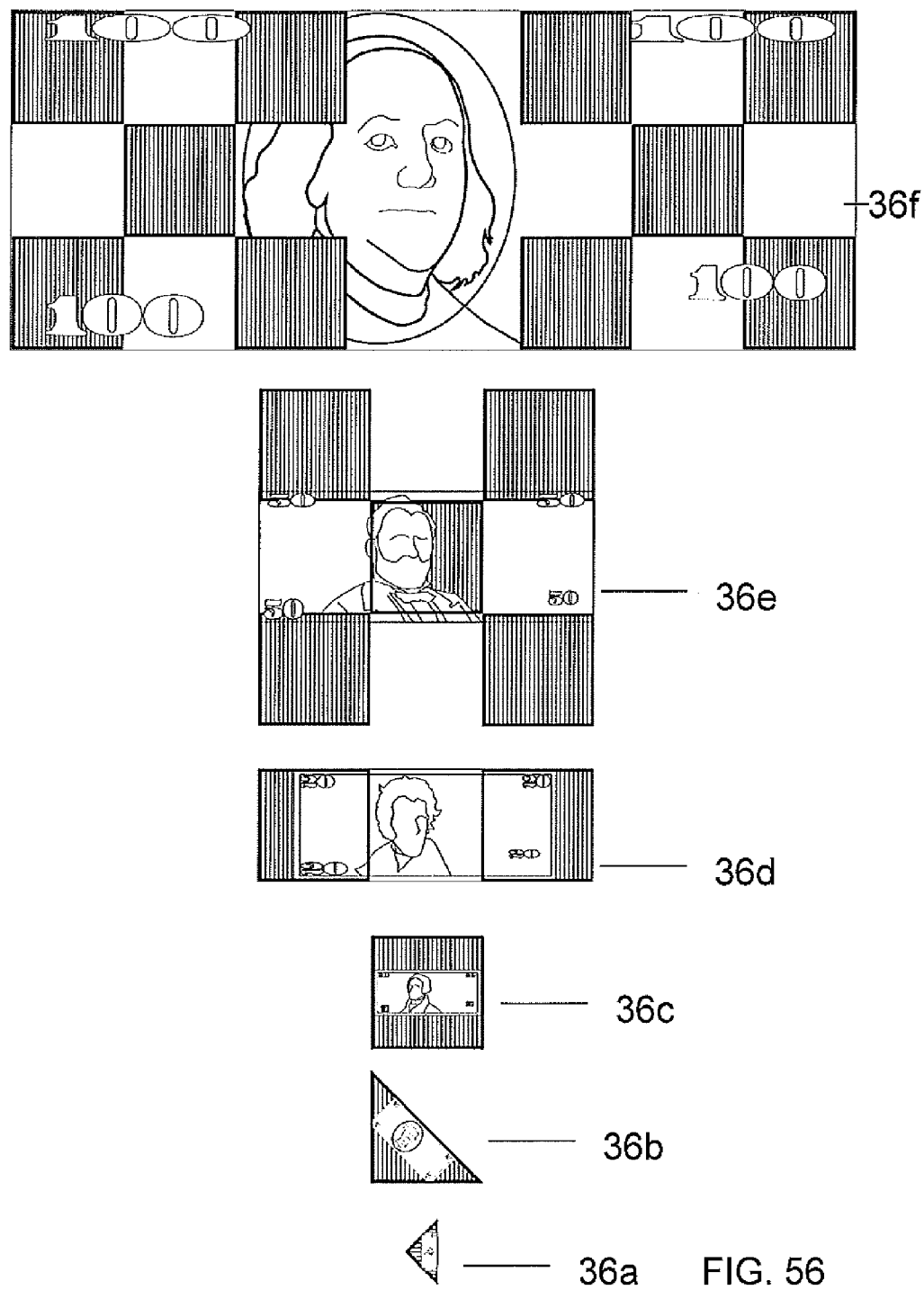

FIG. 56 shows the SHAPE MATH™ bills in descending order from top to bottom. The one shape 1 represents the one dollar bill 36a, five of which can fit into the five shape 5 which represents the five dollar bill 36b and so on. Each denomination is represented by the shape or pattern from SHAPE MATH™ that corresponds with the quantity of dollars expressed. Each bill also fits into larger bills a number of times that is appropriate for their relative quantities. Students will work with physical cut outs of the images displayed in FIG. 56 to become comfortable with visualizing the quantities involved. For the purpose of specification the SHAPE MATH™ bills are shown in FIG. 56 as follows: SHAPE MATH™ dollar 36a, SHAPE MATH™ five dollar bill 36b, SHAPE MATH™ 10 dollar bill 36c, SHAPE MATH™ 20 dollar bill 36d, SHAPE MATH™ 50 dollar bill 36e, SHAPE MATH™ 100 dollar bill 36f. These images, mental or physical, can be manipulated to add and subtract bills of currency.

Figure 57A:
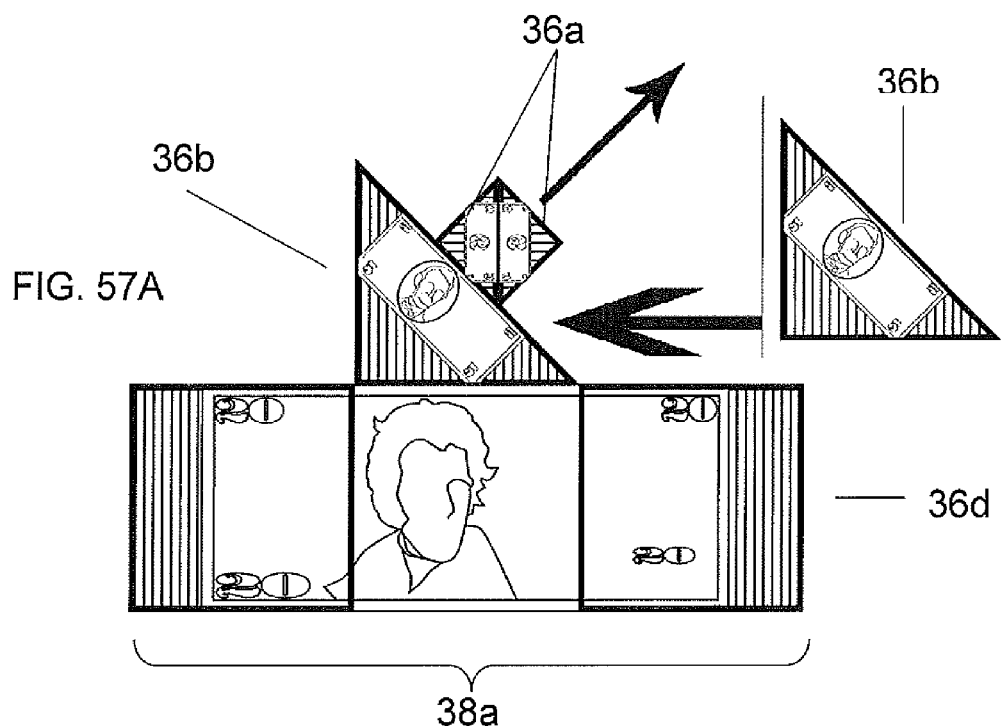
Figure 57B:
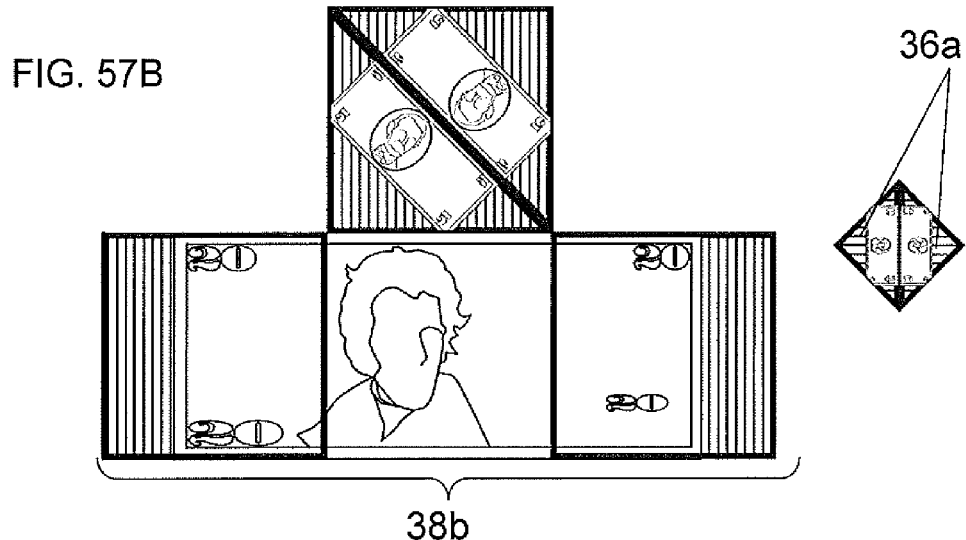

Now turning to FIGS. 57A-B for the problem ($27+a five dollar bill), a student would first arrange a SHAPE MATH™ money 27 pattern 38a out of a SHAPE MATH™ 20 dollar bill 36d, a SHAPE MATH™ 5 dollar bill 36b and 2 SHAPE MATH™ dollars 36a as seen in FIG. 57A. Then, to add a five dollar bill, a student would first separate the 2 SHAPE MATH™ dollars 36a from the 27 pattern 38a and then add a SHAPE MATH™ five dollar bill 36b in their place as demonstrated by arrows. This will create SHAPE MATH™ money thirty pattern 38b beside 2 SHAPE MATH™ dollars 36a shown in FIG. 57B, to create a SHAPE MATH™ money 32 pattern that can be recognized easily as an expression of 32 dollars, the answer to the problem.

SHAPE MATH™ money subtraction with bills is almost identical, in practice, to subtraction of SHAPE MATH™ coins. The appropriate written SHAPE MATH™ pieces are determined and manipulated to calculate the difference between 2 quantities (solution to the subtraction problem).

Figure 58A:
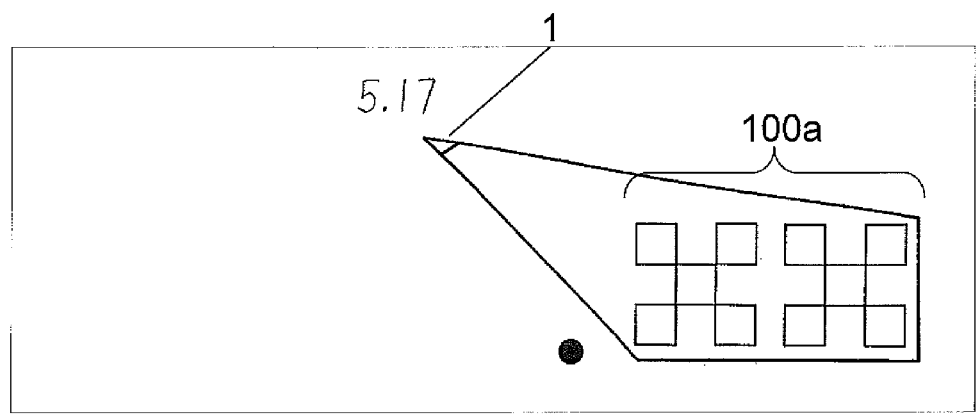
Figure 58B:
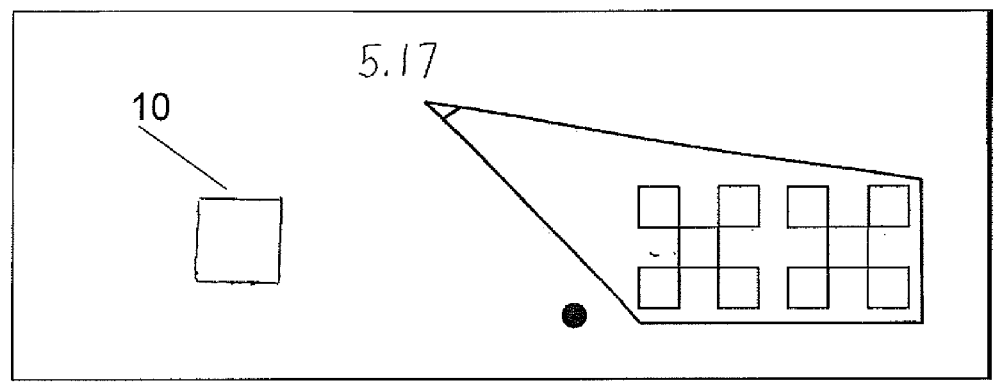
Figure 58C:
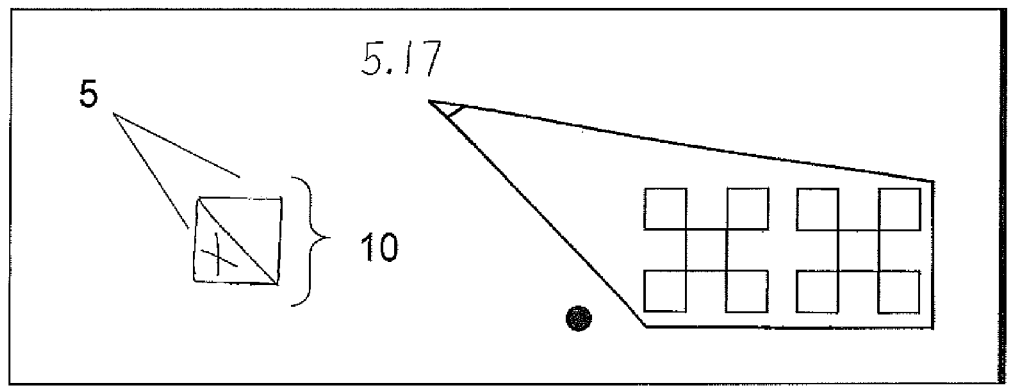
Figure 58D:
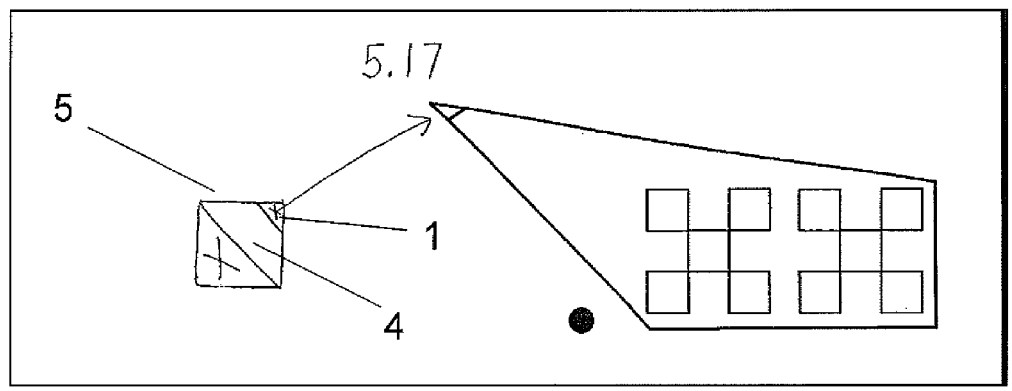
Figure 58E:
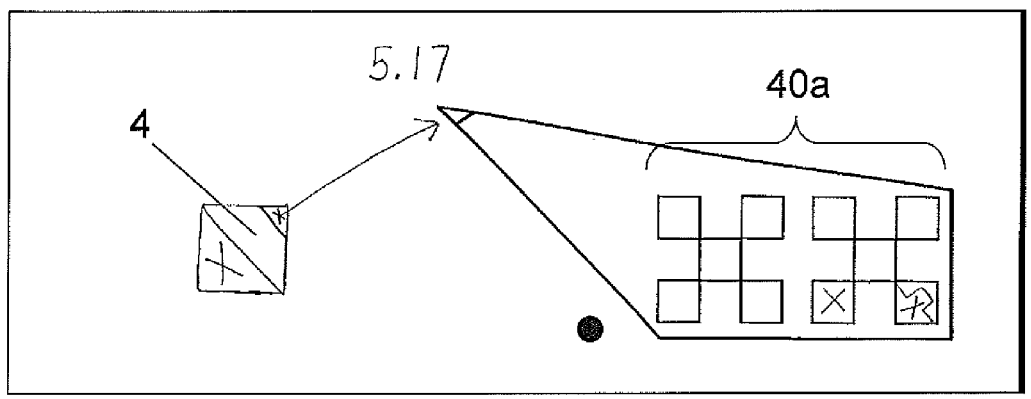

When calculating subtraction problems with both dollars and cents, a slightly different process is used. The student constructs two separate patterns, one for dollars and one for cents, which are separated by a decimal point. For the problem $10-$5.17 (seen in FIGS. 58A-E) a student would start by writing the subtrahend (5.17) just above a one triangle 1 with lines leading to and forming a box around a 100 pattern 100a which is placed to the right of a decimal point shown in FIG. 58A. It is important to note that the one triangle 1 and 100 pattern 100a each represent one dollar in different ways. The one triangle 1 refers to SHAPE MATH™ dollar 36a and the 100 pattern 100a refers to SHAPE MATH™ dollar 35a. Once this structure has been written, the dollars must be calculated. The minuend ($10) is written as a ten shape 10 to the left of the decimal point as seen in FIG. 58B. Then, the $5 from the subtrahend ($5.17) is subtracted by dividing ten shape 10 into 2 five shapes 5 and crossing one off as shown in FIG. 58C. Next, the cents must be subtracted which requires we borrow from the remaining five dollars of the minuend. To do this, the remaining five shape 5 is divided into a four shape 4 and a one shape 1, the one shape 1 is crossed off and an arrow is drawn to connect this one shape 1 with the one shape 1 drawn originally to indicate that one dollar was borrowed and converted into 100 cents as shown in FIG. 58D. The remaining 17 cents from the subtrahend is then subtracted by crossing this quantity from the 100 pattern as shown in FIG. 58E. At this point, the quantities that remain uncrossed can be totaled for the answer. The four shape 4 to the left of the decimal point represents 4 dollars while the 83 pattern 13f to the right of the decimal point represents 83 cents, for the solution of $4.83. This process can eventually be internalized so that the student imagines these operations instead of writing them. This method is applied to situations that require change be made when payment is made with a particular bill and thus applies only to subtraction problems with even dollar amounts as the minuend.

Fractions

The next section will cover the representation and manipulation of fractions within SHAPE MATH™. The standard representations of fractions such as ¾ or ⁵⁄₇ are abstract and hard for a discalculic to conceptualize or manipulate. With SHAPE MATH™, however, fractions are displayed directly and with proper relative sizes. For example, a SHAPE MATH™ representation of ¾ 41a is (shown in FIG. 59). The denominator (4) is represented by the outline of the SHAPE MATH™ fraction and is shown isolated below as four shape 4. The numerator (3) is represented by the shaded portion of the SHAPE MATH™ fraction and is shown isolated below as three shape 3. Finally, the missing portion of the whole (not represented in standard math fractions) is represented by empty space and shown isolated as one shape 1. SHAPE MATH™ fractions work very similarly to pie charts which also display colored portions within the context of a larger whole. SHAPE MATH™ representations, however, use specific shapes with exact quantities that can express the specific parts of a fraction.

Figure 59:
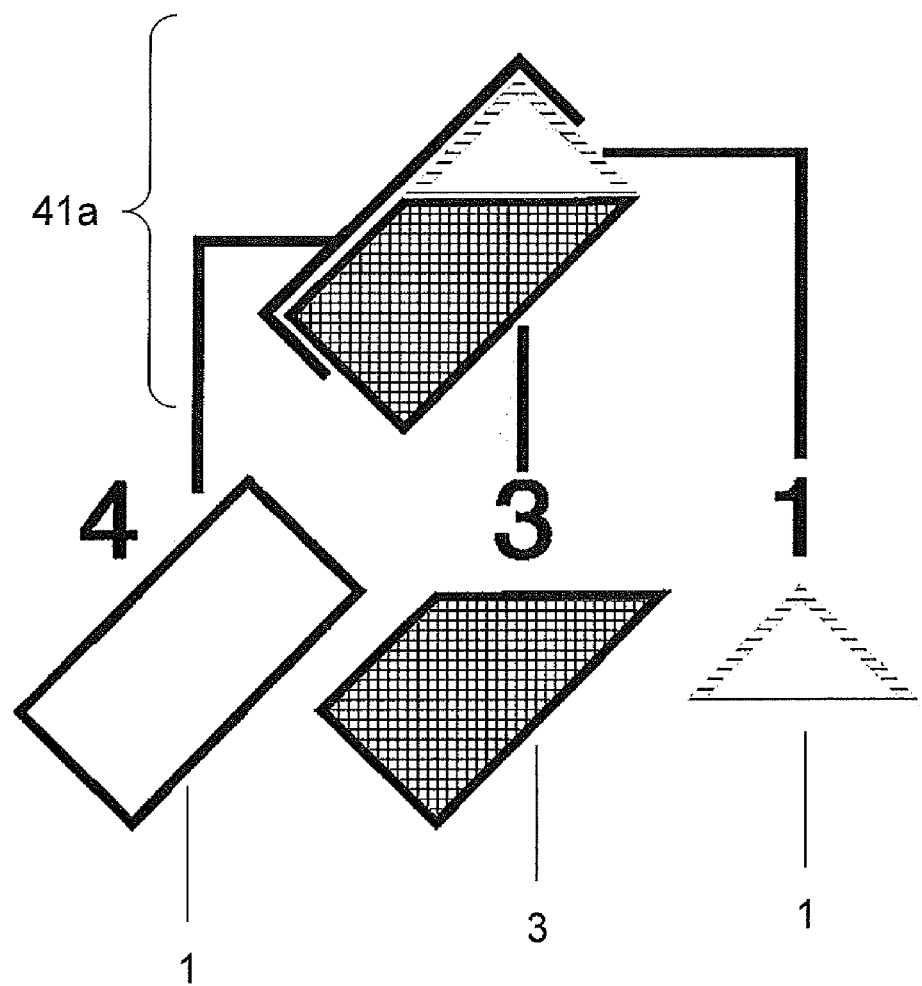
Figure 60:
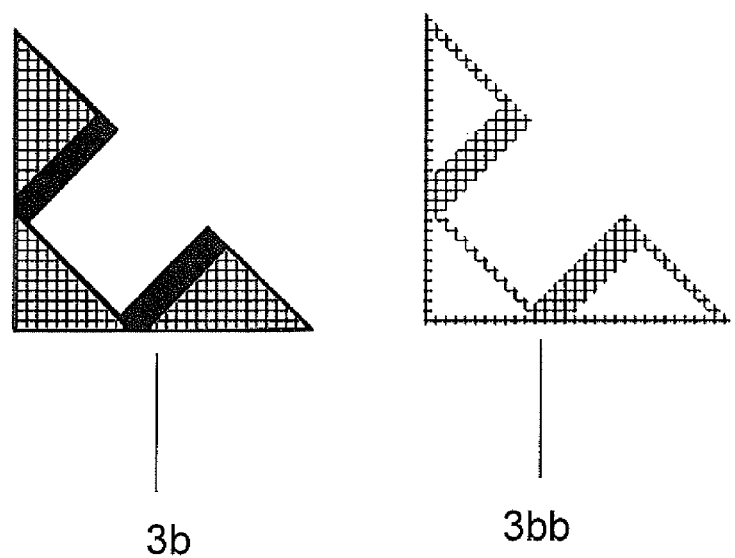

It is important to note that FIG. 59 displays a SHAPE MATH™ fraction that is composed of physical SHAPE MATH™ pieces. The SHAPE MATH™ pieces were mentioned above and they are a physical learning tool for SHAPE MATH™ students. Every SHAPE MATH™ piece has a colored front side and a reverse side which is white with an outline of the color from the front side. When working with fractions, the front sides of pieces are used to display the denominator while the reverse sides are used to display portions of the whole that are not present (negative space). FIG. 60 shows the front side of a three shape 3b next to the reverse side of that same three shape 3bb (shown with black dotted lines to make the outline of the faint colors more obvious).

Figure 61:
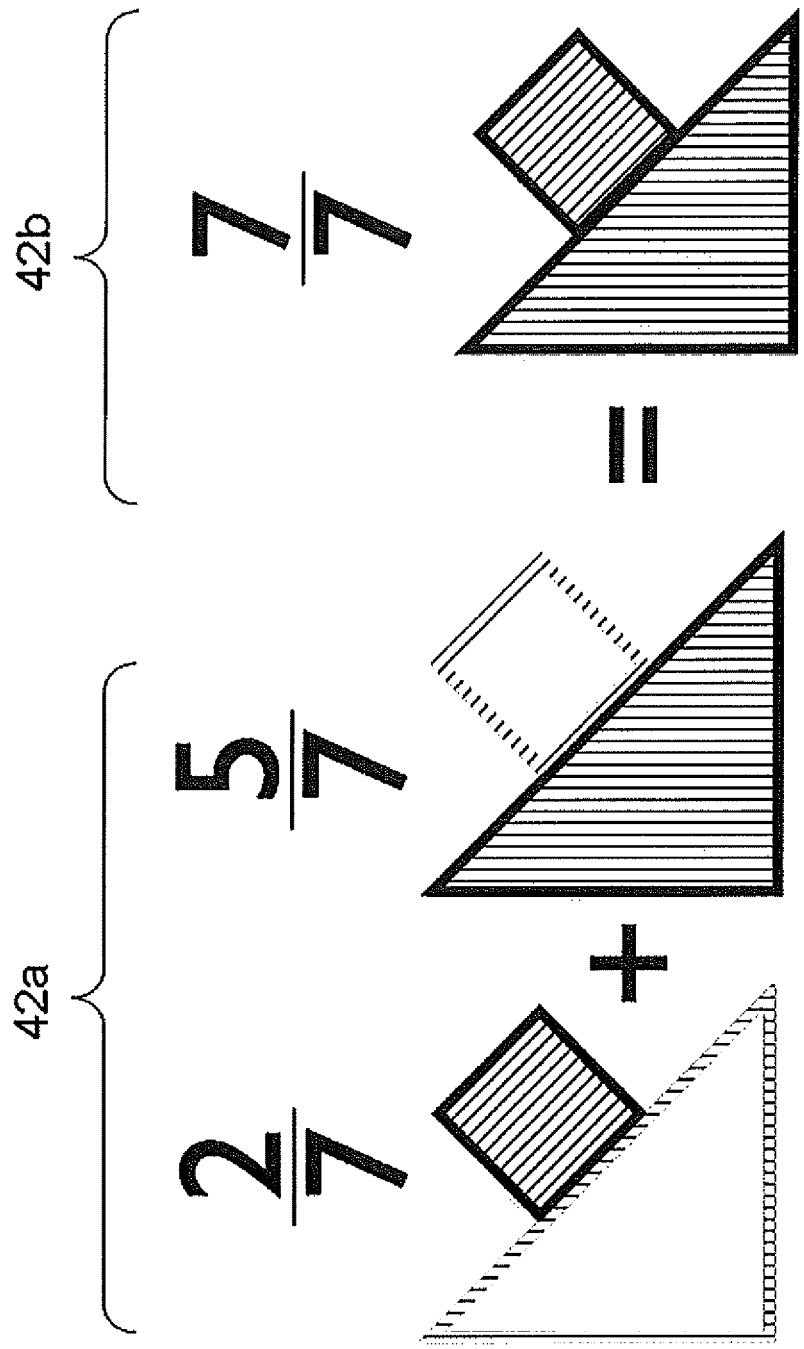

Because SHAPE MATH™ fractions are displayed so directly, simple operations such as addition can be performed by visually manipulating the quantities displayed. The problem ²⁄₇+⁵⁄₇ (seen in FIG. 61) is shown in first fraction addition representation 42a as it would appear if constructed from SHAPE MATH™ pieces. To solve this problem, the numerators (colored portions) are combined as shown in second fraction addition representation 42b. The colored two shape 2 is combined with colored five shape 5 to make a colored seven shape 7. It is important to note that filling an entire SHAPE MATH™ fraction with solid colors will always be equivalent to 1. The answer ⁷⁄₇ is visually represented as a normal seven shape.

Fraction Addition Different Denominators

Figure 62A:
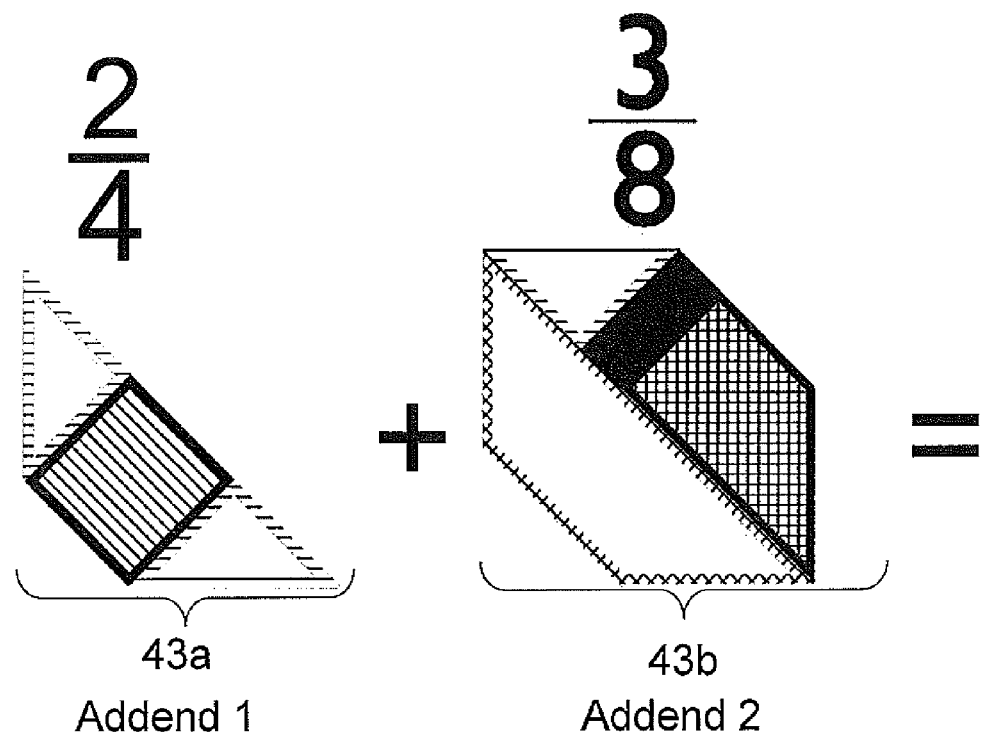
Figure 62B:
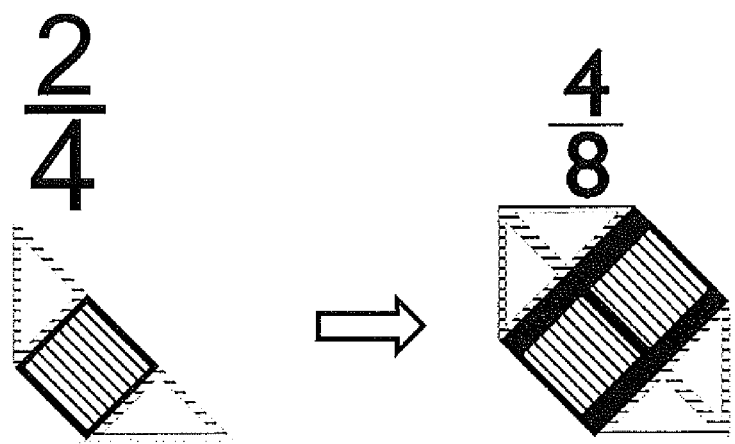
Figure 62C:
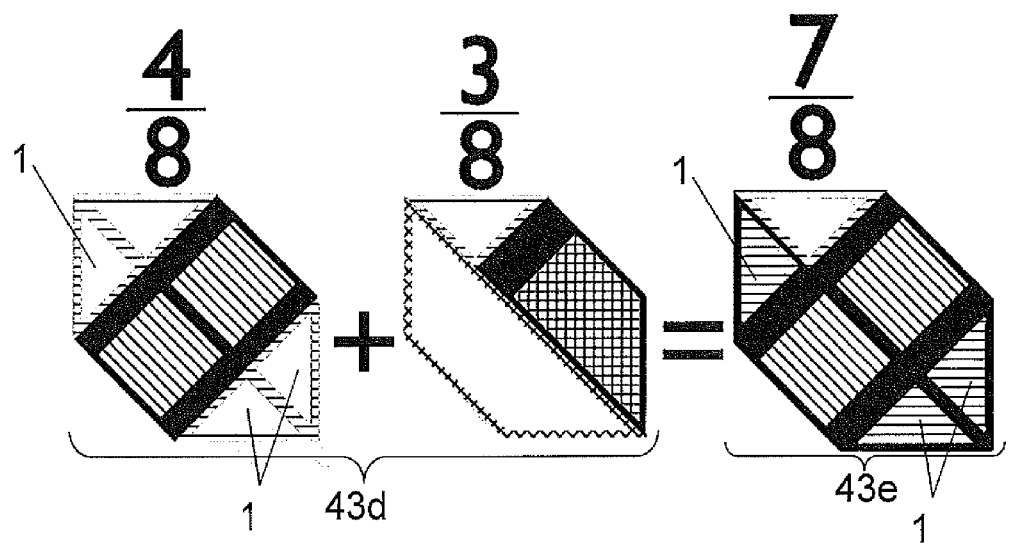

Now turning to FIGS. 62A-C, when fractions of 2 different denominators are added, a common denominator must be found and the fractions involved must be converted into fractions with that common denominator. In the case of ¾+⅜ (shown in FIG. 62A) Addend 1 43*a* has a denominator of 4 while addend 2 43*b* has a denominator of 8. In this case, the first denominator (4) can be multiplied by 2 to convert it into the second denominator (8). Since the perimeter shape of a SHAPE MATH™ fraction determines its denominator, the perimeter shape 43*c* of addend 1 (4 shape) must be doubled to make the perimeter shape 43*d* of addend 2 (8 shape). This process can be seen in FIG. 62B, in which the perimeter shape 43*f* (denominator) is doubled along with the colored portion (numerator) so that ¾ converts to ⁴⁄₈. Now, turning to FIG. 62C we have the problem ⁴⁄₈+⅜ 43*d* and the process of addition is the same intuitive combining of shapes from many other parts of SHAPE MATH™. In this case, the three shape 3*a* from ⅜ is converted into 3 one shapes 1 which replace 3 of the white one shapes 1 of ⁴⁄₈ for the final answer of ⅞ 43*e*.

Written Form of SHAPE MATH™ Fractions

Figure 63:
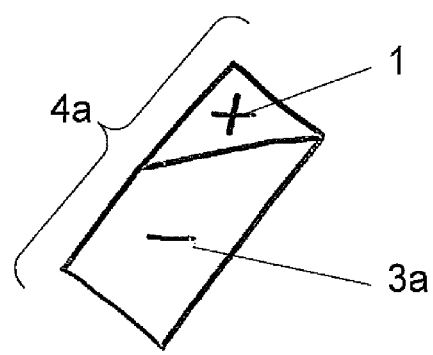
Figure 64D:
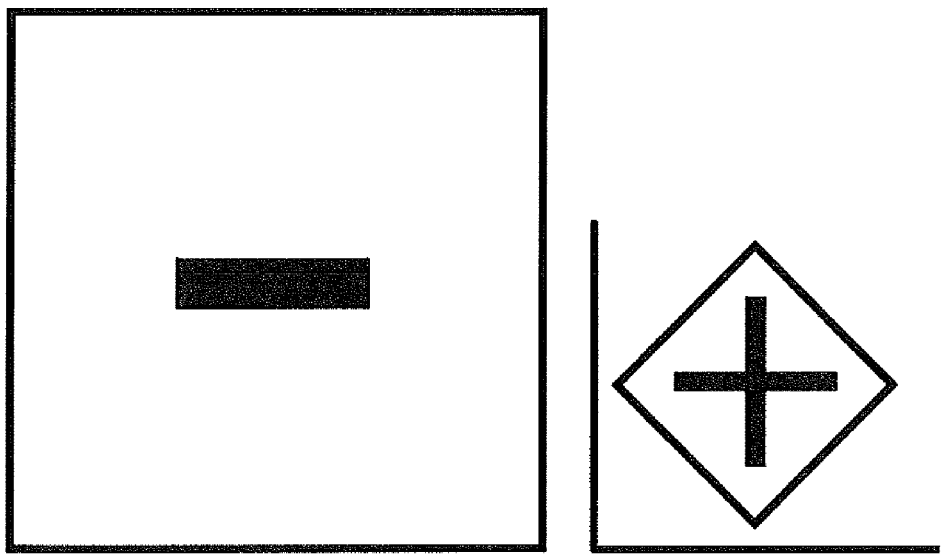

SHAPE MATH™ fractions also have a written form. The written form of ¼ is (shown in FIG. 63). The outside shape of written fractions still represents the denominator (four shape 4 in this case). The shape for the numerator (one shape 1 in this case), however, is signified with a plus sign (+) drawn within the shape. The portion missing from the denominator (3 shape 3*d* in this case) is marked with a minus sign (−).

Multiplying Fractions

Now turning to FIGS. 64A-D to multiply fractions in SHAPE MATH™, the first step is to break the first multiplicand into one shapes and distinguish its numerator with an outline. Then, an instance of the second multiplicand is drawn in each of the one shapes from the first multiplicand. The quantity of all these instances of the second multiplicand is totaled for the denominator of the answer. Finally, attention is drawn to the numerator outline drawn earlier. The shapes within this numerator outline that have a plus sign (+) are totaled to find the numerator of the answer. In the case of ¼ (first multiplicand)×⅔ (second multiplicand) 44*a* (shown in FIG. 64A) the fraction ¼ 44*b* is converted into 4 shape 44*c* which is composed of 4 one shapes 1 (shown in FIG. 64B). The numerator of ¼ is then distinguished with outline 44*e* that has a plus sign (+) 44*f* attached to it shown in fraction multiplication representation 44*d* (shown in FIG. 64C). Then an instance of the second multiplicand (⅔) is placed in each of the one shapes within the first multiplicand as shown in second fraction multiplication representation 44*f*. Now that the problem is presented in this way, the denominator and numerator can be counted. To count the denominator, the one shapes are counted from each of the instances of ⅔ totaling 12 in this case. For the numerator, the one triangles with a plus sign (+) within the numerator outline are counted totaling 2 in this case. This gives us the final answer of ²⁄₁₂. In SHAPE MATH™, this is presented with a negative ten shape 10 and a positive two shape 2 (shown in FIG. 64D). The denominator of 12 is represented by the combined ten shape 10 and two shape 2. The numerator is represented with a two shape with a plus sign. It should be noted that a SHAPE MATH™ user can still apply the principles from SHAPE MATH™ multiplication to multiply the numerators then the denominators, as seen in standard math, but completing the problem with the method just described helps the SHAPE MATH™ user conceptualize fraction multiplication.

Fraction Division with Equal Denominators

Figures 65A, 65B, 65C:
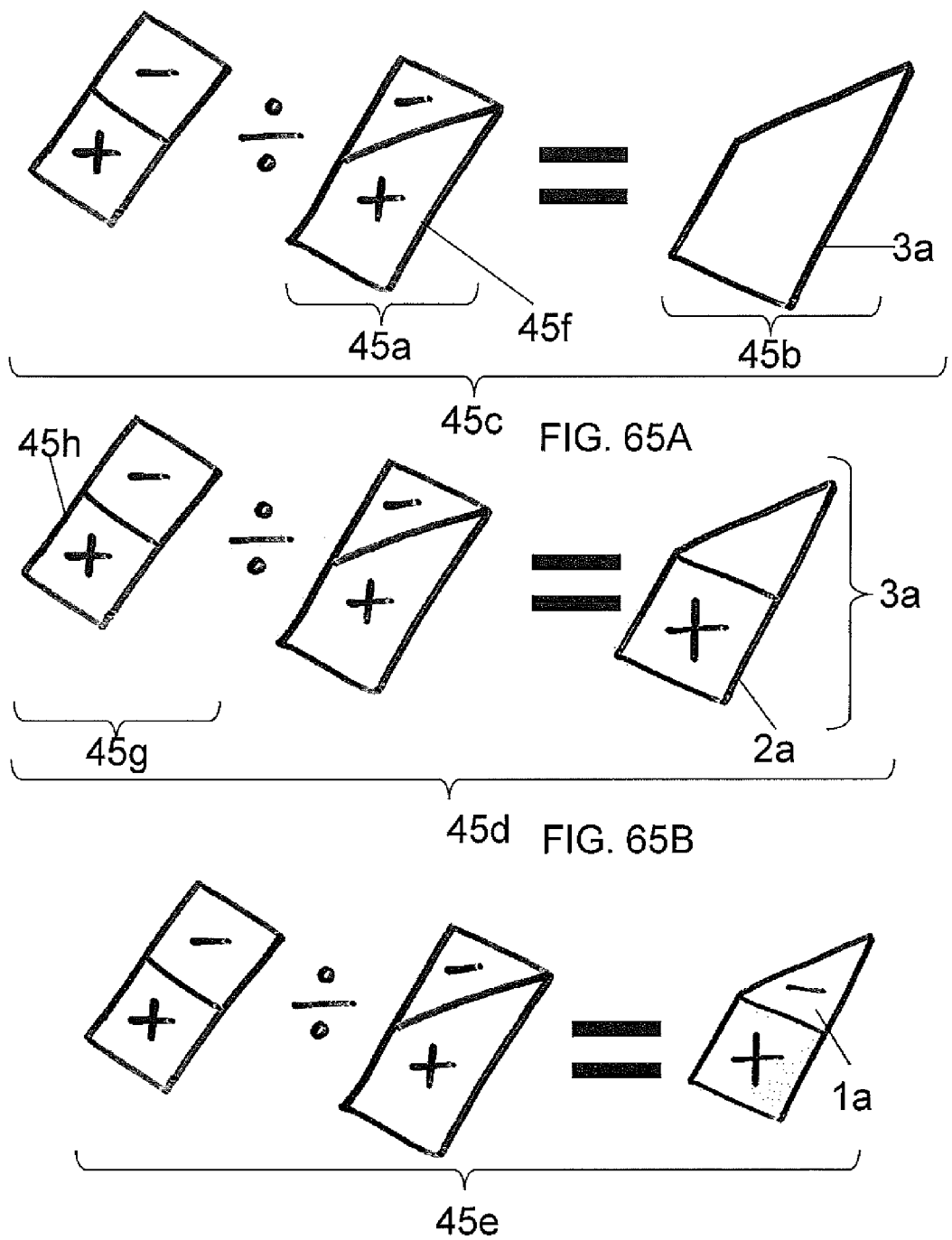

When calculating the division of SHAPE MATH™ fractions of equal denominators the first step is to establish the denominator of the answer. To do this the numerator shape from the divisor is drawn in the answer space. Turning to FIGS. 65A-C for the problem ¾+¾, the divisor (¾) 45*a* has a numerator of 3 45*f* therefore 3 shape 3*a* is drawn in the answer space 45*b* as shown in first fraction division representation 45*c* (see FIG. 65). The next step is to determine the number of times the numerator of the dividend fits into the denominator of the answer. In this problem, the dividend 45*g* has a numerator 45*h* of 2 therefore 2 shape 2*a* is drawn with a plus sign inside of denominator 3*a* of the answer as shown in second fraction division representation 45*d* (see FIG. 65). Finally, the space in the denominator of the answer that is not already occupied is given a negative sign. In this example, a negative sign is drawn in one shape 1*a* as shown in third fraction division representation 45*e* (see FIG. 65).

Improper and Mixed Fractions

Figure 66:
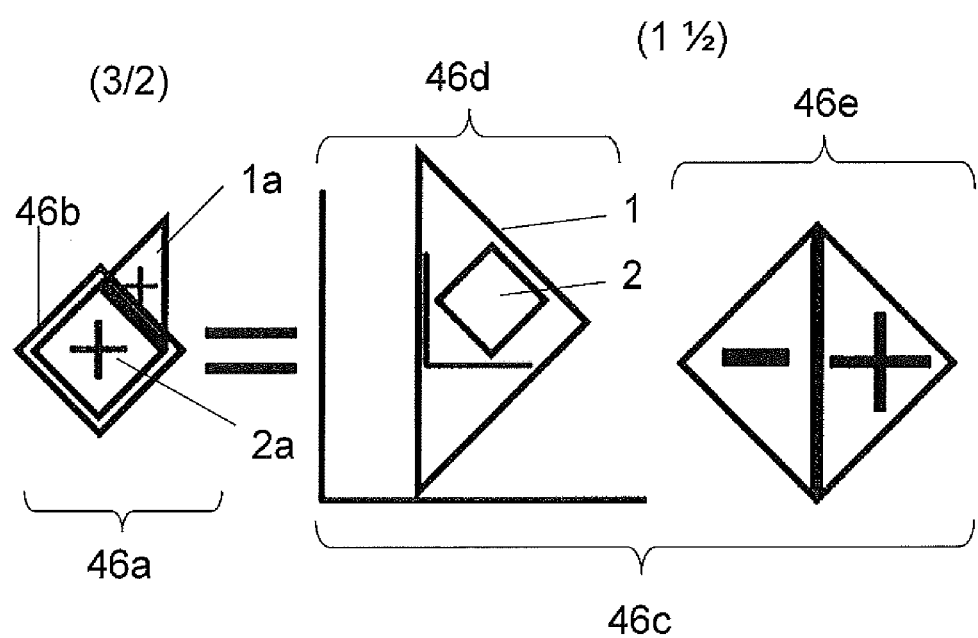

FIG. 66 shows the equivalent fractions of (³⁄₂) and (1½) written as SHAPE MATH™ fractions. Improper fraction representation 46*a* shows (³⁄₂). In SHAPE MATH™, the denominator of a mixed fraction is expressed with a denominator outline. In this case the denominator outline 46*b* surrounds a two shape 2*a*. The numerator of improper fractions is indicated by the total quantity of SHAPE MATH™ numbers, in this case a two shape 2*a* and one shape 1*a*, when combined, indicate a numerator of 3. This same quantity expressed as a mixed SHAPE MATH™ fraction is shown in mixed fraction representation 46*c* which represents 1½. The whole number shape 46*d* expresses the quantity of 1 and the fraction ²⁄₂ simultaneously. It expresses the quantity of 1 because of its outline is a one shape 1. It expresses the fraction ²⁄₂ because of the two shape 2 inside this one shape 1. The two shape 2 also indicates a denominator of 2 for fraction 46*e* (½), which is seen to the right of whole number shape 46*d*. The importance of including this indicator (two shape 2) within the whole number shape will be apparent when doing operations with mixed fractions. The fraction shape 46*e* indicates ½ and follows the conventions of SHAPE MATH™ fractions thus far. Together, the whole number shape of 1 46*d* and the fraction ½ 46*e*, make up the mixed fraction 1½ 46*c*.

Addition with Mixed Fractions of Equal Denominators

Figure 67A:
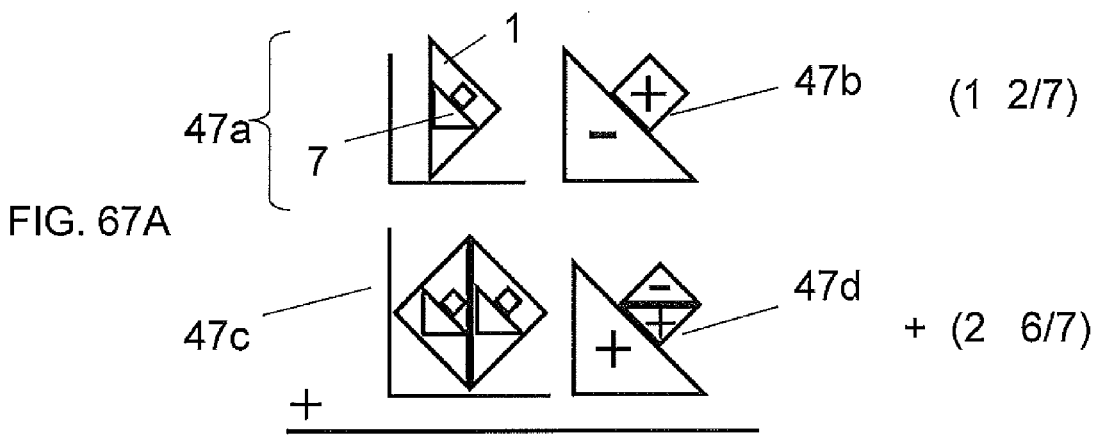
Figure 67B:
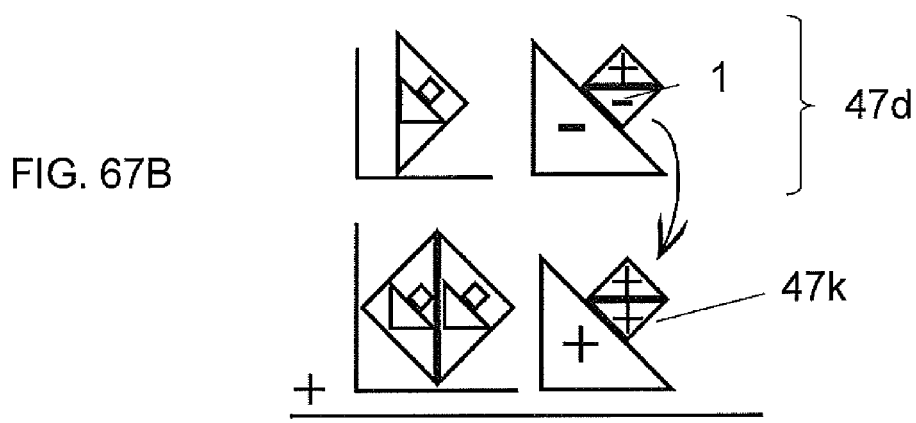
Figure 67C:
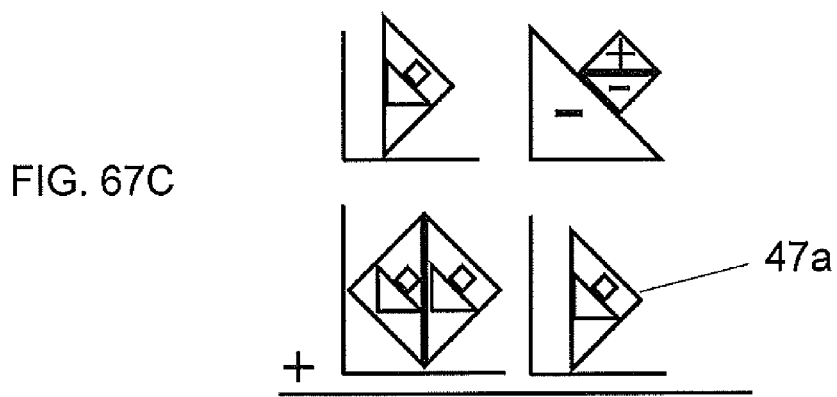
Figure 67D:
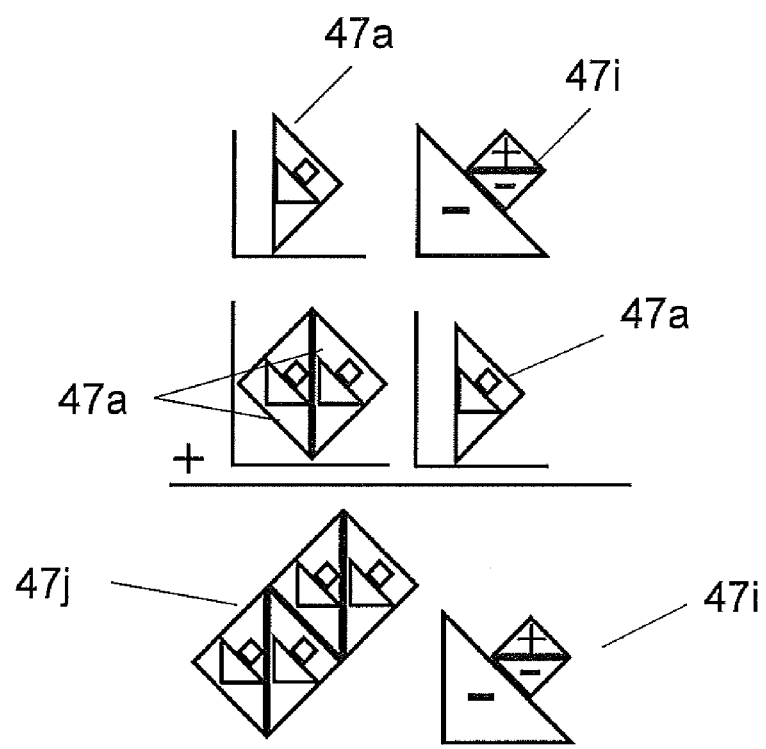

The calculation of mixed fractions in SHAPE MATH™ uses a place value system. The right column houses instances of fractions below 1 while the left column houses instances of 1 expressed as fractions (ex. ²⁄₂, ³⁄₃). Turning to FIGS. 67A-D for the problem of [1(²⁄₇)]+[2 (⁶⁄₇)], the first step, shown in FIG. 67A, is to present the relevant fractions as SHAPE MATH™ fractions within the typical place value organization of addition. To represent 1²⁄₇, whole number shape 47*a* is used to express 1 or ⁷⁄₇. The seven shape 7 is displayed within the one shape 1 to indicate the relevant denominator. Fraction shape 47*b* is used to express ²⁄₇ and follows the SHAPE MATH™ fraction conventions explained thus far. Below these two shapes the mixed fraction 2⁶⁄₇ is represented. Whole number shape 47*c* represents the quantity of 2 (more specifically 2 instances of ⁷⁄₇). Fraction shape 47*d* represents ⁶⁄₇. The second step, shown in FIG. 67B, is to add the fraction shapes contained in the fraction column (right column). To do this, the constituent shapes are recombined into a recognizable shape or pattern. In this case, the one shape 1 from fraction shape 47*b* is brought down to the empty space in the denominator of fraction shape 47*d* so that the fraction ⁷⁄₇ 47*k* is made. Whenever the numerator of a fraction shape in the fraction column equals the denominator (when the fraction is full) it is erased and redrawn as a whole number shape. In this case, whole number shape 47*a* is drawn to represent ⁷⁄₇ or the quantity of 1 as shown in FIG. 67C. The final step, shown in FIG. 67D, is to compile the answer. The whole number shapes can be counted and combined into a larger shape. In this case, the 4 instances of ⁷⁄₇ 47*a* are drawn into a larger whole number 4 shape 47*j* to indicate the answer of 4 in the whole number column. Next, the remaining fraction shape from the fraction column is brought down to the answer space. In this case, fraction shape 47*i* is brought to the answer space and represents ⅕. Next to each other, whole number shape 47*j* (quantity 4) and fraction shape 47*i* (quantity ⅕) display the mixed fraction 4⅕.

Subtraction of Mixed Fractions with Equal Denominators

Figure 68D:
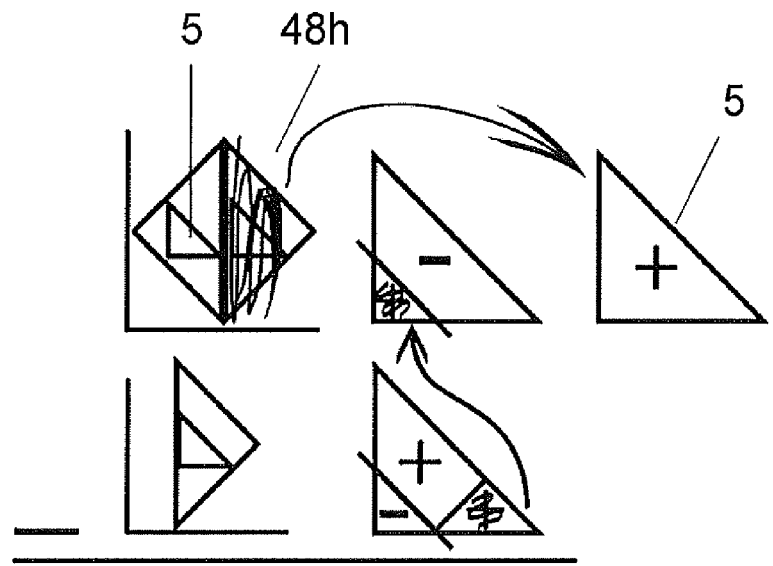
Figure 68E:
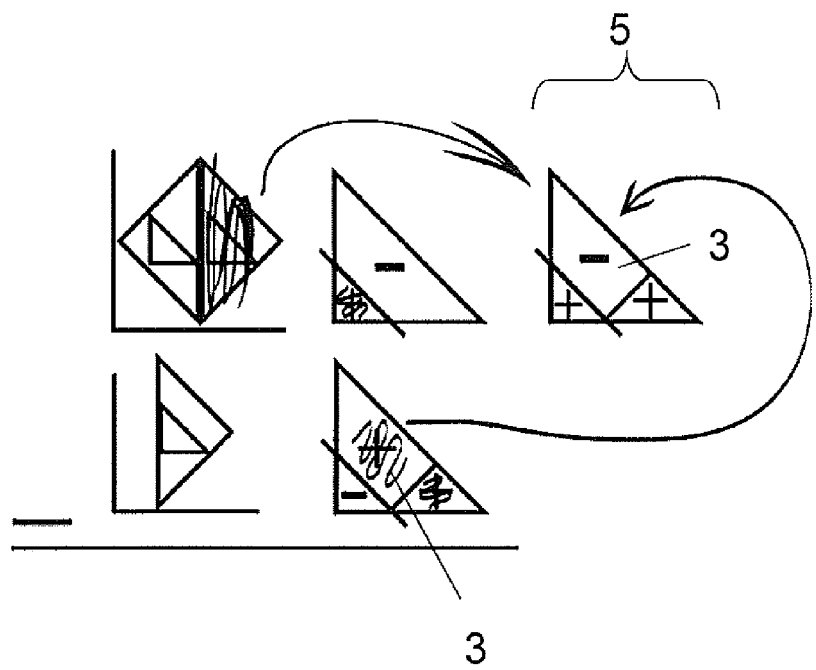
Figure 68F:
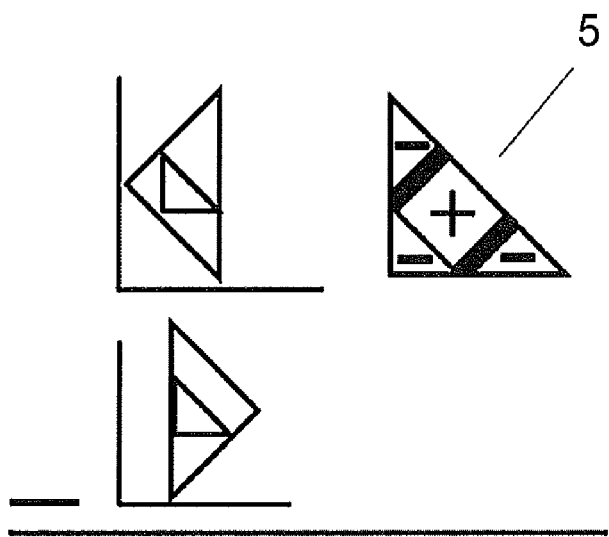
Figure 68G:
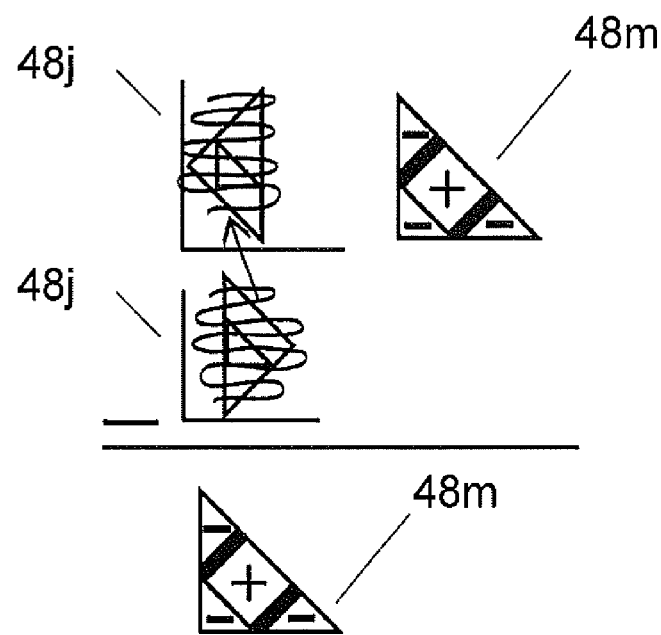

The subtraction of SHAPE MATH™ mixed fractions is very similar to addition. Like addition, the relevant mixed fractions are expressed in a place value system using SHAPE MATH™ mixed fractions. Turning to FIGS. 68A-G for the problem [2 (⅕)]−[1(⅘)], FIG. 68A shows how the relevant quantities would be expressed as SHAPE MATH™ mixed fractions within a place value system. Whole number shape 48*b* expresses the quantity of 2 (more specifically 2 instances of ⅕) while fraction shape 48*c* expresses ⅕. Below this, whole number shape 48*d* expresses 1 (more specifically 1 instance of ⅕) and fraction shape 48*e* expresses ⅘. The second step is to subtract subtrahend 48*e* (⅘) from minuend 48*c* (⅕). An arrow is drawn from one shape 1 of the subtrahend to 1 shape 1 of the minuend and each one shape is crossed off as demonstrated in FIG. 68B and FIG. 68C. This only subtracts ⅕ from the ⅘ of the minuend. Since the minuend (⅘) is larger than the subtrahend (⅕), a unit must be borrowed from the whole number column. In this process, shown in FIG. 68D, an arrow is drawn from whole number shape 48*h* to the right of the fraction column and a five shape 5 is drawn at the end of this arrow. The whole number shape becomes a five shape because 5 is the relevant denominator. The five shape 5 inside the outline of the whole number shape helps to make this more clear and obvious to a SHAPE MATH™ user. Once ⅘ is borrowed from the whole number column, the remaining ⅗ of the minuend can be subtracted from this borrowed shape. To complete this step, shown in FIG. 68E, an arrow is drawn from the remaining 3 shape 3 in the minuend to the borrowed five shape 5 and a three shape 3 is drawn within this borrowed five shape 5 and given a negative symbol while the three shape 3 from the minuend is crossed off. The next step is to rewrite the problem with all crossed off shapes omitted and the remaining shapes reorganized so that the numerator is contained within a single shape. In this case, 5 shape 5 from FIG. 68E is rewritten as 5 shape 5 from FIG. 68F.

Once the fractions column has been rewritten, the subtrahend of the whole number column must be subtracted from the minuend of the whole number column. In this case, shown in FIG. 68G, an arrow is drawn from ⅕ 48*j* in the bottom row to ⅕ 48*j* of the top row and each are crossed. Finally, the ⅖ shape 48*m* (all that remains) is brought down to the answer row to indicate the answer of ⅖.

Addition with Improper Fractions

Adding improper fractions with SHAPE MATH™ is almost identical to standard SHAPE MATH™ addition. FIGS. 69A-C show the problem ½+½ as it would be completed with written improper SHAPE MATH™ fractions. FIG. 69A shows the problem after it has been converted to SHAPE MATH™ symbols. The top addend 48*o* represents ½ with denominator outline 48*p* surrounding two shape 2 and thus indicating a denominator of 2. The bottom addend 48*q* represents ½. The process of addition is shown in FIG. 69B and demonstrates the process of drawing an arrow from one shape 1 of bottom addend 48*q* to top addend 48*o*, crossing this one shape and redrawing it at the end of the arrow. This eliminates the numerator of bottom addend 48*q* and completes the answer shape. Because this answer shape has a full two shape 2 outside denominator outline 48*p*, another denominator outline 48*s* is drawn around two shape 2, shown in FIG. 69C. The denominator outlines each represent the quantity of 1 and can be totaled in this case for the answer which is written as two shape 2 in the answer space.

Percentages

This section will show how Percentages can be done using SHAPE MATH™. When calculating percentages in SHAPE MATH™, the one shapes from each dollar of the total bill are converted into percentage shapes. A percentage shape is best understood within the context of a one shape. Turning to FIG. 70A, percentage representation 48*u* shows a one shape composed of 10 ten percent pieces which are each one shapes themselves. In FIG. 70B, a ten percent piece can also be broken down into 10 one shapes, which each represent 1 percent of the total shape, as they are each ten percent of ten percent. Percentage representation 48*v* shows a one shape composed of 9 10 percent pieces and 10 one percent pieces.

Figure 71A:
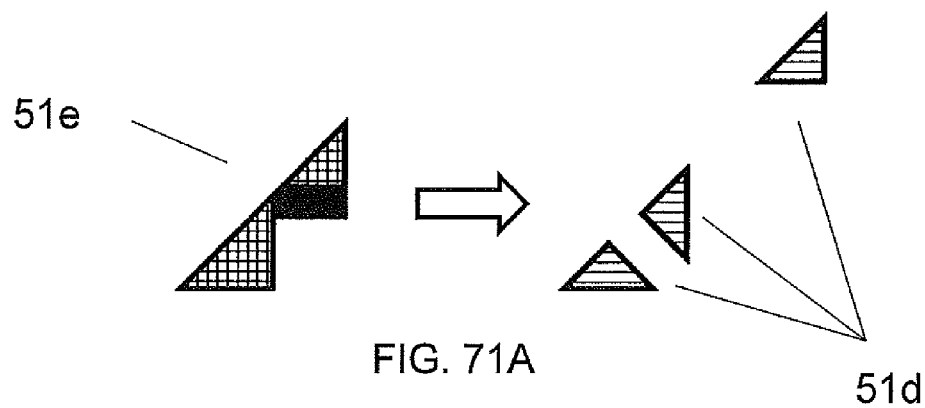
Figure 71B:
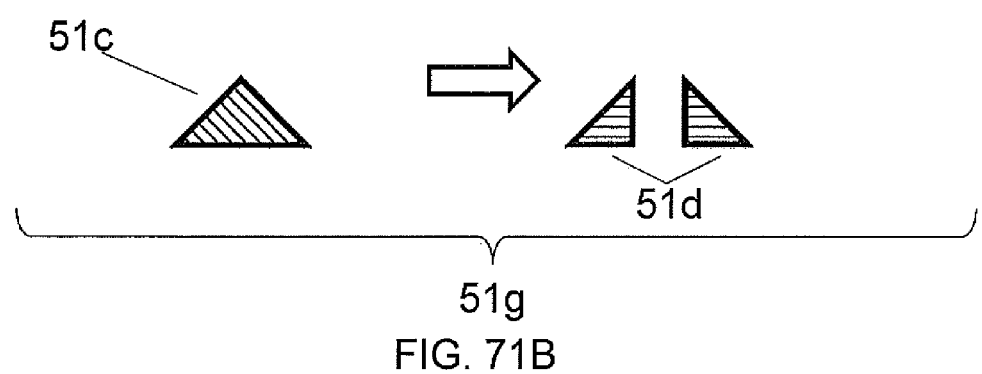
Figure 71C:
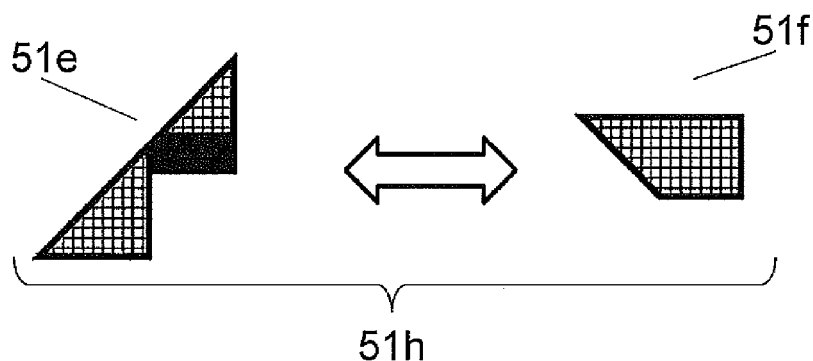
Figure 72A:
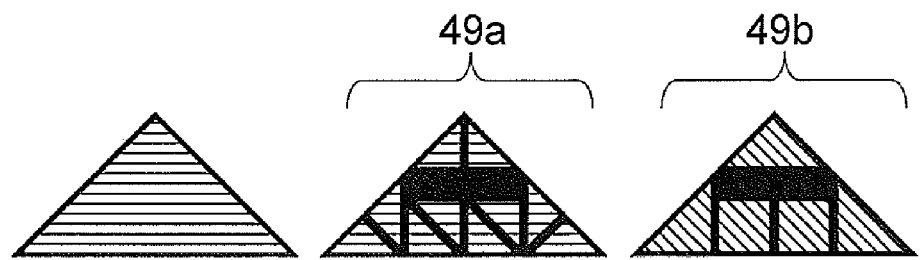
Figure 72B:
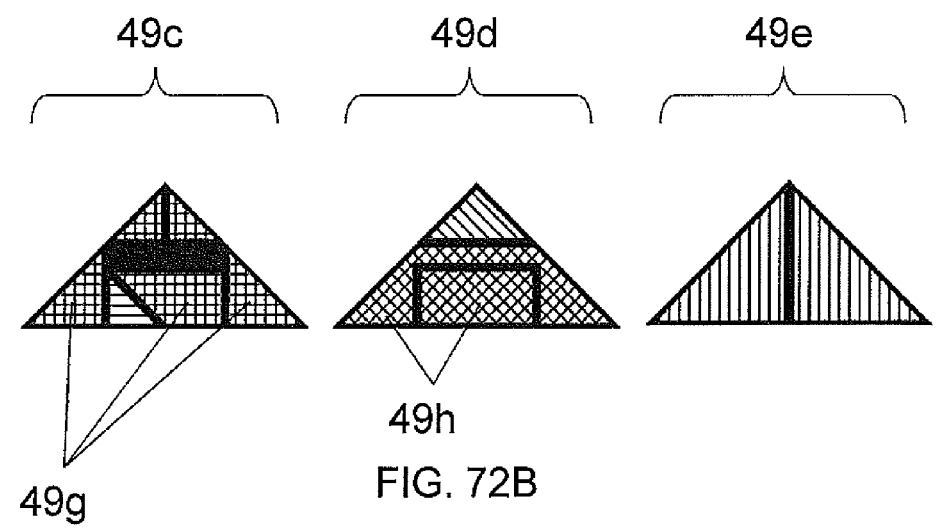
Figure 72C:
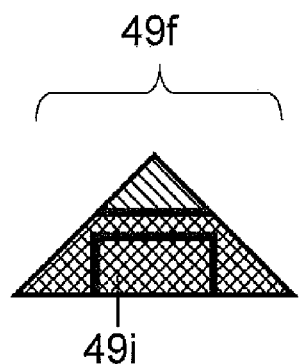

Just as 10 percent pieces are composed of 1 percent pieces, higher percentage pieces that are multiples of ten can be made by compiling 10 percent pieces. Turning to third percentage representation 51*g* of FIG. 71B, a twenty percent piece 51*c* is composed of 2 ten percent pieces 51*d* while a 30 percent piece 51*e* is composed of 3 ten percent pieces 51*d* (see FIG. 71A). One should note that some percentages have different specific percentage pieces. Fourth percentage representation 51*h* (see FIG. 71C) shows that 30 percent can be represented with both thirty percent piece 51*e* and thirty percent piece 51*f*. These various forms are required to fit percentage pieces into a triangular one shape, which represents 100 percent. It should be noted that a unique set of zero spacers 52*a* (shown in FIG. 73) is also needed to achieve this affect. FIGS. 72A-C show all the common percentage pieces within the one shape that represents 100 percent. One shape 49*a* (see FIG. 72A) is composed of 10 ten percent pieces, one shape 49*b* (see FIG. 72A) is composed of 5 twenty percent pieces, one shape 49*c* (see FIG. 72B) is composed of 3 thirty percent pieces 49*g* and 1 ten percent piece, one shape 49*d* (see FIG. 72B) is composed of 2 forty percent pieces 49*h* and 1 twenty percent piece, one shape 49*e* (see FIG. 72B) is composed of 2 fifty percent pieces and finally, one shape 49*f* (see FIG. 72C) is composed of 1 eighty percent piece 49*i* and 1 twenty percent piece. It should be noted that the eighty percent piece looks identical to 2 forty percent pieces. The interior lines and spacers from the compiled 40 percent pieces are left in the eighty percent piece to distinguish it from an outer four shape.

Figure 73:
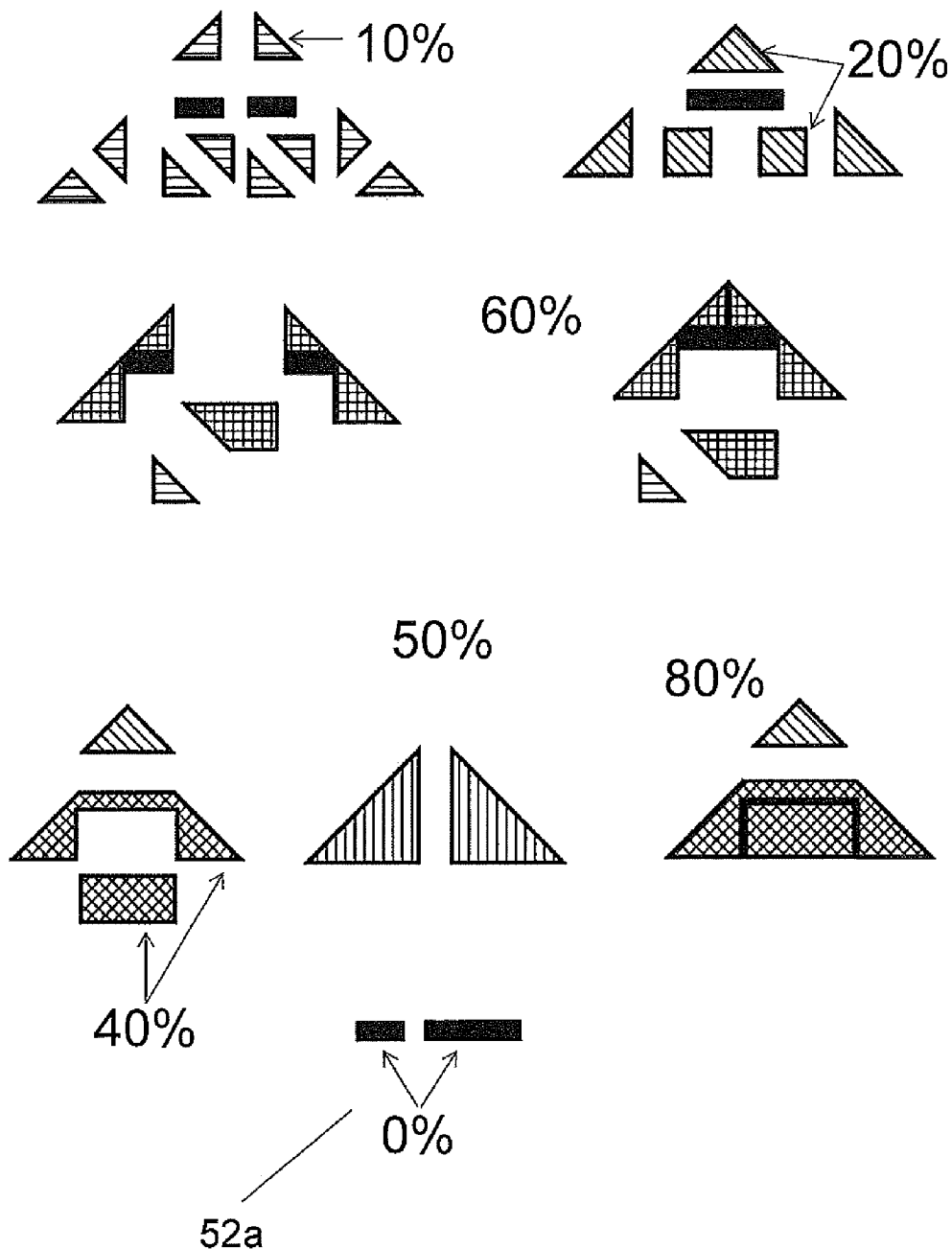

FIG. 73 shows the same one shapes from FIGS. 72A-C as they would appear if the percentage pieces were pulled apart.

Figure 74:
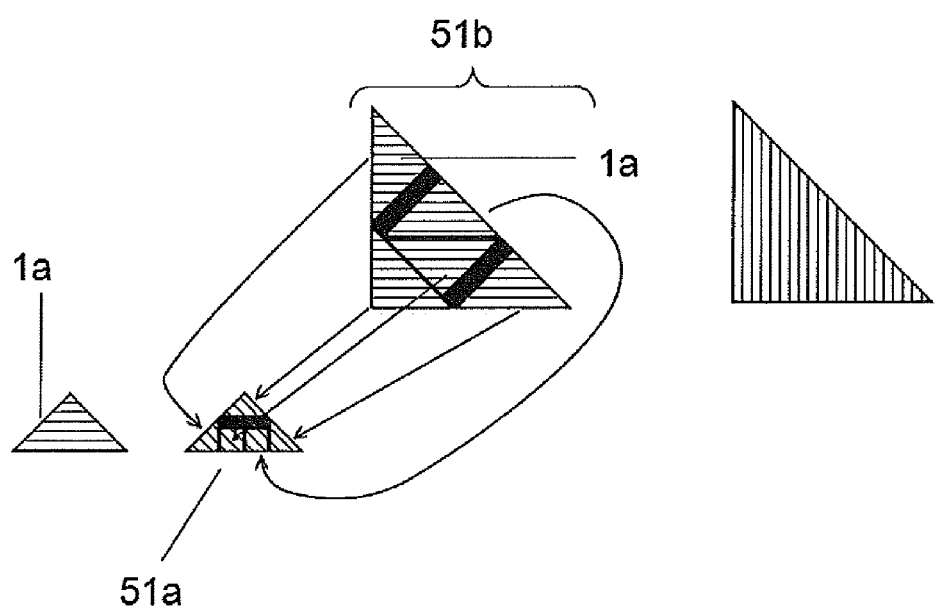

When calculating a percentage, a specific percentage piece will be replicated into a larger shape that represents the answer (referred heretofore as an answer shape). The number of replications depends on the total from which the percentage is taken. Turning to FIG. 74 for an example, the answer shape 51*a* when calculating 20 percent of 5 would be composed of 5 20 percent pieces. Essentially, each 20 percent piece from the answer shape 51*a* corresponds to a one shape 1*a* from the total 51*b*. While a student would not imagine this process, the visualization shown in this figure would be used as a teaching tool to help a student understand the process involved and what each step represents. Once this conceptual understanding is established, the process can be completed in practice by counting out each percentage piece as it is compiled into the answer shape. In this case, 5 20 percent pieces are counted as they are compiled into answer shape 51*a*. Because answer shape 51*a* completes a one shape 41*a*, it represents 1 dollar, which is 20 percent of 5 dollars.

There is a shortcut to calculate 20% tips that helps for larger checks. As shown in the previous example, 20% of $5=$1. This means that, when calculating 20% tips, each five shape in the total bill can represent a one shape in the tip. The procedure for calculating a 20% tip on a $27 check using this short cut goes as follows.

Figure 75:
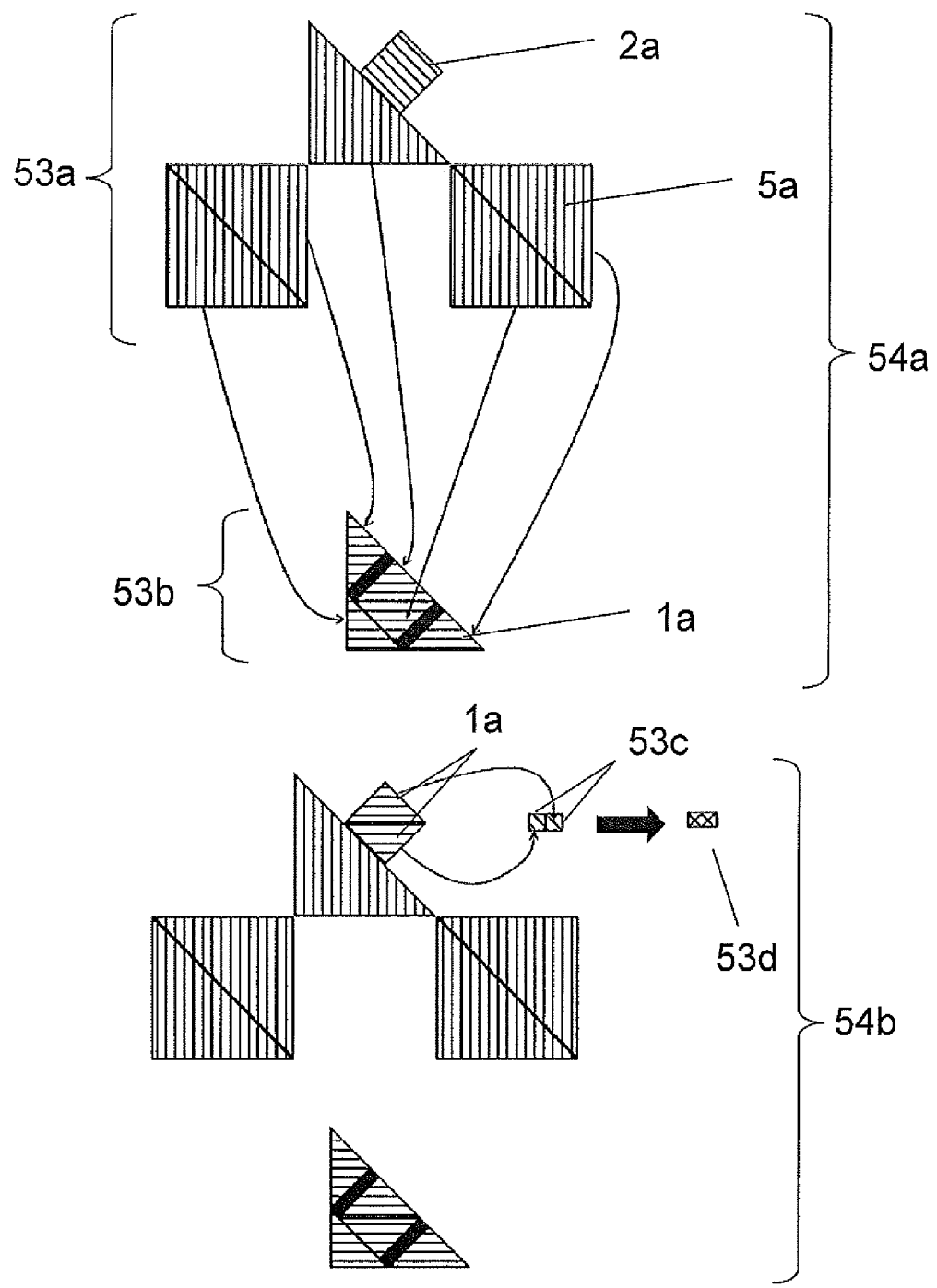

Turning to FIG. 75A, a 27 shape 53a is imagined that represents a 27 dollar check as shown in tip calculation representation 54a. Each five shape 5a within the 27 shape is counted and converted to a one shape 1a in the tip shape 53b, totaling 5 five shapes from the check and thus 5 one shapes in the tip shape 53b. This calculates 20 percent of 25 dollars and yields the answer of 5 dollars. To calculate 20 percent of what remains from the check, which consists of a two shape 2a in this example, the normal SHAPE MATH™ percentage techniques are applied. Turning to second tip calculation representation 54b shown in FIG. 75B, the two shape 2a is divided into 2 one shapes 1a that each correlate with a 20 percent piece 53c in the answer. These 2 twenty percent pieces are combined into a forty percent piece 53d that represents 40 cents. A 20 percent tip on a 27 dollar check is therefore 5 dollars (five shape 53b composed of 100 percent pieces) and 40 cents (a 40 percent piece 53d).

Figure 76:
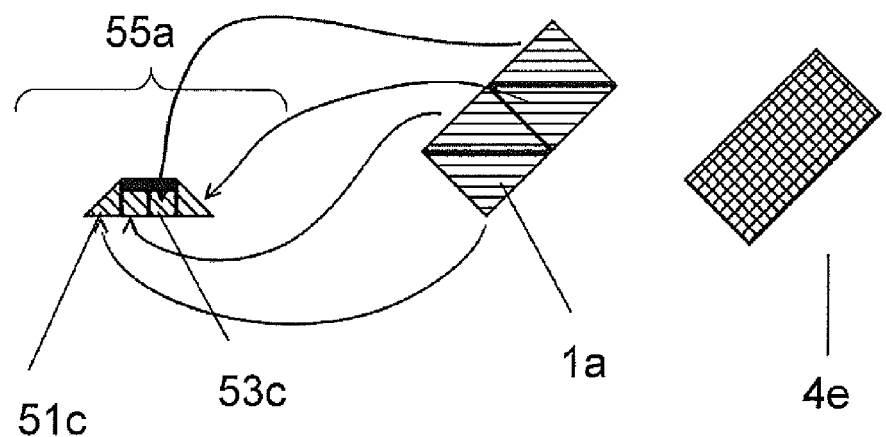

FIG. 76 demonstrates 20% of 4 dollars which does not yield an answer of even dollars. The 4 shape 4e can be broken into 4 one shapes 1a which each correspond to a 20 percent piece 51c and 53c in the answer shape. In practice, a student would simply count each 20 percent piece 51c and 53c as they compile the answer shape 55a stopping at 4 in this case. This answer shape represents 80 percent of a dollar or 80 cents. With practice, students will eventually memorize the different answer shapes that are multiples of ten cents. Until then, the answer shape can usually be recognized by either breaking it into more easily recognized base shapes or totaling the missing shapes from a full one shape and subtracting them from 100. These missing shapes are subtracted from 100 because each full one shape in the answer represents 100 percent of a dollar.

Figure 77:
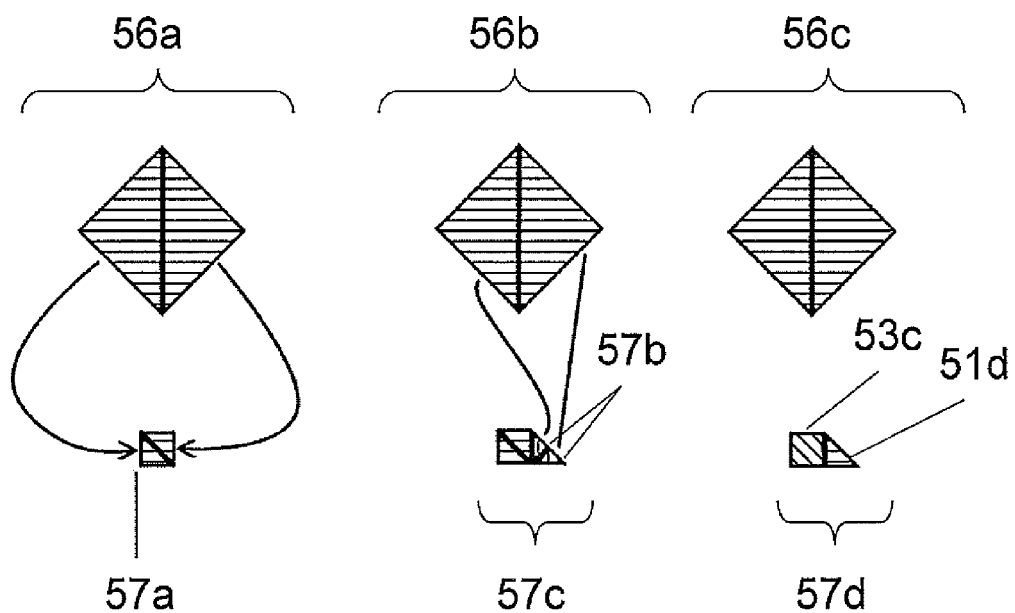

Examples thus far have taken 20 percent of a total, however, other percentages can be calculated. FIG. 77 shows the calculation of 15 percent of 2. When working with percentages that are not a multiple of ten, the problem is broken into stages that are easier to calculate. In this example, 10 percent of 2 is calculated, 5 percent of 2 is calculated and then these calculations are added for the final answer. To calculate 10 percent of 2, a 10 percent piece is replicated 2 times to make sub answer shape 57a as shown in first tip finder representation 56a. Then, 5 percent of 2 is calculated by compiling 2 five percent pieces 57b which are added to sub answer shape 57a to make answer shape 57c as shown in second tip finder representation 56b. The mental process behind visualizing the 5 percent pieces involves understanding that 5 percent is 50 percent of 10 percent so that a 10 percent piece can be broken in half to make 2 five percent pieces. Answer shape 57c can be converted to answer shape 57d, which replaces 2 ten percent pieces with 20 percent piece 53c and replaces 2 five percent pieces with ten percent piece 51d indicating the final answer of 0.3 or 30 cents as shown in third tip finder representation 56c.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A mathematical learning system comprised of a plurality of geometric shapes, wherein basic math operations can be calculated by visualizing and manipulating the plurality of geometric shapes; wherein the plurality of geometric shapes are comprised of physical, written or digitized substrates; and wherein the plurality of geometric shapes comprise:
    a large square having a value of "10" forming a perimeter of a 10 based shape,
    a small triangle having a value of "1" wherein 10 small triangles are capable of being positioned within the perimeter of the 10 based shape for a value of "10,"
    a large triangle having a value of "5" wherein 2 large triangles are capable of being positioned within the perimeter of the 10 based shape for a value of "10;"
    an outer 4 shape having a value of 4, wherein the outer 4 shape is capable of having two sides forming part of the perimeter of the 10 based shape, wherein 2 outer 4 shapes are capable of being positioned within the perimeter of the 10 based shape for a value of "8;"
    an inner 4 shape having a value of "4", whereby the inner 4 shape never forms part of the perimeter of the 10 based shape;
    a small square having a value of "2"; whereby the small square never forms part of the perimeter of the 10 based shape"
    an inner 3 shape having a value of "3"; whereby the inner 3 shape is capable of either being placed inside the 10 based shape without forming part of the perimeter or being placed so as to form part of the perimeter of the 10 based shape; and
    an outer 3 shape having a value of "3" and having a geometry of 3 small triangles connected thereto at their respective corner points and having sides capable of forming part of the perimeter of the 10 based shape.

2. The mathematical learning system according to claim 1, further comprising a longitudinal spacer having a null value.

3. The mathematical learning system according to claim 1, further comprising an L shaped spacer having a null value that represents the integer "0".

4. The mathematical learning system according to claim 1, wherein the plurality of geometric shapes are embodied in one or more cubes.

5. The mathematical learning system of claim 1, wherein an L-shaped spacer is used to designate the small triangle having a value of "1" and the small square having a value of "2".

6. The mathematical learning system of claim 1, wherein each geometric shape has a specific color.

7. A method of teaching a person to do basic math operations comprised of teaching the person to manipulate a plurality of unique geometric shapes; each unique geometric shape having a specific value ranging 1-10, wherein the unique geometric shape having a value of 10 is formed by manipulating any combination of unique geometric shapes that when their specific values are added together equals the value of 10; wherein the plurality of geometric shapes are comprised of physical, written or digitized substrates, and wherein teaching the person to manipulate a plurality of unique geometric shapes is comprised of teaching the person to manipulate small triangles with a value of 1 forming larger unique geometric shapes, each larger unique geometric shape representing a specific value from 2 to 10; wherein a large square having a value of 10 is comprised by manipulating any combination of unique geometric shapes that when their specific values are added together equals the value of 10.

8. The method of claim 7, wherein a unique geometric shape having a value of 2 is comprised of two adjacent small triangles with a value of 1 forming a small square.

9. The method of claim 7, wherein visualization of any combination of unique geometric shapes forming the unique geometric shape having a value of 10 is enhanced with the use of one or more spacers.

10. The method of claim 7, wherein the basic math operations are performed using values greater than 10.

11. The method of claim 7, wherein the basic math operations are performed using fractions.

12. The method of claim 7, wherein the basic math operations are performed using percentages.

13. The method of claim 7 further comprising of teaching the person to manipulate a plurality of unique geometric shapes using the place value system.

14. The method of claim 7 further comprising of teaching the person to manipulate a plurality of unique geometric shapes using the direct representation system.

15. A mathematical learning system comprised of a plurality of unique geometric shapes, wherein basic math operations can be calculated by visualizing and manipulating the plurality of unique geometric shapes; the plurality of geometric shapes comprising unique geometric shapes, each unique geometric shape having a specific value ranging 1-10, wherein the unique geometric shape having a value of 10 is formed by manipulating any combination of unique geometric shapes that when their specific values are added together equals the value of 10; wherein the plurality of geometric shapes are comprised of physical, written or digitized substrates, and wherein small triangles with a value of 1 form larger unique geometric shapes, each larger unique geometric shape representing a specific value from 2 to 10; wherein a large square having a value of 10 is comprised by manipulating any combination of unique geometric shapes that when their specific values are added together equal the value of 10.

16. The mathematical system of claim 15, wherein a unique geometric shape having a value of 2 is comprised of two adjacent small triangles with a value of 1 forming a small square.

17. The mathematical system of claim 15, wherein each unique geometric shape has a specific color.

* * * * *